(12) United States Patent
Penacho et al.

(10) Patent No.: US 11,450,178 B2
(45) Date of Patent: Sep. 20, 2022

(54) LOW-COMPLEXITY REEL SYMBOL REPLACEMENT STRATEGY WITH CLUSTERING

(71) Applicant: Aristocrat Technologies, Inc., Las Vegas, NV (US)

(72) Inventors: Gary Penacho, Henderson, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 37 days.

(21) Appl. No.: 16/836,588

(22) Filed: Mar. 31, 2020

(65) Prior Publication Data

US 2021/0304562 A1    Sep. 30, 2021

(51) Int. Cl.
| | | |
|---|---|---|
| A63F 13/00 | (2014.01) | |
| G07F 17/32 | (2006.01) | |
| G06F 7/58 | (2006.01) | |

(52) U.S. Cl.
CPC ............ G07F 17/3262 (2013.01); G06F 7/58 (2013.01); G07F 17/3213 (2013.01)

(58) Field of Classification Search
CPC .............................. G07F 17/3213; G07F 17/34
See application file for complete search history.

(56) References Cited

U.S. PATENT DOCUMENTS

| | | | |
|---|---|---|---|
| 6,612,927 B1 | 9/2003 | Slomiany | |
| 6,733,385 B1* | 5/2004 | Enzminger | ............ G07F 17/32 463/17 |
| 8,591,330 B2 | 11/2013 | Kelly et al. | |
| 9,177,447 B2 | 11/2015 | Zoltewicz et al. | |
| 9,959,703 B2 | 5/2018 | Igesund | |
| 10,115,272 B2 | 10/2018 | Marks et al. | |
| 10,176,668 B2 | 1/2019 | Galasso et al. | |
| 10,373,441 B1 | 8/2019 | Halvorson | |
| 2003/0032479 A1 | 2/2003 | Lemay | |
| 2004/0048646 A1 | 3/2004 | Martin | |
| 2004/0266516 A1 | 12/2004 | Thomas | |
| 2006/0287036 A1 | 12/2006 | Daly | |
| 2008/0207312 A1 | 8/2008 | Seelig | |
| 2009/0286588 A1 | 11/2009 | Jackson | |
| 2011/0059791 A1 | 3/2011 | Tarantino | |
| 2012/0270638 A1 | 10/2012 | Eubanks | |
| 2014/0148241 A1* | 5/2014 | Vallejo | ............... G07F 17/3262 463/20 |
| 2015/0379828 A1 | 12/2015 | Lee et al. | |
| 2015/0379829 A1 | 12/2015 | Lee et al. | |

(Continued)

OTHER PUBLICATIONS

Office Action dated Jun. 1, 2021 for U.S. Appl. No. 16/836,403 (pp. 1-13).

(Continued)

*Primary Examiner* — David L Lewis
*Assistant Examiner* — Eric M Thomas
(74) *Attorney, Agent, or Firm* — Blank Rome LLP

(57) ABSTRACT

In an electronic gaming device, instances of a target symbol are swapped in to symbol positions of one or more reel strips using one or more index tables to identify the symbol positions at which to swap in the instances of the target symbol. The index table(s) can be configured to cluster instances of the target symbol according to a deterministic approach. Subsequently, spin results are determined for one or more spins of reels using the reel strips.

20 Claims, 35 Drawing Sheets

(56) References Cited

U.S. PATENT DOCUMENTS

| | | |
|---|---|---|
| 2015/0379830 A1 | 12/2015 | Lee et al. |
| 2015/0379831 A1 | 12/2015 | Lee et al. |
| 2017/0092071 A1 | 3/2017 | Cuddy |
| 2019/0378376 A1* | 12/2019 | Bolling, Jr. ......... G07F 17/3258 |
| 2020/0265681 A1 | 8/2020 | Eubanks |
| 2020/0265682 A1 | 8/2020 | Eubanks |
| 2021/0027583 A1 | 1/2021 | Cuddy |
| 2021/0082241 A1 | 3/2021 | Marsh |

OTHER PUBLICATIONS

Office Action (Notice of Allowance and Fees Due (PTOL-85)) dated Nov. 17, 2021 for U.S. Appl. No. 16/836,403 (pp. 1-8).

\* cited by examiner

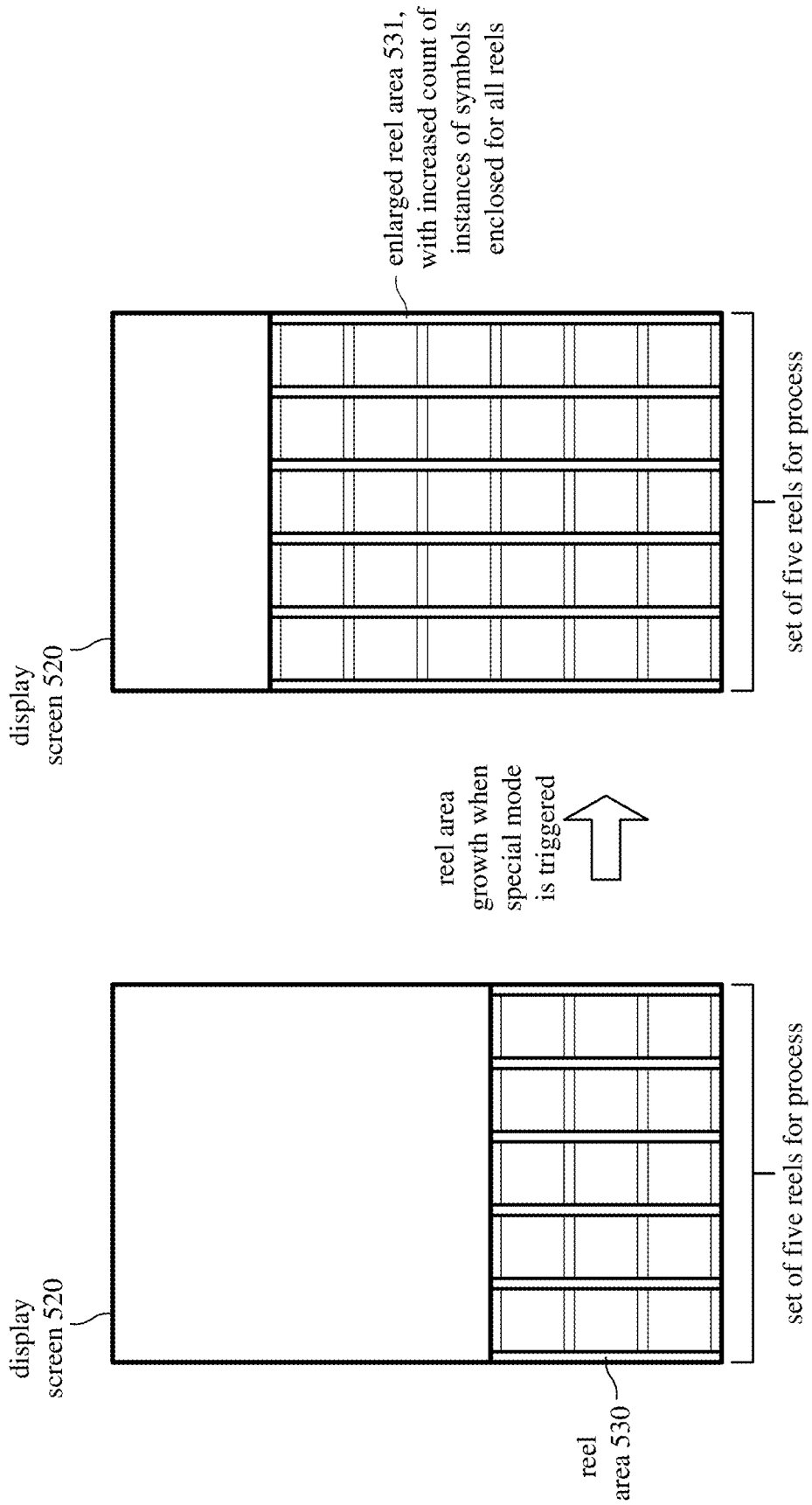

601 display screen 620 reel area 630 reels stopped in reel area 630; reel strips include instances of target symbol (buffalo)

602 display screen 620 reel area 630 reels spin in reel area 630; special mode triggered; transition animation starts for special mode

605 display screen 620 reel area 630 transition animation continues for special mode

606 display screen 620 reel area 630 transition animation continues for special mode

608 display screen 620 enlarged reel area 634 transition animation continues for special mode; enlarged reel area 634 revealed

607 display screen 620 obscured reel area 632 transition animation continues for special mode

610 display screen 620 enlarged reel area 634

1st reel lands in reel area 634; new reel strips include higher concentration of instances of target symbol (buffalo)

609 display screen 620 enlarged reel area 634 transition animation finishes for special mode

612 display screen 620 enlarged reel area 634

3rd reel lands in reel area 634; new reel strips include higher concentration of instances of target symbol (buffalo)

611 display screen 620 enlarged reel area 634

2nd reel lands in reel area 634; new reel strips include higher concentration of instances of target symbol (buffalo)

614

613

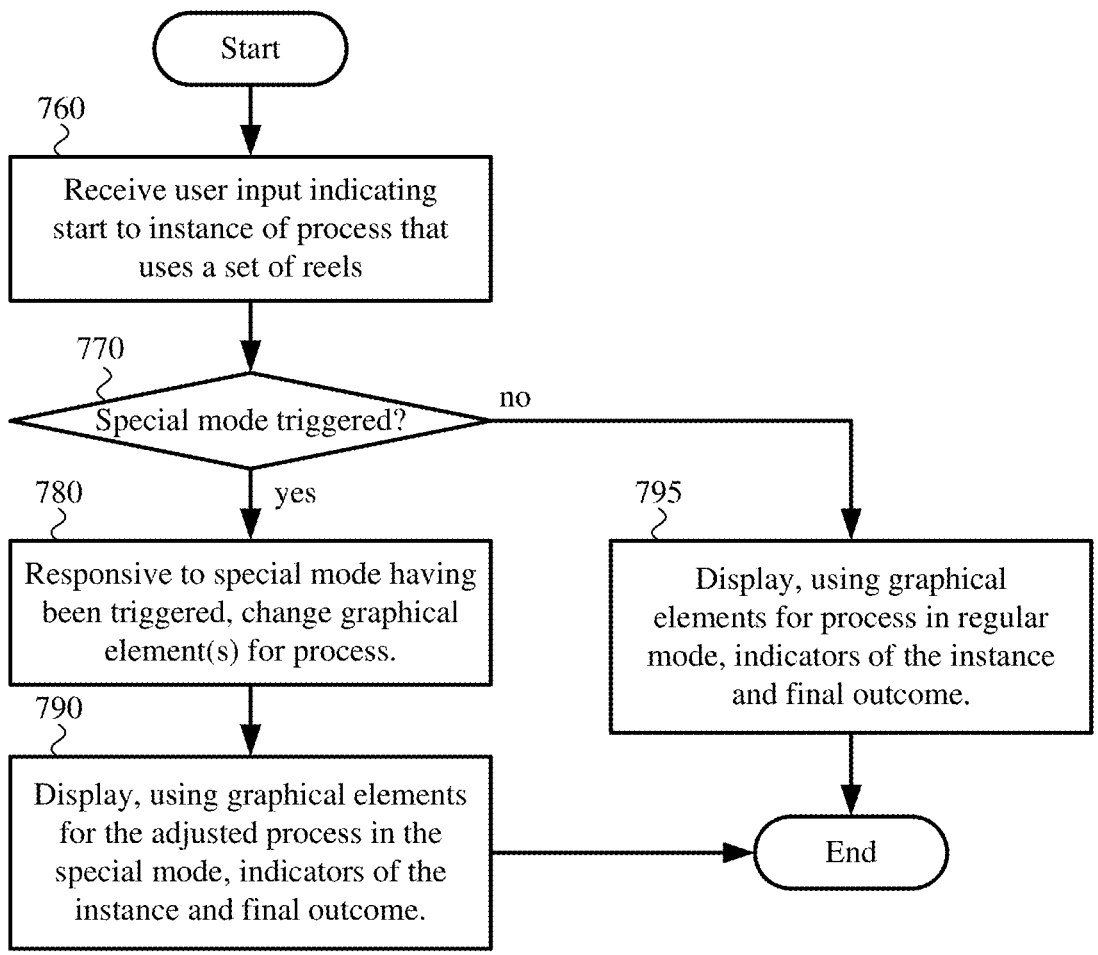

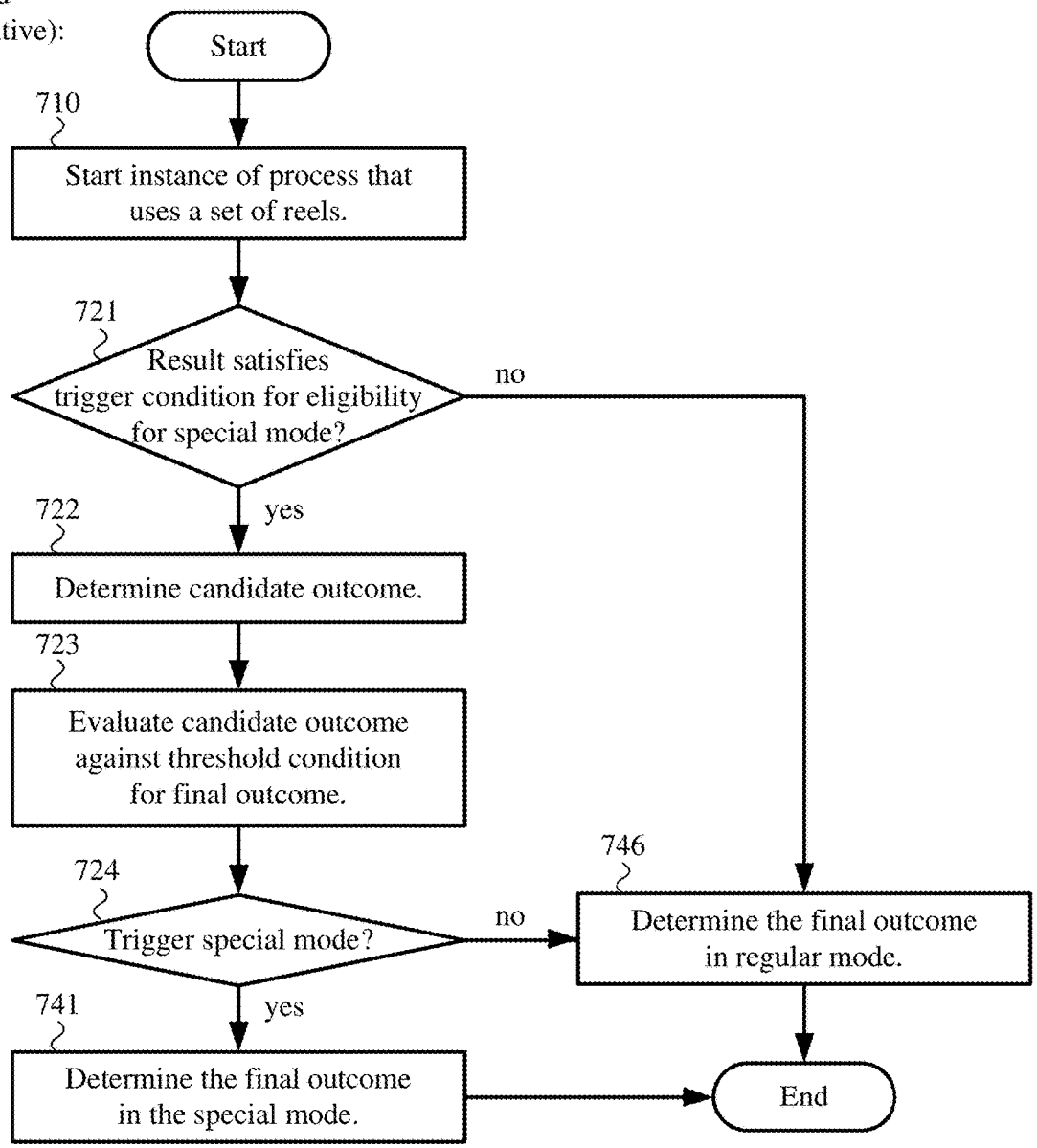

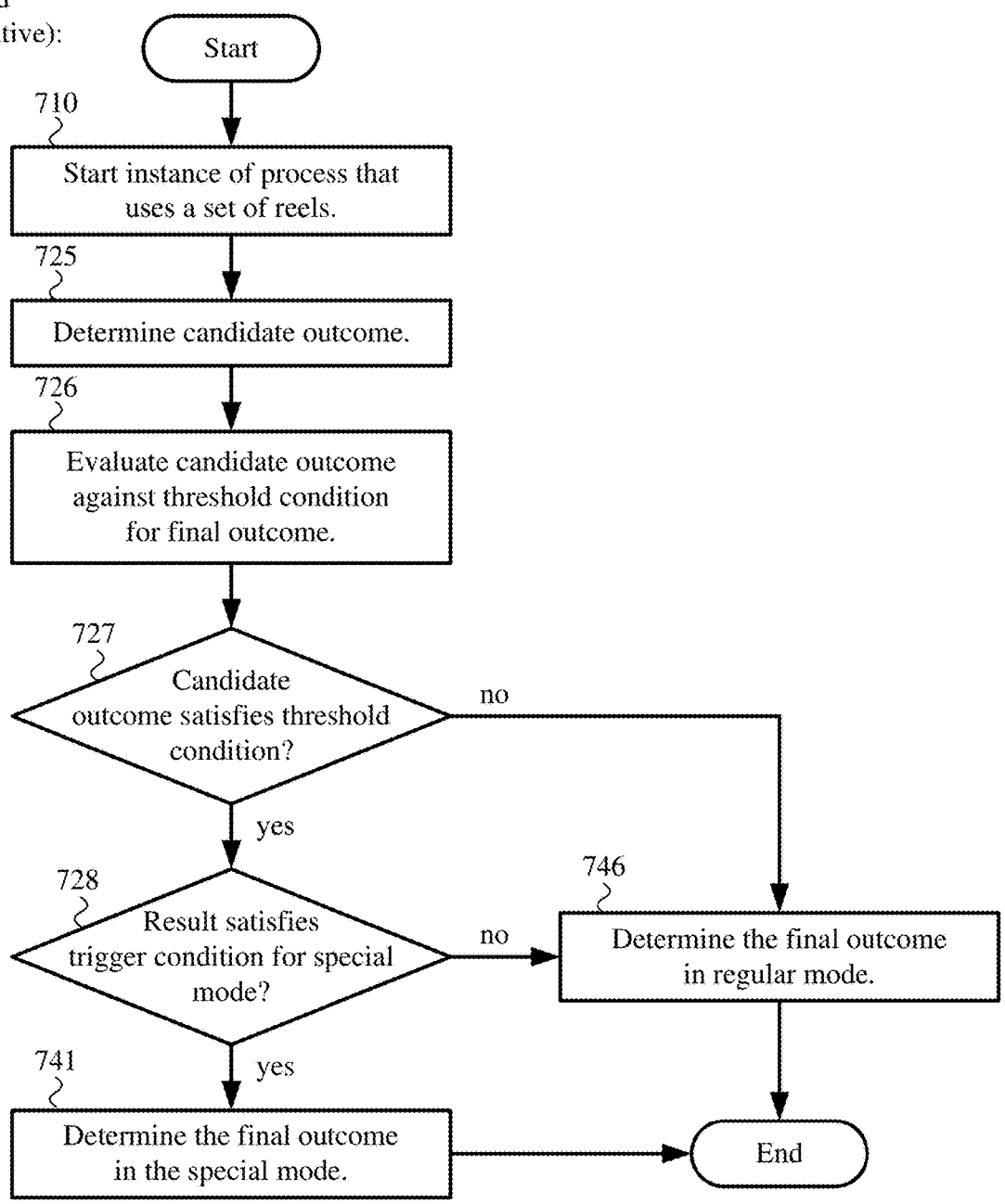

FIG. 9 data structures 900 for reel strips reel strip 0: | A | 1 | B | 2 | B | 2 | B | 2 | B | 2 | C | 3 | C | 3 | D | 4 | reel strip 1: | B | 5 | B | 5 | B | 5 | B | 5 | C | 6 | C | 6 | D | 7 | reel strip 2: | A | 5 | B | 8 | B | 8 | B | 8 | C | 9 | C | 9 | D | 10 | reel strip 3: | A | 6 | B | 9 | B | 9 | B | 9 | B | 9 | C | 11 | D | 12 | reel strip 4: | A | 7 | B | 10 | B | 10 | B | 10 | B | 10 | C | 12 | C | 12 | reel strip 5: | B | 13 | B | 13 | B | 13 | C | 14 | C | 14 | D | 15 | reel strip 6: | B | 14 | B | 14 | B | 14 | B | 14 | C | 16 | D | 17 | reel strip 7: | B | 15 | B | 15 | B | 15 | B | 15 | C | 17 | C | 17 | reel strip 8: | A | 13 | B | 18 | B | 18 | C | 19 | C | 19 | D | 20 | reel strip 9: | A | 14 | B | 19 | B | 19 | B | 19 | C | 21 | D | 22 | reel strip 10: | A | 15 | B | 20 | B | 20 | B | 20 | C | 22 | C | 22 | reel strip 11: | A | 16 | B | 21 | B | 21 | B | 21 | B | 21 | D | 23 | reel strip 12: | A | 17 | B | 22 | B | 22 | B | 22 | B | 22 | C | 23 | reel strip 13: | B | 24 | B | 24 | C | 25 | C | 25 | D | 26 | reel strip 14: | B | 25 | B | 25 | B | 25 | C | 27 | D | 28 | reel strip 15: | B | 26 | B | 26 | B | 26 | C | 28 | C | 28 | reel strip 16: | B | 27 | B | 27 | B | 27 | B | 27 | D | 29 |

...

_1002_ display screen 1020 symbol count meter 1040 prompt 1042 transition to different background; show intro, prompt to start supplemental feature, and symbol count meter

_1001_ display screen 1020 reel area 1030 for set of reels reels stopped in reel area 1030; reel area 1030 encloses combination of instances of scatter symbols (coins)

1003 display screen 1020 reel area 1060 for ribbon wheel instance 1050 of super scatter symbol zoom in to location of instance of super scatter symbol (eagle coin); ribbon wheel spins

1004 display screen 1020 reel area 1060 for ribbon wheel instance 1050 of super scatter symbol ribbon wheel stops at count of additional instances of target symbol (white buffalo) for reel strips 1006
indicator 1064
indicator of count of additional instances of target symbol (white buffalo) for reel strips 1005
indicator 1062
indicator of count of additional instances of target symbol (white buffalo) for reel strips

1008 fullness indicator 1044 count value 1046 details of symbol count meter 1040

1007 display screen 1020 symbol count meter 1040 reel area 1030 for set of reels zoom out; show count of additional instances of target symbol (white buffalo) for reel strips; update symbol count meter 1040

1012 display screen 1020 indicator 1043 of scatter symbol combo when reels land, reel area 1030 can enclose new combination of instances of scatter symbols (coins)

1011 display screen 1020 reel area 1030 for set of reels reels land in reel area 1030; show indicator of outcome for spin

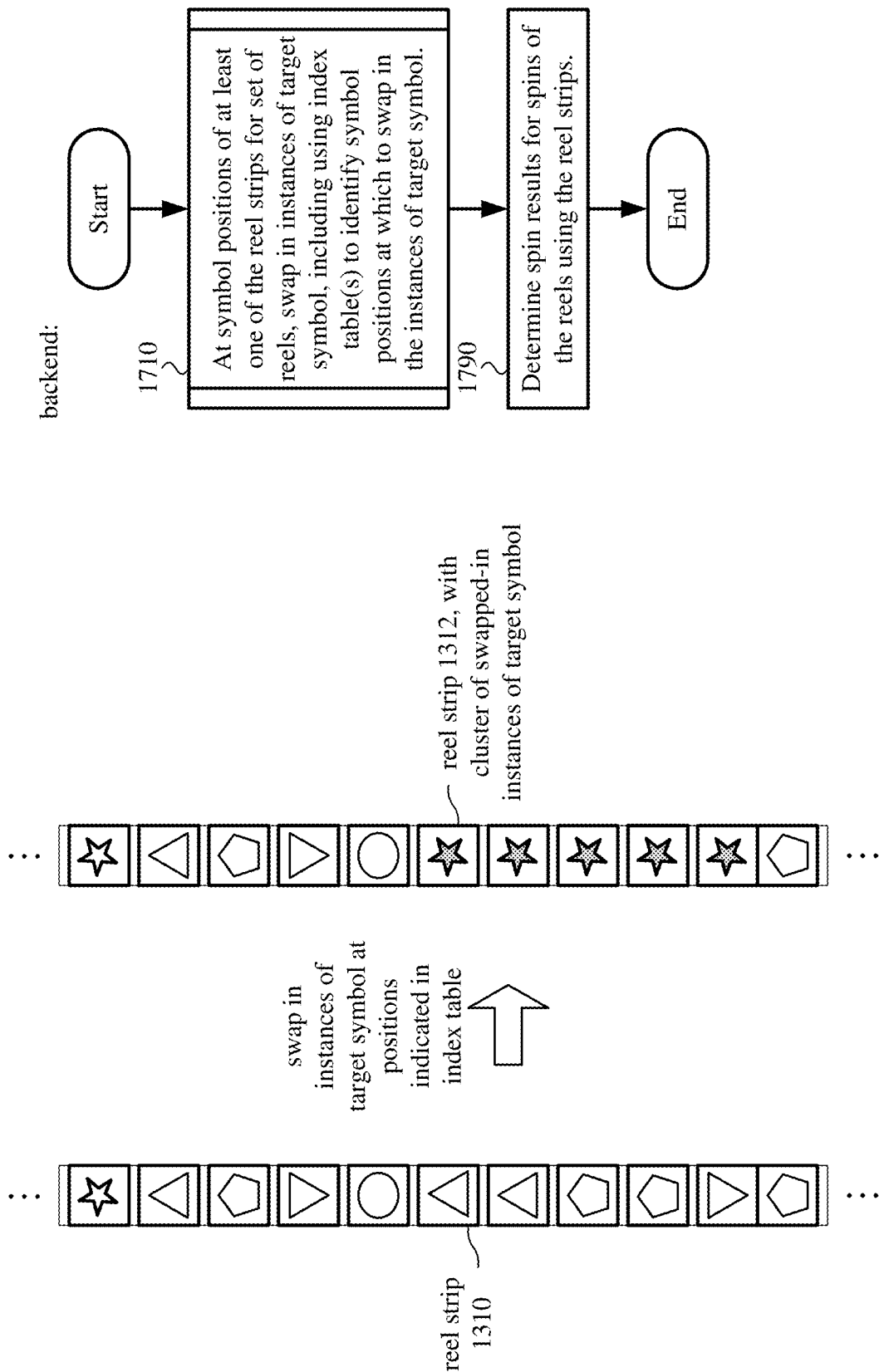

FIG. 14

1400 — per-reel index tables (indexed by per-reel counter)

| index table for reel strip 0: | index table for reel strip 1: | index table for reel strip 2: | index table for reel strip 3: | index table for reel strip 4: |
|---|---|---|---|---|
| 0: 3 | 0: 6 | 0: 1 | 0: 8 | 0: 7 |
| 1: 4 | 1: 7 | 1: 2 | 1: 9 | 1: 8 |
| 2: 5 | 2: 8 | 2: 3 | 2: 10 | 2: 9 |
| 3: 11 | 3: 9 | 3: 4 | 3: 11 | 3: 10 |
| 4: 12 | 4: 10 | 4: 5 | 4: 12 | 4: 14 |
| 5: 13 | 5: 11 | 5: 6 | 5: 16 | 5: 15 |
| 6: 14 | 6: 12 | 6: 11 | 6: 17 | 6: 16 |
| 7: 15 | 7: 19 | 7: 12 | 7: 18 | 7: 26 |
| 8: 19 | 8: 20 | 8: 13 | 8: 19 | 8: 27 |
| 9: 20 | 9: 21 | 9: 14 | 9: 20 | 9: 28 |
| 10: 21 | 10: 22 | 10: 15 | 10: 21 | 10: 29 |
| 11: 22 | 11: 23 | 11: 22 | 11: 22 | 11: 34 |
| 12: 27 | 12: 28 | 12: 23 | 12: 30 | 12: 35 |
| 13: 28 | 13: 29 | 13: 24 | 13: 31 | 13: 36 |
| 14: 29 | 14: 30 | 14: 25 | 14: 32 | 14: 37 |
| 15: 32 | 15: 31 | 15: 26 | 15: 33 | 15: 38 |
| 16: 33 | 16: 32 | 16: 27 | 16: 34 | 16: 43 |
| 17: 34 | 17: 35 | 17: 36 | 17: 42 | 17: 44 |
| 18: 35 | 18: 36 | 18: 37 | 18: 43 | 18: 45 |
| 19: 36 | 19: 37 | 19: 38 | 19: 44 | 19: 50 |
| 20: 42 | 20: 38 | 20: 39 | 20: 45 | 20: 51 |
| 21: 43 | 21: 39 | 21: 40 | 21: 45 | 21: 52 |
| 22: 44 | 22: 40 | 22: 50 | 22: 47 | 22: 53 |
| 23: 45 | 23: 46 | 23: 51 | 23: 52 | 23: 54 |
| 24: 51 | 24: 47 | 24: 52 | 24: 53 | 24: 58 |
| 25: 52 | 25: 48 | 25: 53 | 25: 54 | 25: 59 |
| 26: 53 | 26: 49 | 26: 54 | 26: 55 | 26: 60 |
| 27: 54 | 27: 50 | 27: 61 | 27: 56 | 27: 61 |
| 28: 55 | 28: 51 | 28: 62 | 28: 57 | 28: 62 |
| 29: 60 | 29: 55 | 29: 63 | 29: 68 | 29: 65 |
| ... | ... | ... | ... | ... | symbol position 1410

FIG. 15   1500 combined 2D index table (indexed by reel strip identifier x per-reel counter)

| | RS0: | RS1: | RS2: | RS3: | RS4: |
|---|---|---|---|---|---|
| 0: | 3 | 6 | 1 | 8 | 7 |
| 1: | 4 | 7 | 2 | 9 | 8 |
| 2: | 5 | 8 | 3 | 10 | 9 |
| 3: | 11 | 9 | 4 | 11 | 10 |
| 4: | 12 | 10 | 5 | 12 | 14 |
| 5: | 13 | 11 | 6 | 16 | 15 |
| 6: | 14 | 12 | 11 | 17 | 16 |
| 7: | 15 | 19 | 12 | 18 | 26 |
| 8: | 19 | 20 | 13 | 19 | 27 |
| 9: | 20 | 21 | 14 | 20 | 28 |
| 10: | 21 | 22 | 15 | 21 | 29 |
| 11: | 22 | 23 | 22 | 22 | 34 |
| 12: | 27 | 28 | 23 | 30 | 35 |
| 13: | 28 | 29 | 24 | 31 | 36 |
| 14: | 29 | 30 | 25 | 32 | 37 |
| 15: | 32 | 31 | 26 | 33 | 38 |
| 16: | 33 | 32 | 27 | 34 | 43 |
| 17: | 34 | 35 | 36 | 42 | 44 |
| 18: | 35 | 36 | 37 | 43 | 45 |
| 19: | 36 | 37 | 38 | 44 | 50 |
| 20: | 42 | 38 | 39 | 45 | 51 |
| 21: | 43 | 39 | 40 | 45 | 52 |
| 22: | 44 | 40 | 50 | 47 | 53 |
| 23: | 45 | 46 | 51 | 52 | 54 |
| 24: | 51 | 47 | 52 | 53 | 58 |
| 25: | 52 | 48 | 53 | 54 | 59 |
| 26: | 53 | 49 | 54 | 55 | 60 |
| 27: | 54 | 50 | 61 | 56 | 61 |
| 28: | 55 | 51 | 62 | 57 | 62 |
| 29: | 60 | 55 | 63 | 68 | 65 | symbol position 1510

FIG. 16   1600 combined 1D index table (indexed by overall counter)

| | | |
|---|---|---|
| 0: | 0 | 3 |
| 1: | 0 | 4 |
| 2: | 0 | 5 |
| 3: | 0 | 11 |
| 4: | 0 | 12 |
| 5: | 0 | 13 |
| 6: | 0 | 14 |
| 7: | 0 | 15 |
| 8: | 0 | 19 |
| 9: | 0 | 20 |
| 10: | 0 | 21 |
| 11: | 0 | 22 |
| 12: | 0 | 27 |
| 13: | 0 | 28 |
| 14: | 0 | 29 |
| 15: | 0 | 32 |
| 16: | 0 | 33 |
| 17: | 0 | 34 |
| 18: | 0 | 35 |
| 19: | 0 | 36 |
| 20: | 0 | 42 |

...

| | | |
|---|---|---|
| 50: | 1 | 6 |
| 51: | 1 | 7 |
| 52: | 1 | 8 |
| 53: | 1 | 9 |
| 54: | 1 | 10 |
| 55: | 1 | 11 |
| 56: | 1 | 12 | reel strip identifier 1610    symbol position 1620

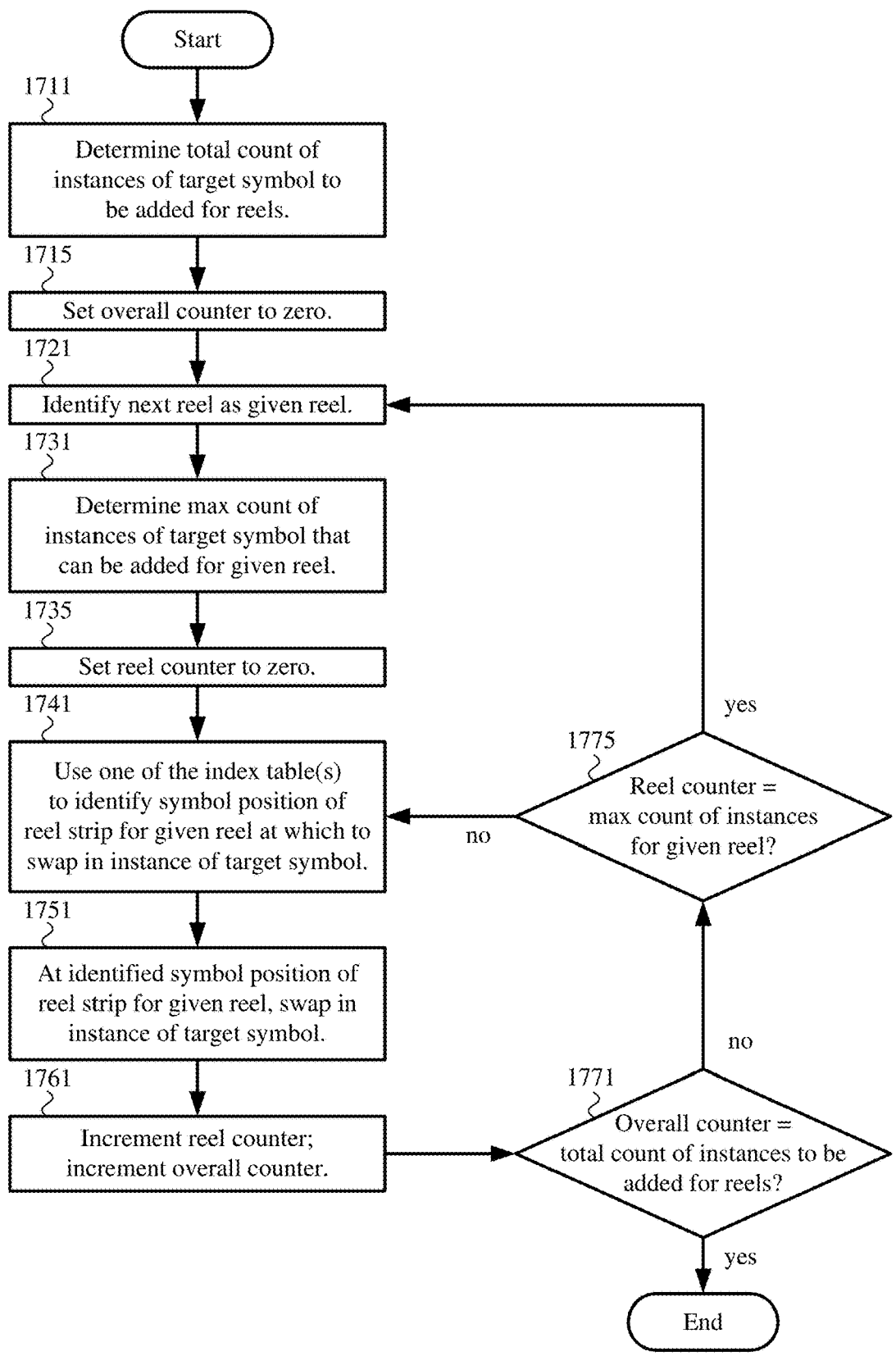
FIG. 17b  1701 (example of stage 1710)

FIG. 17c  1702 (example of stage 1710)
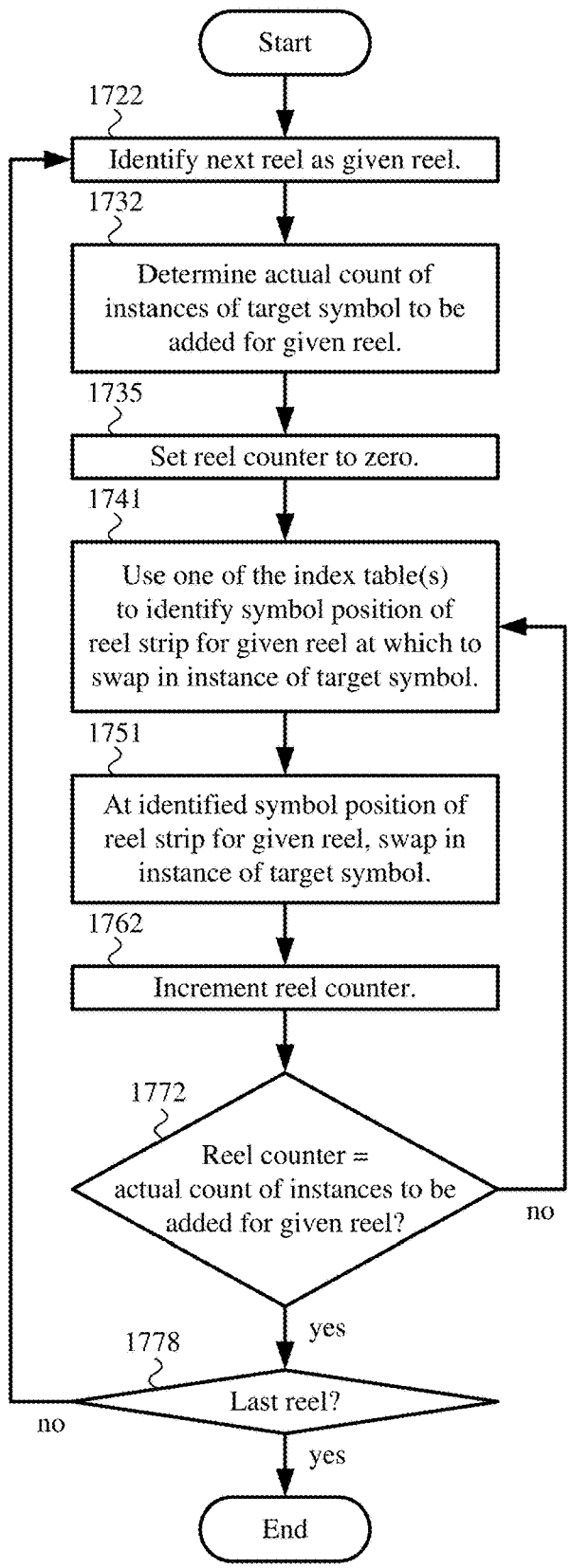
FIG. 17d  1703 (example of stage 1710)
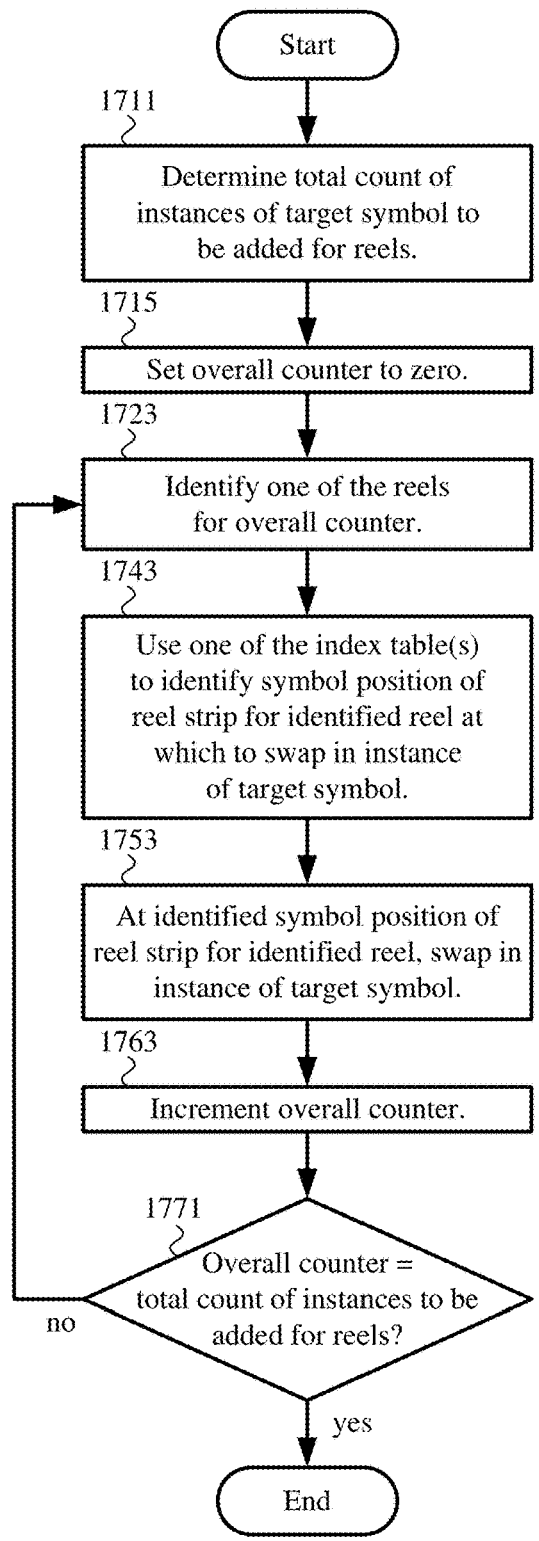

LOW-COMPLEXITY REEL SYMBOL REPLACEMENT STRATEGY WITH CLUSTERING

CROSS-REFERENCE TO RELATED APPLICATIONS

The present application relates to the following applications:
(1) U.S. patent application Ser. No. 16/836,403, filed Mar. 31, 2020, entitled "TRIGGERING SPECIAL MODE WITH FINAL OUTCOME SATISFYING THRESHOLD CONDITION"; and
(2) U.S. patent application Ser. No. 16/836,538, filed Mar. 31, 2020, entitled "LINKED REEL STRIP MECHANISM FOR RE-SPIN SERIES."

FIELD

User interface ("UI") features of electronic gaming devices are described herein, along with features of backend processing to implement the UI features. For example, in an electronic gaming device with spinning reels, various special mode approaches and reel strip replacement mechanisms and strategies provide computationally-effective ways to manage volatility while improving usability and enhancing the user experience.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or pay lines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of pay lines and/or the amount bet on each line. By varying the wager, the player may sometimes alter the frequency or number of winning combinations, frequency or number of secondary games, and/or the amount awarded.

Typical games use a random number generator ("RNG") to randomly determine the outcome of each game. The game is designed to return a certain percentage of the amount wagered back to the player over the course of many plays or instances of the game, which is generally referred to as return to player ("RTP"). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs depend on usability to enhance the user experience and extend player time on the EGMs. Although previous EGMs include various UI features, and backend operations associated with the UI features, that improve usability and enhance the user experience, there is room for further improvement to EGMs.

SUMMARY

In summary, the detailed description presents innovations in user interface ("UI") features of electronic gaming devices, as well as innovations in features of backend processing to implement the UI features. Some of the innovations relate to use of a special mode of a process that uses a set of reels in an electronic gaming device. For the special mode, reel strips for the reels are modified and a reel area is enlarged, so that a final outcome necessarily satisfies a threshold condition (e.g., a minimum award for the special mode, for all-ways evaluation of instances of symbols enclosed in a reel area). Other innovations relate to use of a linked reel strip mechanism to switch reel strips when iteratively spinning a reel. Still other innovations relate to use of index tables that are configured to cluster instances of a target symbol, when replacing instances of symbols in reel strips with target symbol instances. These innovations provide different tools for managing volatility and return to player ("RTP") in a computationally-effective way, while also improving usability and enhancing the user experience.

For example, according to a first set of innovations described herein, a computer system is configured to perform backend operations to control a UI of an electronic gaming device. The backend operations include starting an instance of a process that uses a set of reels. Each of the reels has a reel strip. A determination is made whether or not a result satisfies a trigger condition for a special mode of the process (e.g., using a random number generation event). Responsive to the special mode being triggered, the process is adjusted so that a final outcome of the instance of the process, for all-ways evaluation of instances of symbols enclosed in a reel area, necessarily satisfies a threshold condition for the final outcome. For example, the process is adjusted so that at least a minimum amount is awarded in the special mode. The process can be adjusted by changing the set of reels (e.g., for at least one of the reels, swapping or modifying the reel strip for the reel to include a higher concentration of target symbol instances). The process can also be adjusted by enlarging the reel area and, for at least some of the reels, increasing a count of instances of symbols that are enclosed in the reel area. The final outcome is then determined according to the adjusted process, with the final outcome being determined according to the all-ways evaluation of instances of symbols enclosed in the reel area. This approach to adjusting the process for the special mode provides a computationally-effective way to manage volatility for a target level of RTP for the special mode.

As another example, according to a second set of innovations described herein, a computer system is configured to perform UI-focused operations to control the UI of an electronic gaming device. The UI-focused operations include receiving user input at the electronic gaming device. The user input indicates a start to an instance of a process that uses a set of reels. Each of the reels has a reel strip, which for UI-focused operations can be displayed as spinning through a reel area on a display screen of the electronic gaming device upon a spin of the reel. The process is associated with graphical elements for display. A determination is made whether or not a special mode of the process has been triggered. (If the special mode has been triggered, the process has been adjusted so that a final outcome of the instance of the process, for all-ways evaluation of instances of symbols enclosed in the reel area, necessarily satisfies a threshold condition, e.g., a minimum award for the special mode.) Based on the special mode having been triggered, one or more of the graphical elements are changed for the UI-focused operations. The set of reels can be changed by, for at least one of the reels, swapping or modifying the reel strip for the reel to include a higher concentration of target symbol instances. Or, the reel area can be enlarged and, for at least some of the reels, a count of instances of symbols that are enclosed in the reel area can be increased. Finally, using the graphical elements for the adjusted process, indicators of the instance of the process and the final outcome are displayed, with the final outcome having been determined according to the all-ways evaluation of instances of symbols enclosed in the reel area. This approach to performing UI-focused operations for the special mode can improve usability of the electronic gaming device and enhance the user experience.

As another example, according to a third set of innovations described herein, a computer system is configured to perform backend operations to control a UI of an electronic gaming device. The backend operations include starting, for a reel, a re-spin series that uses a linked reel strip mechanism with one or more data structures for multiple reel strips of a reel strip group. The reel strips of the reel strip group are linked, in the data structure(s), using multiple logical links (e.g., reel strip identifiers). Each of the logical links is associated with an outcome for one of the reel strips and indicates a next reel strip to use, from among the reel strips of the reel strip group. For each of one or more iterations of the re-spin series, a current reel strip is selected (from among the reel strips of the reel strip group) by traversing the data structure(s). In the iteration, an outcome is determined for a spin that uses the current reel strip. After the iteration(s) of the re-spin series, an outcome for the re-spin series is determined based on the outcome(s) of the iteration(s) of the re-spin series. The linked reel strip mechanism is a computationally-effective way to switch reel strips when iteratively spinning a reel in a re-spin series, providing another useful tool for managing volatility for a target level of RTP in an electronic gaming device.

As another example, according to a fourth set of innovations described herein, a computer system is configured to perform UI-focused operations to control the UI of an electronic gaming device. The UI-focused operations include receiving user input at the electronic gaming device. The user input indicates a start, for a reel, to a re-spin series that uses a linked reel strip mechanism with one or more data structures for multiple reel strips of a reel strip group. Each of the reel strips of the reel strip group can be displayed as spinning through a reel area on a display screen of the electronic gaming device upon a spin of the reel. Further, for backend operations, the reel strips of the reel strip group are linked, in the data structure(s), using multiple logical links. Each of the logical links is associated with an outcome for one of the reel strips and indicates a next reel strip to use, from among the reel strips of the reel strip group. For each of one or more iterations of the re-spin series, a current reel strip has been selected (from among the reel strips of the reel strip group) by traversing the data structure(s). In the iteration, the current reel strip is displayed spinning within the reel area on the display screen for a spin that uses the current reel strip, and then an indicator of an outcome for the spin is displayed. After the iteration(s) of the re-spin series, an indicator of an outcome for the re-spin series is displayed, where the outcome is based on the outcome(s) of the iteration(s) of the re-spin series. This approach to performing UI-focused operations for a linked reel strip mechanism can improve usability of the electronic gaming device and enhance the user experience.

As another example, according to a fifth set of innovations described herein, a computer system is configured to perform backend operations to control a UI of an electronic gaming device. The backend operations include operations performed for a process that uses a set of reels. Each of the reels has a reel strip. In the process, at symbol positions of at least one of the reel strips, instances of a target symbol are swapped in, using one or more index tables to identify the symbol positions at which to swap in the target symbol instances. In particular, the index table(s) can be configured to cluster instances of the target symbol according to a deterministic approach, without using random number generator events to identify the symbol positions at which to swap in the instances of the target symbol. Spin results are then determined for one or more spins of the reels, respectively, using the reel strips. Using index tables is a computationally-effective way to swap target symbol instances in to symbol positions in reel strips, while also clustering the target symbol instances, which provides another useful tool for managing volatility for a target level of RTP in an electronic gaming device.

The innovations can be implemented as part of a method, as part of an electronic gaming device such as an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

FIGS. 5a-5c are diagrams showing examples of growth of a reel area on a display screen when a special mode is triggered.

FIG. 7b is a flowchart showing an example technique for controlling the UI of an electronic gaming device, focusing on UI-frontend operations, for a special mode in which a final outcome necessarily satisfies a threshold condition. FIGS. 7c and 7d are flowcharts showing example techniques for controlling the UI of an electronic gaming device, according to alternative approaches for backend operations.

FIG. 9 is a diagram showing data structures for an example linked reel strip mechanism.

FIG. 13 is a diagram showing a reel strip before and after operations to swap in target symbol instances at symbol positions of the reel strip.

FIGS. 14-16 are diagrams showing example index tables that indicate symbol positions of reel strips at which to swap in target symbol instances.

FIG. 17a is flowchart showing an example technique for controlling the UI of an electronic gaming device, focusing on backend operations, when swapping in target symbol instances at symbol positions of a reel strip. FIGS. 17b-17d are flowcharts showing example backend operations when swapping in target symbol instances at symbol positions of a reel strip.

DETAILED DESCRIPTION

Figure 1:
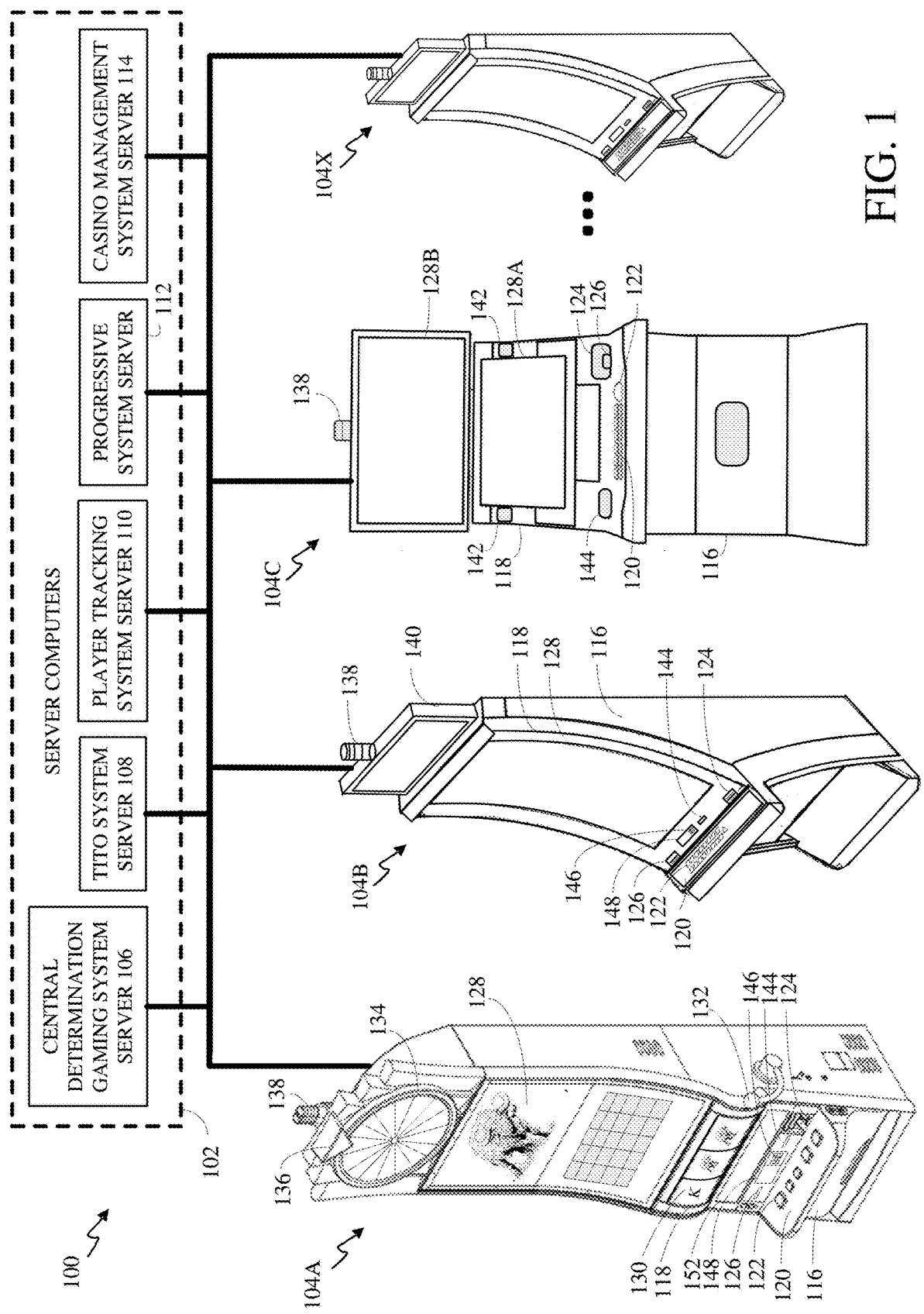
FIG. 1 is an exemplary diagram showing several EGMs networked with various gaming related servers.

The detailed description presents innovations in user interface ("UI") features of electronic gaming devices, as well as innovations in features of backend processing to implement the UI features. For example, some of the innovations relate to use of a special mode of a process that uses a set of reels, where reel strips for the reels are modified and a reel area is enlarged, so that a final outcome necessarily satisfies a threshold condition. As another example, some innovations relate to the use of a linked reel strip mechanism to switch reel strips when iteratively spinning a reel. As another example, some innovations relate to use of index tables that are configured to cluster instances of a target symbol, when replacing instances of symbols in reel strips with the target symbol instances. These innovations provide different tools for managing volatility and return to player ("RTP") in a computationally-effective way, while also improving usability of the electronic gaming device and enhancing the user experience.

In some examples described herein, operations are performed for a special mode of a process that uses a set of reels. Each of the reels has a reel strip. Responsive to the special mode being triggered, the process is adjusted so that a final outcome of an instance of the process necessarily satisfies a threshold condition for the final outcome. For example, the process is adjusted so that at least a minimum amount is awarded in the special mode, according to all-ways evaluation of instances of symbols enclosed in a reel area. The process can be adjusted by changing the set of reels (e.g., to include a higher concentration of instances of a target symbol) and/or enlarging the reel area so that, for at least some of the reels, more instances of symbols are enclosed in the reel area. Graphical elements for the UI can be changed accordingly. The final outcome is determined according to the adjusted process, e.g., according to all-ways evaluation of instances of symbols enclosed in the reel area, and indicators of the instance of the process and the final outcome are displayed. This approach to adjusting the process for the special mode provides a computationally-effective way to manage volatility for a target level of RTP for the special mode, while also improving the usability of the electronic gaming device and enhancing the user experience.

In other examples described herein, a linked reel strip mechanism is used to switch reel strips when iteratively spinning a reel in a re-spin series. The linked reel strip mechanism uses one or more data structures for reel strips of a reel strip group. The reel strips of the reel strip group are linked, in the data structure(s), using multiple logical links (e.g., reel strip identifiers). Each of the logical links is associated with an outcome for one of the reel strips and indicates a next reel strip to use, from among the reel strips of the reel strip group. For an iteration of the re-spin series, a current reel strip is selected by traversing the data structure(s). An outcome is determined for a spin that uses the current reel strip. In the UI, the current reel strip is displayed spinning within a reel area for the reel, and then an indicator of the outcome for the spin is displayed. After the iteration(s) of the re-spin series, an outcome for the re-spin series is determined, and an indicator of the outcome for the re-spin series is displayed. The linked reel strip mechanism is a computationally-effective way to switch reel strips when iteratively spinning a reel, providing another useful tool for managing volatility for a target level of RTP in an electronic gaming device, while also improving the usability of the electronic gaming device and enhancing the user experience.

In other examples described herein, special index tables are used when replacing instances of symbols in reel strips with instances of a target symbol. At symbol positions of at least one of the reel strips, instances of the target symbol are swapped in, using the index tables to identify the symbol positions. The index tables are configured to cluster the target symbol instances in the reel strips. Spin results are then determined for one or more spins of the reels, respectively, using the reel strips. The index tables provide a computationally-effective way to swap target symbol instances in to symbol positions in reel strips, while also clustering the target symbol instances, which provides another useful tool for managing volatility for a target level of RTP in an electronic gaming device.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Electronic Gaming Servers and Electronic Gaming Machines ("EGMs").

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency ("RF") (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out ("TITO") system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
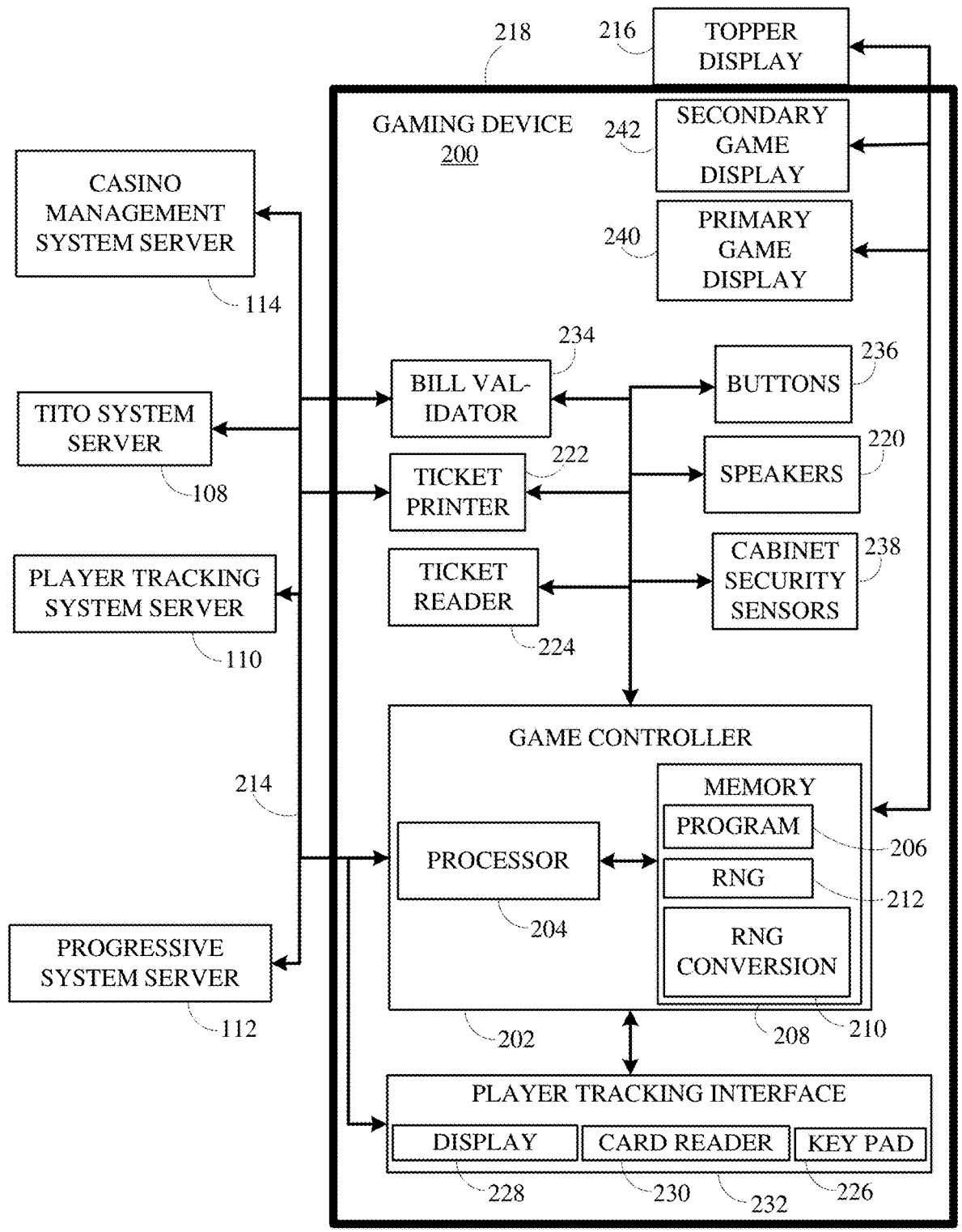
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on a chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Those of skill in the art will appreciate that embodiments of the present disclosure could be implemented with more or fewer elements than are depicted in FIG. 2. The pictured example embodiments of a gaming device 200, as well as example gaming devices 104A-C, are merely a few examples from a wide range of possible gaming device designs on which embodiments of the present disclosure may be implemented. Depending on implementation and the type of processing desired, components of the gaming device 200 can be added, omitted, split into multiple components, combined with other components, and/or replaced with like components. In alternative embodiments, gaming devices with different components and/or other configurations of components perform one or more of the described techniques. Specific embodiments of gaming devices typically use a variation or supplemented version of the gaming device 200. The relationships shown between components within the gaming device 200 indicate general flows of information in the gaming device 200; other relationships are not shown for the sake of simplicity. In general, the game controller 202 can be implemented by software executable on a CPU, by software controlling special-purpose hardware, or by special-purpose hardware (e.g., in an ASIC).

II. Example Game Processing Architectures.

Figure 3:
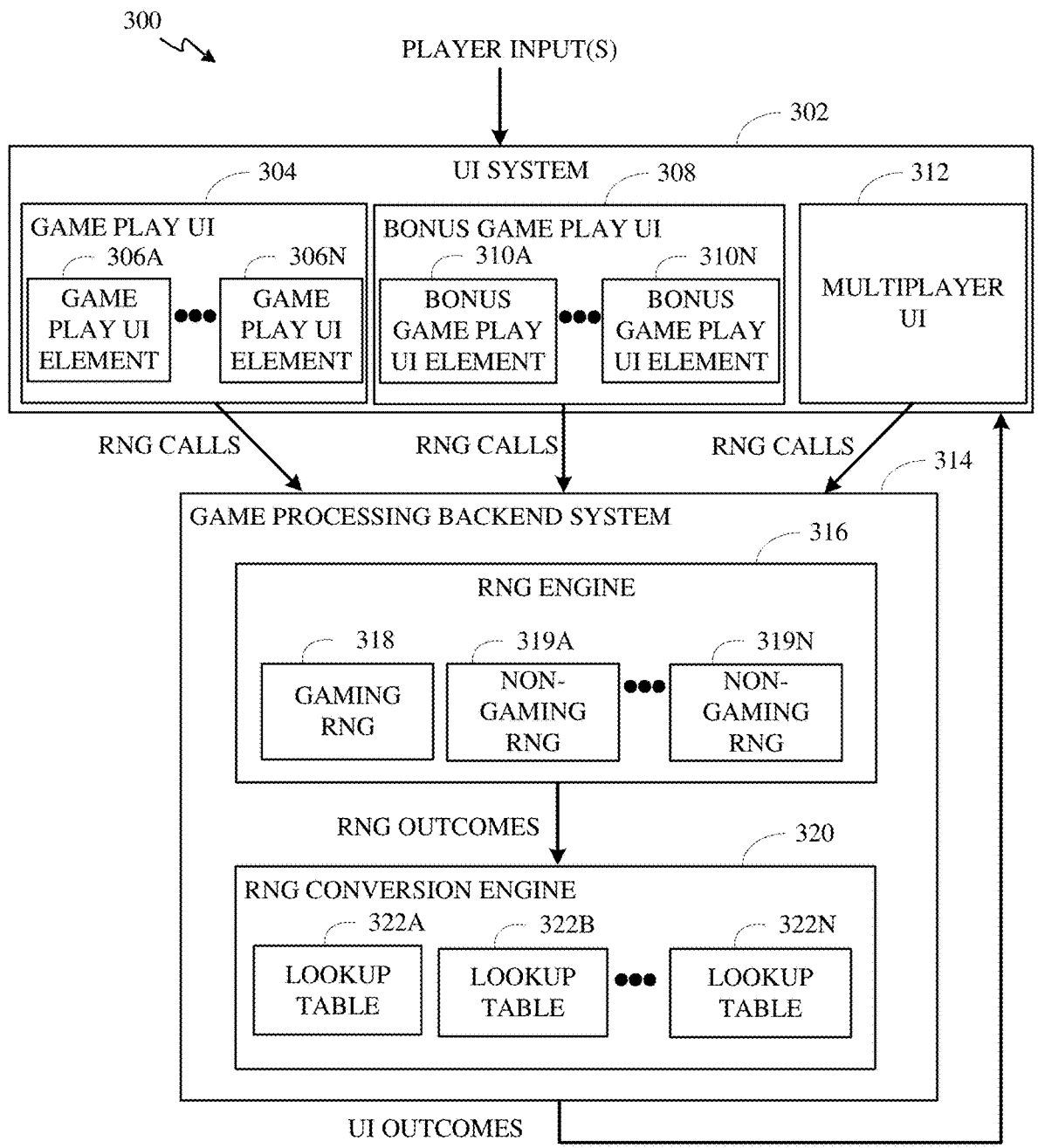
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differ or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces ("APIs") to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator ("PRNG") (e.g., Fortuna PRNG) that securely produces random numbers for one or more game features. To generate random numbers, gaming RNG 318 could collect random data from various sources of entropy, such as from an operating system ("OS"). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as described in later sections.

III. Reel Games, Supplemental Features, and Outcome Determinations.

Electronic gaming devices can incorporate the innovations described herein into various types of reel games or other games. A reel game can be a base reel game or bonus reel game. A base, or primary, reel game includes play that involves spinning reels. A bonus, or secondary, reel game/feature can add the possibility of winning a relatively large payout. A bonus reel game/feature may require an additional wager, but typically does not. A single play of a reel game can constitute a single complete game or wager, e.g., a single spin of the reels or a series of spins which culminate in a final aggregate outcome. Depending on implementation, in addition to a base reel game, an electronic gaming device can conduct a bonus reel game and/or a gateway wheel game. A reel game uses spinning reels and one or more reel areas (game windows) on a display screen.

For a reel game, a reel area encloses viewable portions of a set of reels associated with the reel area. For each of the reels, the viewable portion of the reel includes one or more positions for instances of symbols. Thus, the reel area is a matrix of instances of symbols on a display screen, and may be highlighted graphically to emphasize reels and symbol instances within the reel area. The number of reels and dimensions of the reel area depend on implementation. In some configurations, a reel area has m reels and can enclose different counts of symbol instances for different reels. For example, a reel area encloses 4 symbol instances for a first reel, 6 symbol instances for each of a second reel, third reel, and fourth reel, and 4 symbol instances for a fifth reel. Such a configuration can be described as a 4-6-6-6-4 configuration. In other typical configurations, a reel area has an m×n configuration, with m reels and with n symbol instances visible per reel. For example, for a base reel game, a reel area can have a 5×3 configuration—five reels per window, with three symbol instances showing in the window for each of the reels. More generally, the reel area spans m reels in a first dimension and spans n symbol instances in a second dimension orthogonal to the first dimension, where the value of m can be 4, 5, 6, 7, 8, or some other number of reels, and the value of n can be 2, 3, 4, 5, 6, or some other number of symbol instances. Typically, the m reels are arranged horizontally in the reel area from left-to-right, with the m reels spinning vertically and the reel area showing symbol instances of each of the respective reels. Alternatively, the m reels are arranged vertically in the reel area from top-to-bottom, with the m reels spinning horizontally and the reel area showing symbol instances of each of the respective reels. Alternatively, a reel area can have another configuration.

For each of the reels, a reel strip includes x positions along a one-dimensional strip of symbol instances, where x depends on implementation. For example, x is 30, 80, 100, 200, or some other number of positions. The value of x can be the same or different for different reels (thus, different reels can have different numbers of positions). Each reel can have a data structure (e.g., array, linked list, table) that tracks the symbol instances at the respective positions of the reel strip for the reel. In some implementations, the configuration of the symbol instances at the positions of the reel strips for the reels of a reel game is fixed after the reel game boots, although limited reconfiguration operations may be permitted. In other implementations, the configuration of the symbol instances at the positions of the reel strips for the reels of a reel game can change dynamically after the reel game boots (e.g., depending on bet amount or some other factor). Different sets of reels can be used for a base reel game, special mode of a base reel game, and bonus reel game or other supplemental feature. For example, for a special mode of a base reel game, more "valuable" symbols, such as a wild symbol or scatter symbol, can be added to the reels of a base reel game or swapped in for other symbols on the reels.

The symbol set for reels has various types of symbols, including one or more target symbols and other symbols. The symbols can be static or animated. Depending on implementation, the symbol set for the reels includes one or more target symbol types, at least one jackpot symbol type, a wild symbol type, some number of picture symbol types, some number of minor/low symbol types, and a scatter symbol type (which triggers bonuses). Alternatively, the symbol set for the reels can include other and/or additional symbols. In general, for a given type of symbol, one or more instances of the symbol can appear in a reel strip, but games can have different constraints on symbol placement. Depending on context, the term "symbol" can indicate a symbol type or a symbol instance. In general, an instance of wild symbol can substitute for any other symbol (except, in most implementations, a scatter symbol or jackpot symbol) when determining win conditions along pay lines. In general, an instance of a scatter symbol can contribute to a win condition even if it is not on the same pay line as another scatter symbol. In some implementations, a win condition depends on a count of instances of a scatter symbol that occur anywhere within a reel area, regardless of where they land within the reel area. The symbol set can be the same or different between a base reel game and bonus reel game (or other supplemental feature). Some types of symbols are dimmed out (not active) at times (e.g., symbols other than target symbols are dimmed out during a supplemental feature).

As in a reel game with physical reels, the reels of a reel game on a display screen "spin" graphically through a reel area on the display screen when a player actuates a "spin" or "play" button, which acts as a "handle pull" event. A backend system randomly selects symbol positions of reel strips at which to stop the reel strips for the respective reels, and the respective reels stop at the selected symbol positions of the reel strips, with some number of symbol instances visible in the game window for each of the reels. For example, for a given reel, the backend system generates a random number and determines a symbol position at which to stop the reel strip of the reel using the random number (e.g., with a lookup table). The backend system generates different random numbers for the respective reels that are spun. In this way, the backend system can determine which symbol instances of the respective reels are visible in the game window (reel area) on the display screen. In other scenarios, symbol instances visible in a reel area can be "transferred" from another reel area when certain conditions are satisfied. For example, symbol instances can be graphically transferred or otherwise added to the reel area for a bonus reel game from a base reel game upon the occurrence of certain conditions for the base reel game.

In general, a display screen (or simply "display" or "screen") for a reel game is an area that conveys information to a viewer. The information may be dynamic, in which case, the display screen may use LCD technology, LED technology, cathode ray tube (CRT) technology, or some other display technology. A main display screen (also called a primary game screen or main display) can be a display screen or an area of a display screen used to display game information related to a base reel game, such as a video representation of one or more spinning reels. A secondary display screen (also called a secondary game screen or bonus display) can be a display screen or an area of a display screen used to display secondary game information, such as animations and other graphics associated with a bonus reel game. A credit display can display a player's current number of credits, cash, account balance, or the equivalent. A bet display can display a player's amount wagered. The credit display and/or bet display may be standalone displays, independent of the main display and bonus display. Alternatively, the credit display and/or bet display can be incorporated into the main display or bonus display. Any of the display screens can be implemented as a touchscreen, with an associated touchscreen controller. In this case, such display screens may be operated as input devices in addition to presenting information, to provide input game play decisions (e.g., actions on and selection of game presentation objects).

An electronic gaming device may award a special mode for a base reel game, a bonus reel game, or another supplemental feature to a player. A special mode or supplemental feature may enhance the electronic gaming device and the experience of players by adding elements of excitement and chance. The special mode or supplemental feature can utilize a different set of reels, display screens, controls, symbols, etc. than the base reel game in normal operation. Alternatively, the special mode or supplemental feature can reuse or reconfigure at least some of the reels, display screens, symbols, etc. of a base reel game. The special mode or supplemental feature can be started in response to satisfaction of a trigger condition. For example, the special mode or supplemental feature can be triggered upon the occurrence of some defined combination of symbol instances or threshold count of target symbol instances in one or more sets of reels. Alternatively, the special mode or supplemental feature can be triggered in some other way (e.g., randomly).

In general, a backend system can determine various outcomes and perform operations for various types of base reel games, special modes, and supplemental features. A UI system can then output indications of those outcomes and perform operations for various types of base reel games, special modes, and supplemental features. For example, for various types of events, the backend system uses an RNG (which can be a cryptographic RNG or PRNG) to generate a random number and maps the random number to an outcome using a lookup table. This series of operations is generally referred to as an RNG event. FIG. 3 shows examples of lookup tables 322A-322N, which are also called weighted tables. In general, a lookup table can be implemented as any data structure that assigns probabilities to different options, in order for one of the different options to be selected using a random number. Different options are represented in different entries of a lookup table. The probabilities for different options can be reflected in threshold values (e.g., for a random number RND, generated by an RNG, in the range 0<RND<=100, with four options, 0<RND<=40 for option 1, 40<RND<=70 for option 2, 70<RND<=90 for option 3, and 90<RND<=100 for option 4). The threshold values can represent percentages or, more generally, sub-ranges within the range for a random number. In some implementations, the threshold values for a lookup table are represented as count values (weights) for the respective entries of the lookup table. For example, the following table shows count values for the four options described above:

TABLE 1

Example Lookup Table

| count value | entry |
| --- | --- |
| 40 | <value a1, value a2, . . . > |
| 30 | <value b1, value b2, . . . > |
| 20 | <value c1, value c2, . . . > |
| 10 | <value d1, value d2, . . . > |

The sum total of the count values (weights) indicates the range of the options. The backend system can use a random number, generated between 1 and the sum total of the count values, to select one of the entries in the lookup table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected. The threshold values for a lookup table can be fixed and predetermined. Or, the threshold values for a lookup table can vary dynamically (e.g., depending on bet amount). Or, a lookup table can be dynamically selected (e.g., depending on bet amount, depending on another factor) from among multiple available lookup tables. Different parameters or choices during game play can use different lookup tables. Or, different combinations of parameters or choices can be combined in entries of a given lookup table.

In general, after reels have landed (stopped) in a reel area, any win conditions can be detected and any win amounts can be awarded to the player (e.g., credited to the player's credit balance). In some examples, win conditions depend on a count of target symbol instances in a reel area. In other examples, win conditions are defined as combinations of symbol instances along pay lines (also called win lines) across at least a portion of a reel area on a display screen. Typically, a pay line is traversed from one side of the reel area to the opposite side of the reel area (e.g., left to right), using one symbol instance per reel along the pay line as part of possible combinations of symbol instances. For a round of play, when a certain combination of symbol instances appears along a pay line, a win amount corresponding to that combination of symbol instances and that pay line is awarded. Win amounts can vary according to the combination of symbol instances and according to the particular pay line along which the combination of symbol instances appears. Win amounts are typically determined according to a pay table, where the pay table comprehends the various combinations of symbol instances and pay lines that may occur (examples of win conditions). The win amount for a round of play may be a fraction of an amount wagered for that round of play for certain win conditions. For other win conditions, the win amount may be much larger than the amount wagered. The number of pay lines and base credit cost to play depends on implementation. There can be 2×, 3×, 4×, and 5× bet multipliers. Multipliers can also appear as symbols in reels. Alternatively, there could be higher bet multipliers (e.g., up to 8×), different credit options, and/or a different number of pay lines.

Depending on implementation, symbol instances along a pay line can be counted in different ways. For example, when evaluating a win condition along a pay line, symbol instances along the pay line in any reel can be counted, even if the reels are not adjacent. Alternatively, when evaluating a win condition along a pay line, only symbol instances along the pay line in adjacent reels are counted. For a given pay line, only the highest-paying combination of symbol instances is awarded. Alternatively, for a given pay line, all possible combinations of symbol instances are awarded, in the aggregate. A given symbol instance (e.g., wild symbol) is counted only towards its highest-paying combination in a given pay line. Alternatively, a given symbol instance can be counted towards multiple combinations in a given pay line.

Instead of evaluating win conditions on explicitly-designated pay lines across reels in a reel area, an award can be determined according to a "ways" approach, which is also referred to herein as "all-ways evaluation" or simply "ways evaluation." For all-ways evaluation, each possible path through designated (active) symbol display position(s) of the respective reels provides a way to win. A path is traversed from one side of the reel area to the opposite side of the reel area (e.g., left to right), using one symbol instance per reel along the path. For one symbol instance per reel in a combination, any symbol instance displayed at an active symbol display position for a given reel in the reel area can be used to form a symbol instance combination with any symbol instance displayed at an active display position of each of the other reels. As a result, the total number of ways to win is determined by multiplying the number of active display position(s) of each reel. For example, for five reels each showing three symbol instances at active display positions in a reel area, there are $3^5=243$ ways to win for all-ways evaluation. As another example, for five reels each showing four symbol instances at active display positions in a reel area, there are $4^5=1024$ ways to win for all-ways evaluation. As another example, for five reels, with the first and last reels each showing four symbol instances and the other reels each showing six symbol instances at active display positions in the reel area, there are 4×6×6×6×4=3456 ways to win for all-ways evaluation. As a final example, for five reels, with the first and last reels each showing four symbol instances and the other reels each showing ten symbol instances at active display positions in the reel area, there are 4×10×10×10×4=16000 ways to win for all-ways evaluation.

For all-ways evaluation, the designated (active) symbol display positions for the respective reels can be pre-defined and static. For example, the designated (active) symbol display positions for each reel can be all of the symbol display positions enclosed in a reel area for the reel. Or, the designated (active) symbol display positions for the respective reels can change, e.g., depending on a bet amount. In some implementations, an individual reel can be selected to have all symbol display positions active or only a single symbol display position active, e.g., for different bet amounts. That is, the symbol instance displayed in any symbol display position can be used for a selected reel. For example, depending on the bet amount, all symbol display positions per reel can be active for one reel, two reels, three reels, four reels, or five reels. If all symbol display positions are not active for a reel, then only one symbol display position is active for that reel for all-ways evaluation. For example, for five reels each showing three symbol instances in a reel area, if three reels are selected, there are 3×3×3×1×1=27 ways to win for all-ways evaluation. For such all-ways evaluation, each possible path through the designated (active) symbol display position(s) of the respective reels provides a way to win. The total number of ways to win is determined by multiplying the number of active symbol display position(s) of each reel, where the active symbol display position(s) for a reel are all symbol display positions in the reel area for a selected reel but only the designated (e.g., center) symbol display position in the reel area for a non-selected reel.

In some implementations, for all-ways evaluation using a set of reels, a backend system determines which symbol display positions of the reel area are active for the reels, respectively. For example, the backend system determines which symbol display positions of the reel area are active for the reels, respectively, depending on the bet amount. Alternatively, the symbol display positions of the reel area that are active for the reels, respectively, can be pre-defined and static. In any case, for all of the possible paths through the active symbol display positions of the reel area, the backend system evaluates combinations of instances of symbols along the possible paths for one or more win conditions. Each of the possible paths uses one of the instances of symbols per reel and crosses the reel area from one side of the reel area to an opposite side of the reel area (e.g., left to right).

IV. Example Implementation in an Electronic Gaming Device.

This section describes an example implementation in an electronic gaming device, in which the innovations described herein can be implemented. The example implementation is presented to provide one example of context for the innovations. The innovations described herein can be used in other implementations. For example, the innovations described herein can be used in implementations of an electronic gaming device with different hardware features and/or different gameplay mechanics. Also, although the innovations described herein can be used in combination, the innovations described herein can also be used separately.

In the example implementation, a reel area of a display screen of an electronic gaming device has five reels. For a base reel game, the reel area encloses four symbol display positions for each of the first and fifth reels, and the reel area encloses six symbol display positions for each of the second, third, and fourth reels. That is, the reel configuration is 4-6-6-6-4 for the base reel game. Alternatively, a different reel configuration can be used.

In the example implementation, the symbol types include a highest-value symbol (shown as a white buffalo in some example screenshots), a high-value symbol (shown as a buffalo), various lower-value symbol types of different denominations (shown as other animals, numbers, card values), a wild symbol (shown as a sunset), and a scatter symbol (shown as a coin). The scatter symbol is a dynamic symbol that is resolved to one of several different scatter symbol types (shown as a regular coin, a super coin, or one of several different jackpot coins) upon a spin. Alternatively, other and/or additional symbol types can be used.

In the example implementation, a player can choose a bet denomination (e.g., one cent, two cents, five cents) or use a default bet denomination for a base reel game. The player can also choose a bet amount (e.g., different amounts of credits) or use a default bet amount. The bet amount affects the number of reels that are selected for all-ways evaluation—from one reel up to five reels, depending on the bet amount. The player can also choose a bet multiplier (e.g., 1×, 2×, 3×, 4×, 5×) or use a default bet multiplier (e.g., 1×). Alternatively, other bet settings, evaluation approaches, etc. can be used.

The player initiates a spin for the base reel game (e.g., pushing a spin button). The spin uses the bet denomination, bet amount, and bet multiplier in effect (either default or selected by the player), assuming credits are sufficient in a credit meter. The credit meter decreases by the bet size.

For the spin of the base reel game, a check is made whether a special mode is triggered. In particular, a random number is generated, and the random number is mapped to an outcome (i.e., that the special mode is triggered, or that the special mode is not triggered) using a lookup table. The lookup table that is used can depend on the bet amount. Generally, as the bet amount increases, the special mode is more likely to be triggered, as reflected in weights for the possible outcomes in different lookup tables for different bet amounts. Alternatively, the special mode can be triggered in some other way.

When the special mode is not triggered, the spin of the base reel game proceeds in a regular mode for the base reel game. The regular mode has several stages, including assignment of reels, resolution of dynamic symbols, and outcome evaluation.

In the regular mode of the base reel game, reel strips can be reconfigured for at least some of the reels. For example, upon a spin, a selection can be made between two different sets of reel strips to use for one or more reels (e.g., middle reels 2-4 of five reels). The first set of reel strips possible for the reels includes instances of a wild symbol, which can be resolved to a 2× multiplier, 3× multiplier, or regular wild symbol for outcome evaluation, using an RNG event. The second set of reel strips possible for the reels includes instances of a wild symbol, but the wild symbol cannot switch to a 2× multiplier or a 3× multiplier for outcome evaluation. Instead, the RTP associated with the (possible) multiplier is reallocated to one or more stacks of instances of a high-value target symbol (buffalo) in the second set of reel strips. In the example implementation, a stack of high-value target symbol instances in a reel strip is at least as tall as the count of symbol instances that show in the reel area for the reel, making it possible for a "full" stack of high-value target symbol instances to land. The selection between the different versions of reel strips can use an RNG event. For example, upon the spin, a random number is generated, and the random number is mapped to an outcome (i.e., use the first version of reel strips, or use the second version of reel strips) using a lookup table. The lookup table that is used can depend on the bet amount. Generally, as the bet amount increases, the second version of reel strips is more likely to be selected, as reflected in weights in different lookup tables for different bet amounts. Alternatively, the version of reel strips can be selected in some other way. Or, alternatively, the same version of reel strips can always be used in regular mode for a base reel game, without switching between versions of reel strips.

For a spin of the base reel game in regular mode, any instance of a placeholder for a dynamic symbol in a reel strip is replaced with an instance of a specific symbol type. In the example implementation, the reel strip for each of the respective reels of the base reel game in regular mode can include an instance of a dynamic symbol (coin). Before outcome evaluation, any instance of the dynamic symbol is replaced with (a) an instance of a regular coin symbol, which is a scatter symbol, (b) an instance of a super coin symbol, which is a scatter symbol that also triggers a separate series of operations for the free game feature, or (c) an instance of a jackpot coin symbol, which is a scatter symbol that can also help satisfy a win condition for a jackpot (e.g., grand, major, or minor jackpot, depending on jackpot coin symbol type). The type of symbol used to replace the dynamic symbol is selected by generating a random number and mapping the random number to an outcome (e.g., use symbol type 1, use symbol type 2, and so on) using a lookup table. In the lookup table, different weights can be assigned to the different symbol types. The lookup table that is used can depend on the bet amount. Generally, as the bet amount increases, the higher-value symbol types (e.g., super coin symbol, jackpot coin symbols) are more likely to be selected, as reflected in weights for symbol types in different lookup tables for different bet amounts. In the example implementation, the available lookup tables for the first reel include the jackpot coin symbol types, but the available lookup tables for the remaining reels do not. Each different reel of the base reel game can have its own lookup table for resolving dynamic symbols, or at least some of the reels (e.g., reels after the first reel) can share a lookup table. Alternatively, dynamic symbols can be resolved in a different way for a spin, or an implementation can use only non-dynamic symbols.

For a spin of the base reel game in regular mode, an outcome is determined. For example, a symbol position of a reel strip at which to stop the reel strip is determined for each of the reels, and win conditions are evaluated. The example implementation uses all-ways evaluation for the regular mode, with the number of selected (active) reels depending on bet amount. The number of active reels can be one reel (the first reel), two reels (the first two reels), three reels (the first three reels), four reels (the first four reels), or five reels (all reels). Win conditions are evaluated on possible paths starting from one side of the reel area and continuing (one symbol instance per reel) to the opposite side of the reel area (e.g., left to right). For any given symbol instance, only the highest-value combination is awarded. Win conditions count symbol instances on adjacent reels along a path, except for scatter symbol instances.

For purposes of outcome evaluation, an instance of a wild symbol along a path can be treated as an instance of any other symbol, except a scatter. In addition, a wild symbol is selectively replaced with a 2× multiplier or 3× multiplier, or stays as a wild symbol, using an RNG event with a lookup table. Alternatively, a wild symbol is always resolved to be a 2× multiplier or 3× multiplier, using an RNG event with a lookup table. The lookup tables can vary depending on bet amount. In the example implementation, instances of a wild symbol appear only in the reel strips for the second reel, third reel, and fourth reel. Any 2× multiplier or 3× multiplier along a path with a winning combination of symbol instances is graphically shown. Any 2× multiplier or 3× multiplier can also be applied to a winning combination of scatter symbol instances.

Alternatively, outcomes can be evaluated using a different approach in the regular mode of the base reel game. For example, outcomes are evaluated using a conventional approach with one or more pay lines. In any case, after the outcome evaluation for a spin in the regular mode of the base reel game, any credits from winning combinations of symbol instances are shown in a win meter and added to a credit meter.

When the special mode for the base reel game is triggered, the spin of the base reel game proceeds in the special mode for the base reel game. In the example implementation, in the special mode, one or more aspects of the base reel game are adjusted to ensure that an outcome satisfies a threshold condition, as explained in section V. For example, different reel strips can be used for at least some of the reels in the special mode. The different reel strips include stacks of instances of a high-value symbol (buffalo). As another example, the reel area can be enlarged for the special mode to enclose more symbol instances, for at least some of the reels. In the example implementation, the reel area transitions to a 4-10-10-10-4 configuration during the special mode, with the reel area enclosing ten symbol instances for each of the three middle reels. Unlike the regular mode, however, there are no dynamic symbols in the special mode in the example implementation. Alternatively, different aspects of the base reel game can be adjusted for the special mode.

For a spin of the base reel game in the special mode mode, an outcome is determined. For example, a symbol position of a reel strip at which to stop the reel strip is determined for each of the reels, and win conditions are evaluated. The example implementation uses all-ways evaluation for the special mode, with the number of selected (active) reels depending on bet amount, as explained for the regular mode. As in the regular mode, win conditions are evaluated on possible paths starting from one side of the reel area and continuing (one symbol instance per reel) to the opposite side of the reel area (e.g., left to right). Win conditions count symbol instances on adjacent reels along a path. For any given symbol instance, only the highest-value combination is awarded. Wild symbols can be evaluated as in the regular mode of the base reel game (resolving to a 2× multiplier, 3× multiplier, or regular wild symbol). Alternatively, wild symbols can remain as wild symbols (and never be resolved as a multiplier) in the special mode, or wild symbols can be ignored in the special mode.

Alternatively, outcomes can be evaluated using a different approach in the special mode of the base reel game. For example, outcomes are evaluated using a conventional approach with one or more pay lines. In any case, after the outcome evaluation, any credits from winning combinations of symbol instances are shown in a win meter and added to a credit meter.

During the regular mode of the base reel game, if at least a threshold count (e.g., three or more) of instances of a scatter symbol (coin, super coin, or jackpot) land in any position, a free games feature is triggered. (As noted, there are no dynamic symbols in the special mode of the base reel game in the example implementation, so the free games features cannot be triggered from the special mode.) The player is prompted to start the free games feature, and a transition to the free games feature occurs. Each spin of the free games feature is started in response to a user input event. The free games feature continues until all free games (spins) have been used. The number of free games depends on the count of instances of a scatter symbol that have landed to trigger the free games feature. The number of free games can be increased if the free games feature is "re-triggered" from within the free games feature.

For each spin in the free games feature, any instance of a dynamic coin symbol is replaced with an instance of a specific symbol type, generally as explained above with reference to the regular mode of the base reel game. The outcome of the spin is then determined using all-ways evaluation, generally as described above for the base reel game. Alternatively, outcome evaluation can be performed using a different approach for a spin of the free games feature. In any case, after the outcome evaluation for a spin, any credits from winning combinations of symbol instances are shown in a win meter. The free games feature continues in a cycle of spin/stop/outcome evaluation until there are no more free games (spins). After the outcome evaluation for all spins of the free games feature, the total from the win meter is added to a credit meter.

In a spin of the free games feature, if at least a threshold count (e.g., two or more) of instances of a scatter symbol (coin, super coin, or jackpot) land in any position, the free games feature is re-triggered. Free games (spins) are added to a running count of free games. The number of additional free games (spins) depends on the count of instances of a scatter symbol that have landed.

In a spin of the regular mode of the base reel game or the free games feature, if a super coin symbol instance is part of a combination of symbol instances that triggers or re-triggers the free games feature, operations for a ribbon wheel series are triggered (in addition to the free games feature being triggered or re-triggered). For each instance of the super coin symbol, a spin of a ribbon wheel gives a count of instances of the highest-value symbol (white buffalo) to add to the reels for the free game feature. Specifically, an animation zooms in to the instance of the super coin symbol, and a graphical element for the ribbon wheel slides out from behind the super coin symbol. A reel strip for the ribbon wheel spins. In the example implementation, the reel strip for the ribbon wheel is selected using a linked reel strip mechanism, as described in section VI. Alternatively, the reel strip for the ribbon wheel is determined in some other way, e.g., using an approach that implements sampling without replacement for multiple spins of a ribbon wheel with a given reel strip, as described in section VI. In any case, a symbol position at which to stop the reel strip is determined using an RNG event with a lookup table for the reel strip, and a count of instances of the highest-value symbol is determined as the outcome of the spin of the ribbon wheel. After the spin, an animation zooms back out to the reel area for the free games feature. If the combination of symbol instances that triggers or re-triggers the free games feature includes multiple instances of the super coin symbol, the ribbon wheel spin series occurs for each of the super coin symbol instances, successively zooming in, spinning, and zooming out for each of the super coin symbol instances (e.g., in a left-to-right manner across the reel area).

After all of the spins of the ribbon wheel are completed (for super coin symbol instances), the player is prompted to start the free games feature. In general, the free games feature proceeds as described above, but first the new instances of the highest-value symbol are added to the reels. When the player starts the free games feature, a transition to the free games feature occurs. As the reels spin for a first spin of the free games feature (or first spin after a re-trigger), new instances of the highest-value symbol (white buffalo) are added to the reels (e.g., by replacing other instances of symbols in reel strips for the reels). In the example implementation, the symbol positions of the reel strips at which the instances of the highest-value symbol are added are determined using specially-configured index tables, so that the instances of the highest-value symbol are clustered in the reel strips, as described in section VII. Alternatively, the symbol positions (at which the instances of the highest-value symbol are added) are determined in some other way. Visually, the instances of the highest-value symbol are graphically added to the reel strips, one instance at a time, from left-to-right by reel, as the reel strips spin, or according to another pattern. For each spin of the free games feature, operations are generally performed as described above for the free games feature (with a user input event initiating each spin, resolution of instances of a dynamic symbol, and outcome evaluation). For outcome evaluation, instances of the highest-value symbol (white buffalo) are treated as their own symbol type. For example, for all-ways evaluation, an instance of the highest-value symbol (white buffalo) can be counted as part of a 3-way, 4-way, or 5-way combination of instances of the highest-value symbol along a path. An instance of the highest-value symbol (white buffalo) can also be treated as a wild symbol for the high-value symbol (buffalo). For example, for all-ways evaluation, an instance of the highest-value symbol (white buffalo) can be counted as part of a 3-way, 4-way, or 5-way combination with a mix of instances of the highest-value symbol and high-value symbol. Alternatively, outcome evaluation can performed using a different approach.

In the free games feature, different lookup tables can be used when resolving dynamic symbols at different times, so that the super coin symbol becomes progressively less likely as the count of landed instances of the super coin symbol increases. In this way, the number of spins of the ribbon wheel can be limited for the free game feature, which in turn limits the count of instances of the highest-value symbol that can be added to the reels for the free games feature. For example, a different lookup table for dynamic symbol resolution can be used for each reel depending on the number of instances of the super coin symbol that have already landed. Thus, as more instances of the super coin symbol land, it becomes harder to get a new instance of the super coin symbol. In the example implementation, no more than ten instances of the super coin symbol/ten spins of the ribbon wheel can happen for an instance of the free games feature. For example, if six instances of the super coin symbol have landed, the super coin symbol option is disabled for the fifth reel, so at most four more instances of the super coin symbol can land.

V. Examples of Special Mode with a Final Outcome Satisfying a Threshold Condition.

This section describes innovations for a special mode of a process that uses a set of reels in an electronic gaming device, in which the process is adjusted so that a final outcome of an instance of the process necessarily satisfies a threshold condition for the final outcome (e.g., a minimum award for the special mode, for all-ways evaluation of instances of symbols enclosed in a reel area). In this way, a positive final outcome can be ensured for the instance of the process. For example, reel strips for the reels can be modified and the reel area can be enlarged, so that the final outcome necessarily satisfies the threshold condition. Alternatively, the process can be adjusted in various other ways, as described below, to ensure that the final outcome satisfies the threshold condition.

In the example implementation described in section IV, the special mode is for a spin of a base reel game. In the special mode, the award for the spin is guaranteed to be at least a minimum amount, for all-ways evaluation of instances of symbols enclosed in a reel area. The special mode does not occur for a spin in a free games feature or other supplemental feature. Alternatively, for innovations described in this section, the special mode can occur for a spin in a supplemental feature or in an instance of a different type of process.

A. Options for Triggering the Special Mode.

The special mode of a process that uses a set of reels (in which the process is adjusted so that a final outcome of an instance of the process necessarily satisfies a threshold condition for the final outcome) can be triggered in various ways. The special mode can be a random feature that is evaluated for each instance of a process, without checking any eligibility condition. For example, for each instance of a process, a random number is generated and mapped to an outcome using a lookup table. At least one outcome indicates the special mode is triggered, and at least one outcome indicates the special mode is not triggered.

Alternatively, the special mode can be triggered for only a subset of the instances of a process. For example, the decision about whether or not to trigger the special mode is only checked if an eligibility condition is first satisfied. The eligibility condition can depend on symbol instances that have landed for the instance (spin), as described below. Or, the eligibility condition can depend on other criteria.

The chance of triggering the special mode can change as bet amount changes. For example, the chance of triggering the special mode can increase as the bet amount increases. This can be implemented by using different lookup tables for different bet amounts, with the weights for the outcomes in the lookup tables changing for the different bet amounts.

Alternatively, instead of using an RNG event, the special feature can be triggered in some other way (e.g., landing a combination of symbol instances for a scatter symbol, or landing some other combination of symbol instances).

B. Adjusting Attributes of a Process to Ensure that Threshold Condition is Reached in Special Mode.

If the special mode is triggered, one or more attributes of a process can be adjusted before an instance of the process begins, so that the final outcome of the instance of the process necessarily satisfies a threshold condition for the final outcome in the special mode. The threshold condition depends on implementation. For example, the threshold condition is 50× a bet amount. After the adjustments are made to the process, the instance of the process continues. For example, symbol positions at which to stop reel strips are determined for the reel strips of reels, the final outcome of the instance is evaluated (e.g., using all-ways evaluation), and the final outcome is presented. In this way, the final outcome for the instance of the process can be made to satisfy the threshold condition without significantly increasing the computational complexity for the special mode, compared to the regular mode.

For example, one or more reels can be adjusted so that the final outcome of an instance of the process necessarily satisfies a threshold condition for the final outcome in the special mode. Reels can be adjusted in combination with enlarging the reel area or without enlarging the reel area.

Figure 4:
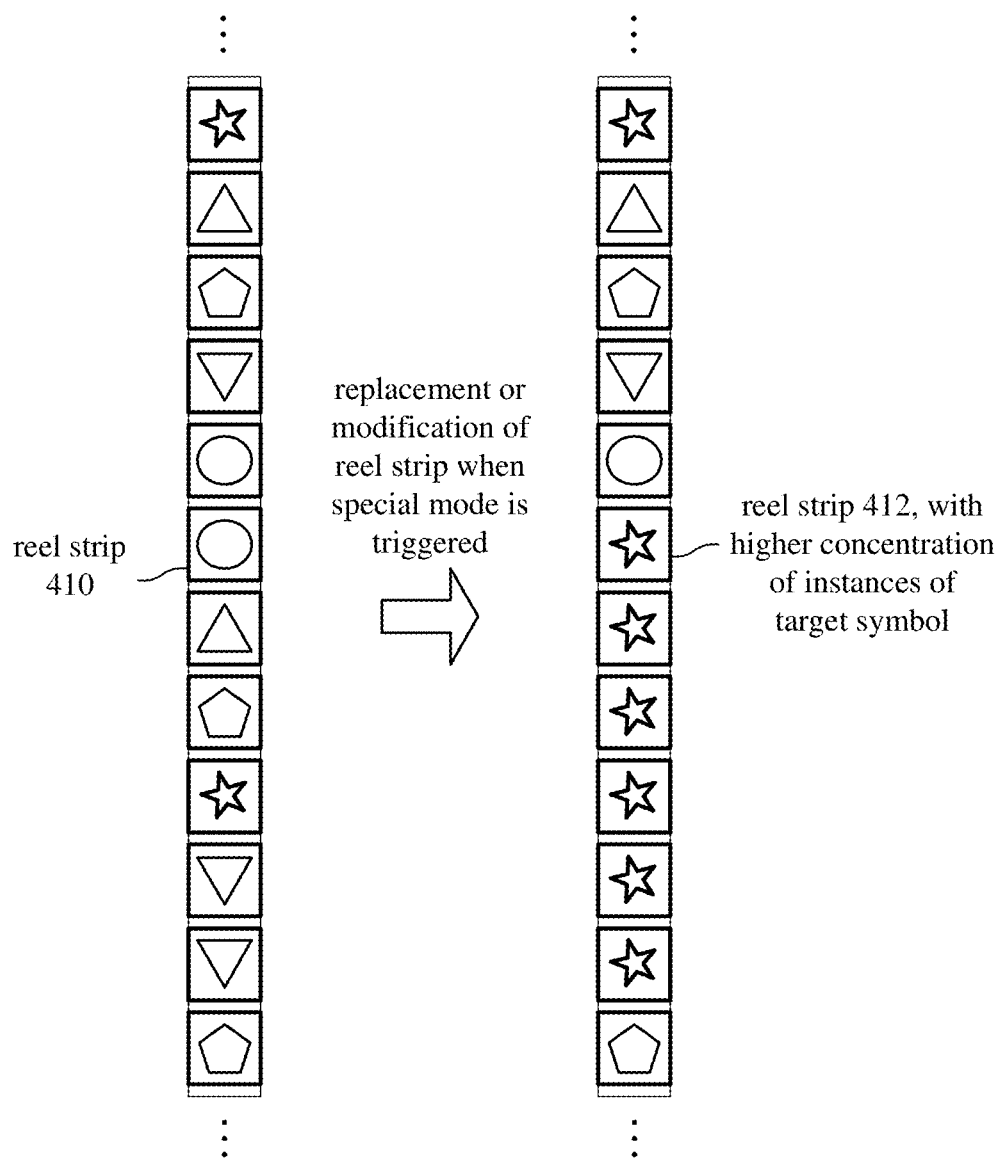
FIG. 4 is a diagram showing replacement or modification of a reel strip, when a special mode is triggered, to have a higher concentration of target symbol instances.

FIG. 4 shows an example 400 of replacement or modification of a reel strip, when a special mode is triggered, to have a higher concentration of instances of a target symbol. In FIG. 4, a reel strip 410 includes instances of a variety of symbols, including a target symbol (shown as a star). When the special mode is triggered, the reel strip 410 is modified or replaced, producing a reel strip 412 with a higher concentration of instances of the target symbol. The reel strip 410 can be modified by adding target symbol instances or replacing instances of other symbols in the reel strip with target symbol instances. For example, target symbol instances can be added at pre-defined locations in the reel strip 410. Alternatively, the reel strip 410 can be replaced by swapping in a different reel strip that has a higher concentration of target symbol instances.

In the example implementation described in section IV, reel strips for the reels of a regular mode of the base reel game are replaced with reel strips for the special mode. The reel strips for the special mode guarantee that a final outcome (award for all-ways evaluation) is at least a minimum amount. For example, for the first reel of the example implementation, the new reel strip includes clusters of target symbol instances spaced in the reel strip so that any spin of the first reel in the special mode lands with at least one target symbol instance showing in the reel area. For each of the other reels of the example implementation, the new reel strip includes clusters of target symbol instances spaced in the reel strip so that any spin of the reel in the special mode lances with at least two instances of the target symbol showing in the reel area. In particular, the new reel strip for each of the second, third, and fourth reels (which each show ten symbol positions in the enlarged reel area) includes at least one 9-high stacks of target symbol instances, as well as shorter stacks of target symbol instances. The new reel strip for the fifth reel (which still shows four symbol positions in the enlarged reel area) includes 3-high stacks of target symbol instances. For all-ways evaluation of possible paths across the reel area in the special mode, this configuration of reel strips guarantees at least 1×2×2×2×2=16 combinations of five instances of the target symbol, which satisfies the threshold condition for the final outcome of the spin in the special mode of the base reel game.

Figure 5B:
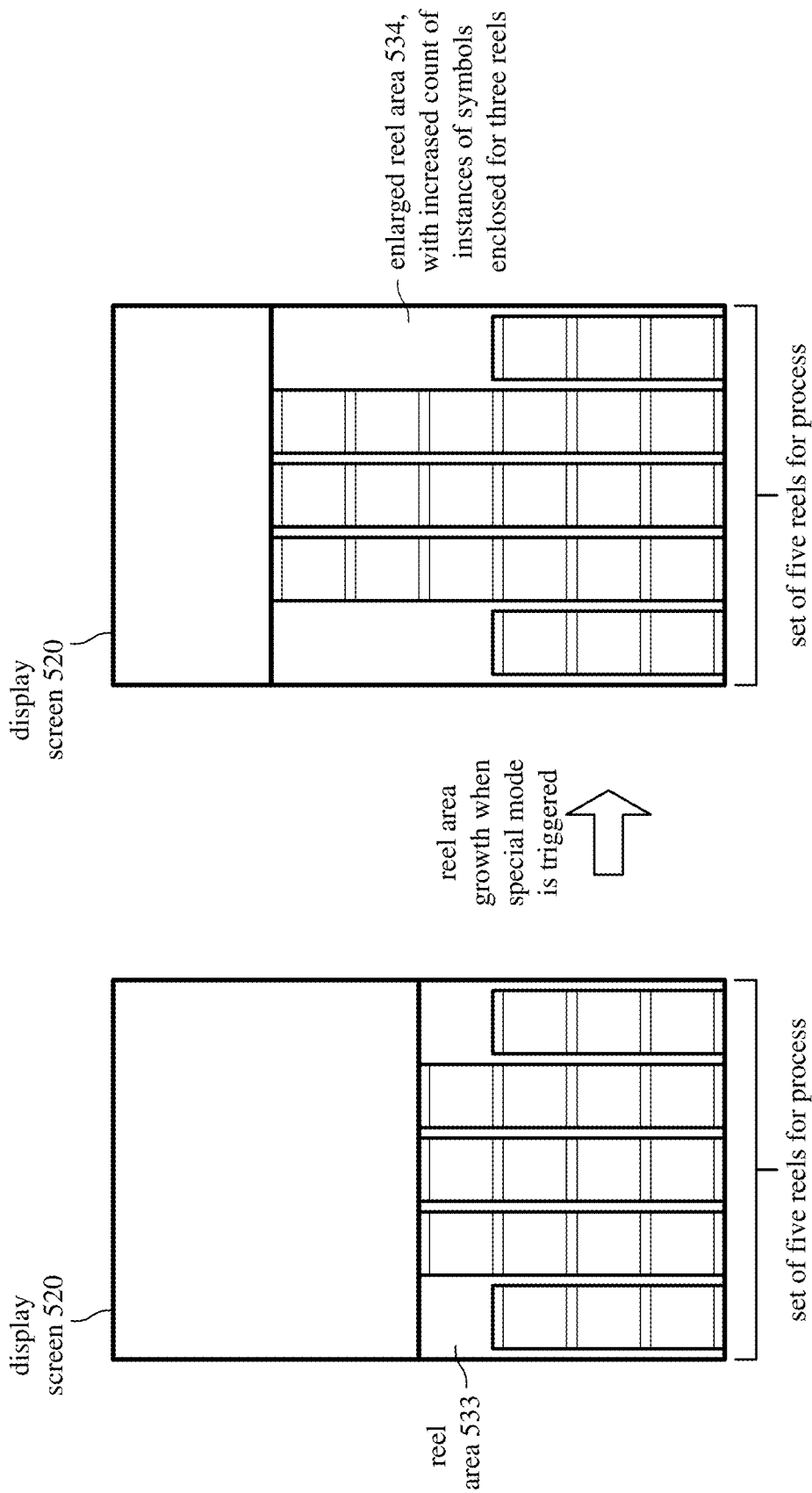
Figure 5C:
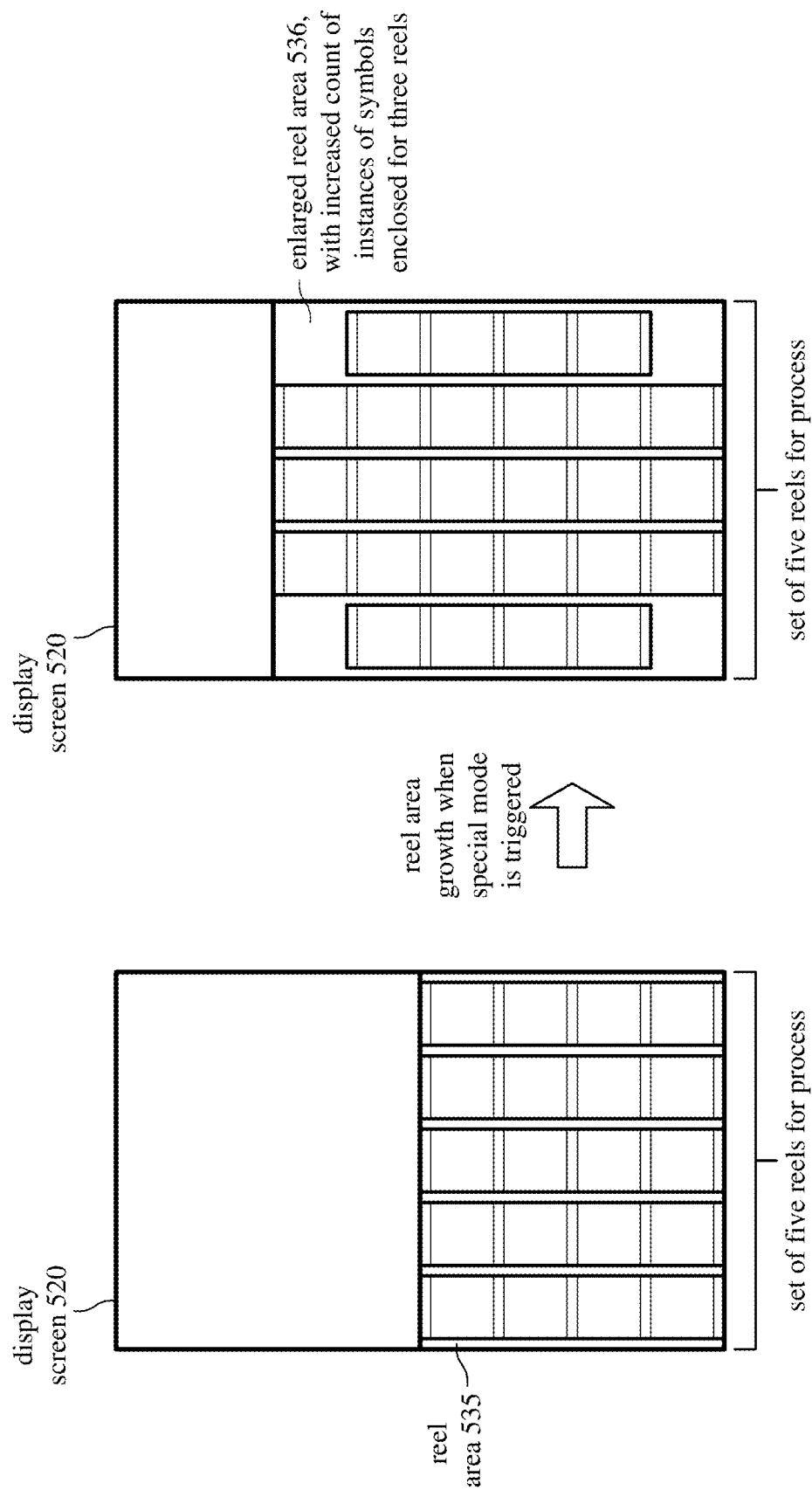

When the special mode is triggered, the reel area can be enlarged, so that the count of symbol instances enclosed is increased for at least some of the reels. FIGS. 5a-5c show examples of growth of a reel area on a display screen when a special mode is triggered for a base reel game. Enlarging the reel area, while also increasing the count of symbol instances enclosed in the reel area for at least some of the reels, provides a way to increase volatility for a target level of RTP. Outcome evaluation happens for the extended reel area. In particular, for all-ways evaluation, increasing the count of symbol instances enclosed in the reel area increases the number of paths evaluated, making higher awards more likely for the special mode.

FIG. 5a shows an example 501 of reel growth for a special mode. In FIG. 5a, a reel area 530 on a display screen 520 of an electronic gaming machine includes display positions for a set of five reels of a process. In a regular mode of the base reel game, the reel area 530 shows three display positions for each of the five reels. When the special mode is triggered, the reel area 530 grows. Specifically, the reel area 530 grows into an enlarged reel area 531 on the display screen 520 of the electronic gaming device. The enlarged reel area 530 encloses an increased count of instances of symbols for all of the reels.

In FIG. 5a, reel growth affects all reels in the reel area, and all reels have the same height in the reel area before and after the reel growth. Alternatively, reel growth can affect fewer than all of the reels in a reel area and/or different reels can grow by different amounts. FIG. 5b shows another example 502 of reel growth for a special mode. In FIG. 5b, a reel area 533 on a display screen 520 of an electronic gaming machine includes display positions for a set of five reels of a process, but the reels have different heights. In a regular mode of the base reel game, the reel area 533 shows three display positions for each of the first and last reels, and the reel area 533 shows four display positions for each of the middle three reels. When the special mode is triggered, the reel area 533 grows. Specifically, the reel area 430 grows into an enlarged reel area 534 on the display screen 520 of the electronic gaming device. The enlarged reel area 534 encloses an increased count of instances of symbols for the middle three reels, but the count of symbol instances is unchanged for the first reel and the last reel.

In FIGS. 5a and 5b, the growth of the reel area happens in one direction when the special mode is triggered. Alternatively, when the special mode is triggered, the reel area can grow in multiple directions. FIG. 5c shows another example 503 of reel growth for a special mode. In FIG. 5c, when the special mode is triggered, a reel area 535 on a display screen 520 of an electronic gaming machine grows upward and downward. To start, the reel area 535 includes four display positions for each of five reels of a process. The enlarged reel area 536 encloses an increased count of instances of symbols for the middle three reels, with the reel area 536 being enlarged upward and downward, but the count of symbol instances is unchanged for the first reel and the last reel.

In the example implementation described in section IV, in the regular mode of the base reel game, the reel as in a 4-6-6-6-4 configuration. The reel area encloses 4 symbol instances for a first reel, 6 symbol instances for each of a second reel, third reel, and fourth reel, and 4 symbol instances for a fifth reel. When the special mode is triggered, the reels transition to a 4-10-10-10-4 configuration. The reel area encloses 4 symbol instances for a first reel, 10 symbol instances for each of a second reel, third reel, and fourth reel, and 4 symbol instances for a fifth reel.

Aside from changing the reels and/or enlarging the reel area when the special mode is triggered, a defined number of credits can be awarded, as part of ensuring that a minimum amount is awarded for the special mode. The award of credits can depend on bet amount.

C. Screenshots of Example Implementation.

Figure 6A:
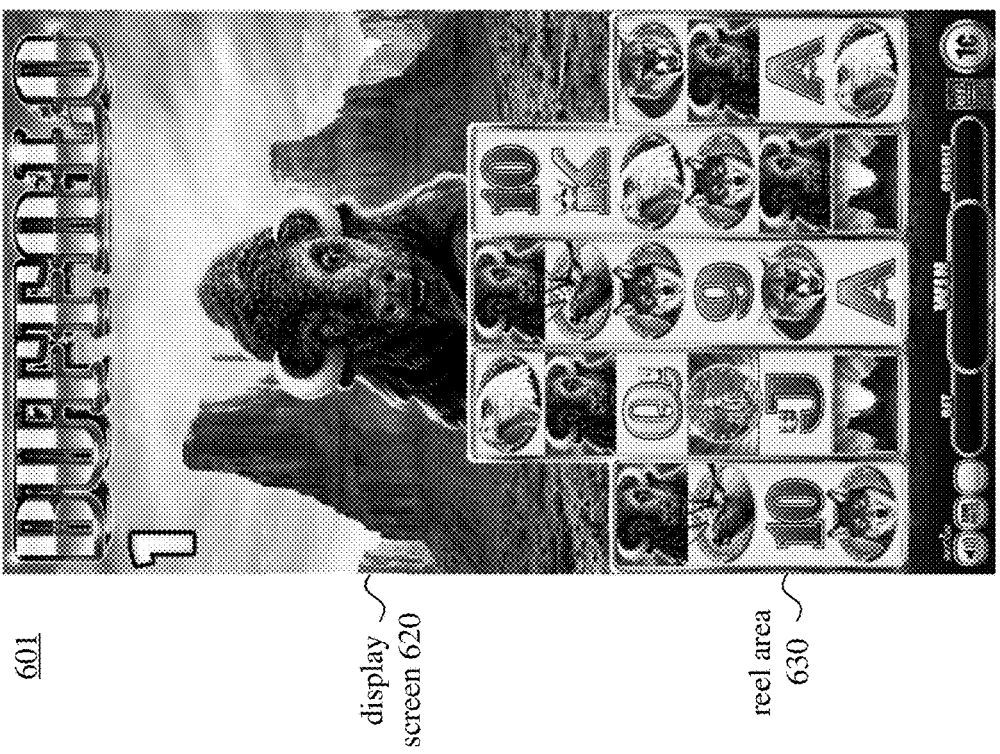
FIGS. 6a-6n are screenshots showing example stages of gameplay for a special mode, with a reel area growing for the special mode and reel strips having a higher concentration of target symbol instances for the special mode.
Figure 6B:
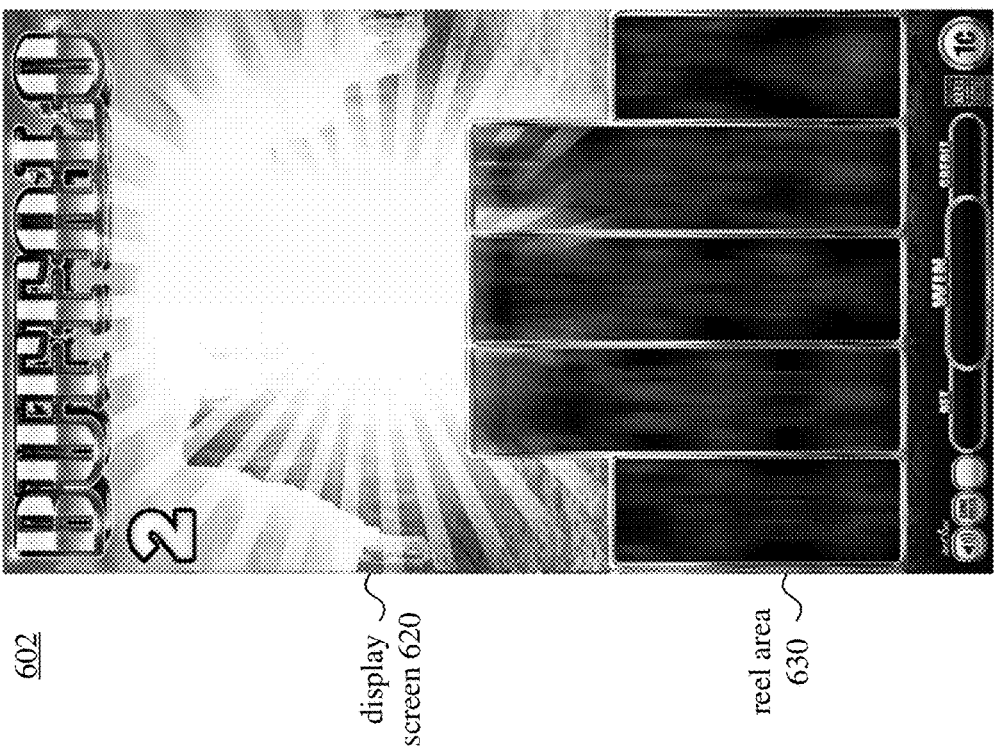
Figure 6D:
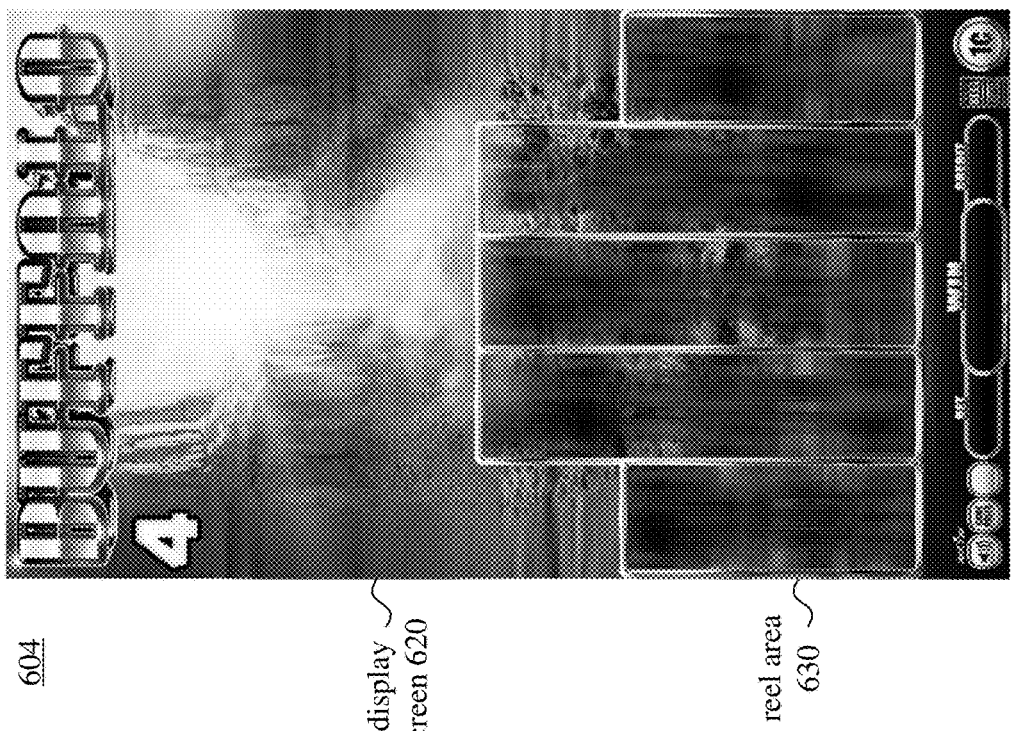
Figure 6C:
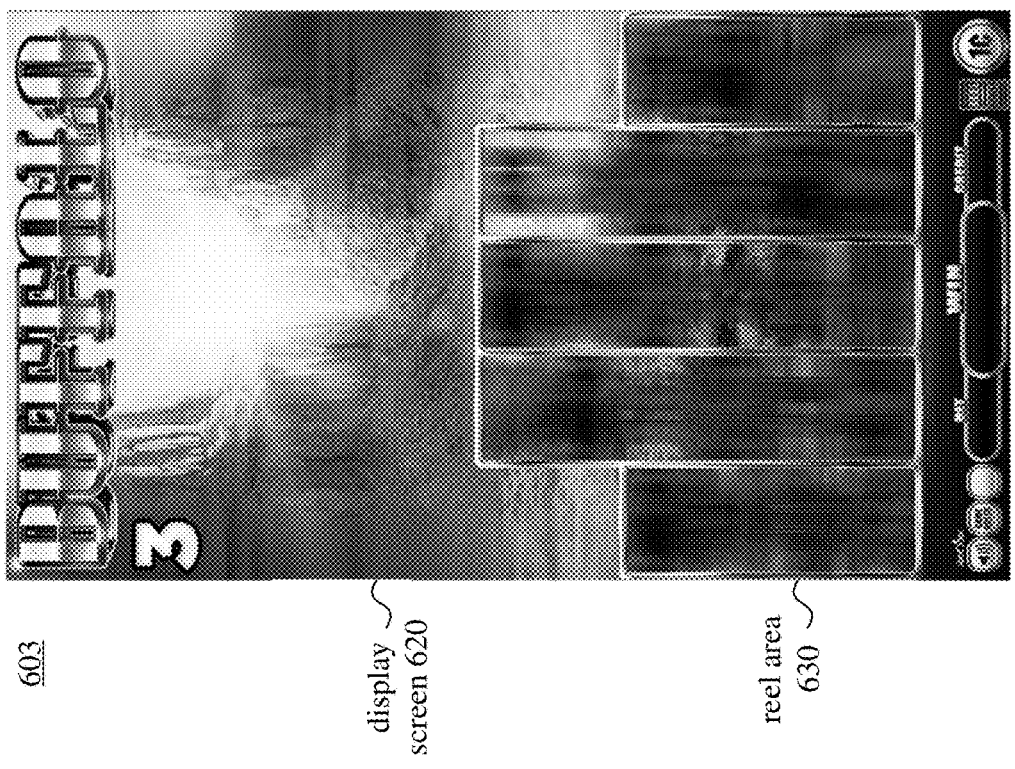
Figure 6E:
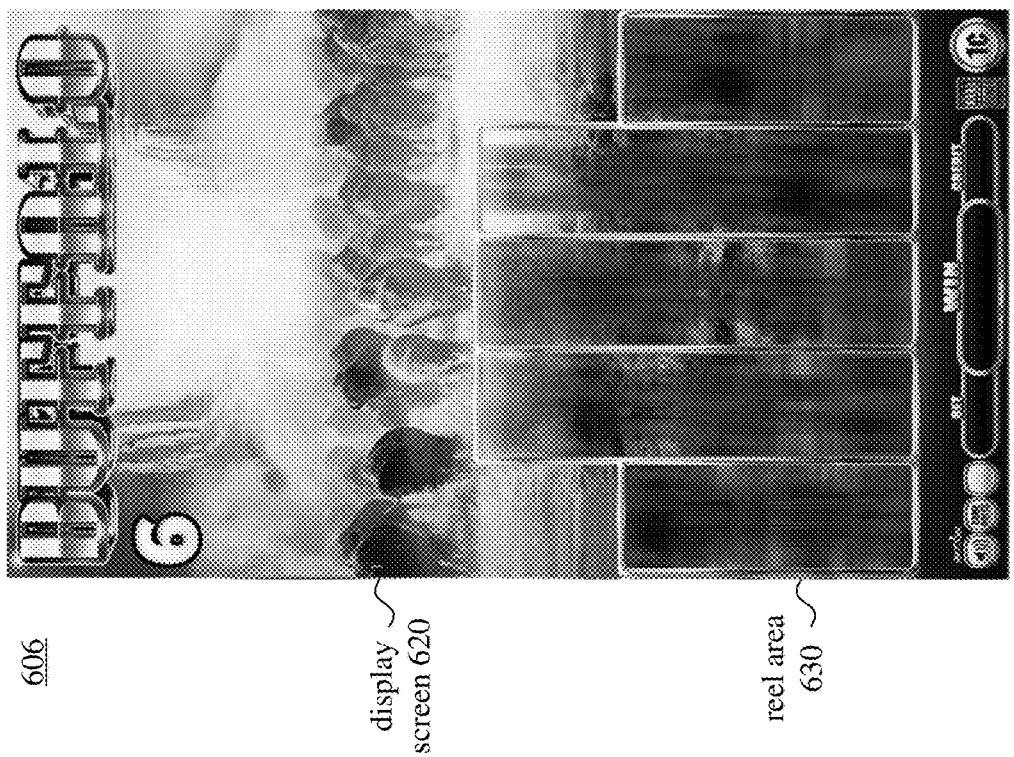
Figure 6F:
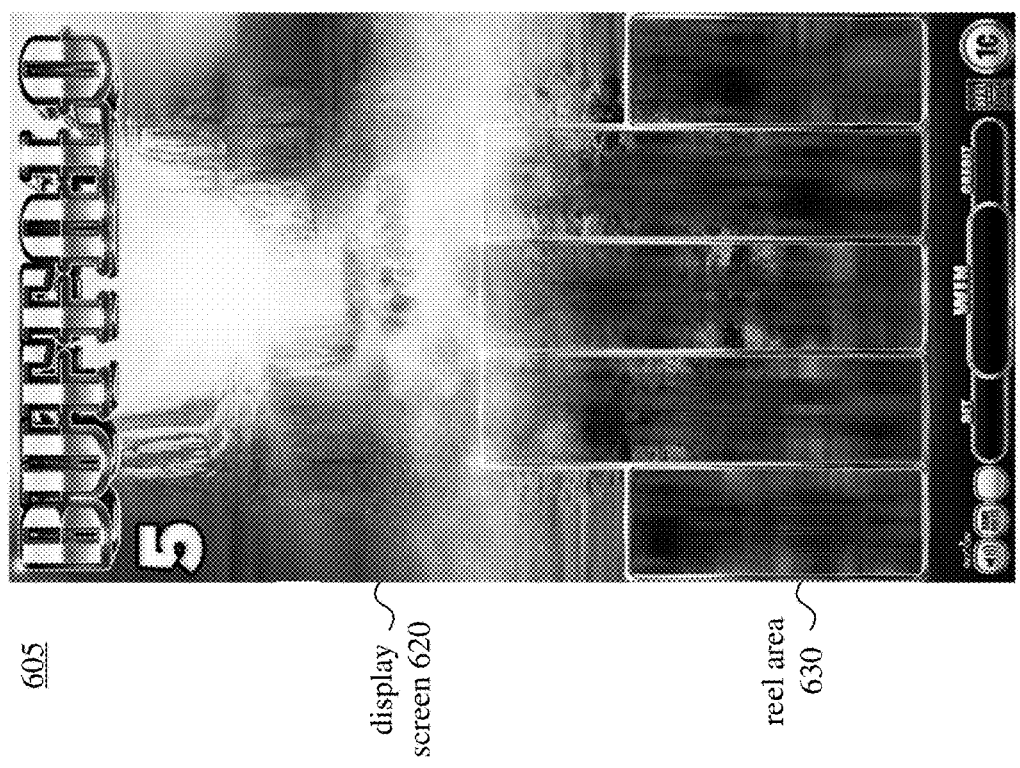
Figure 6H:
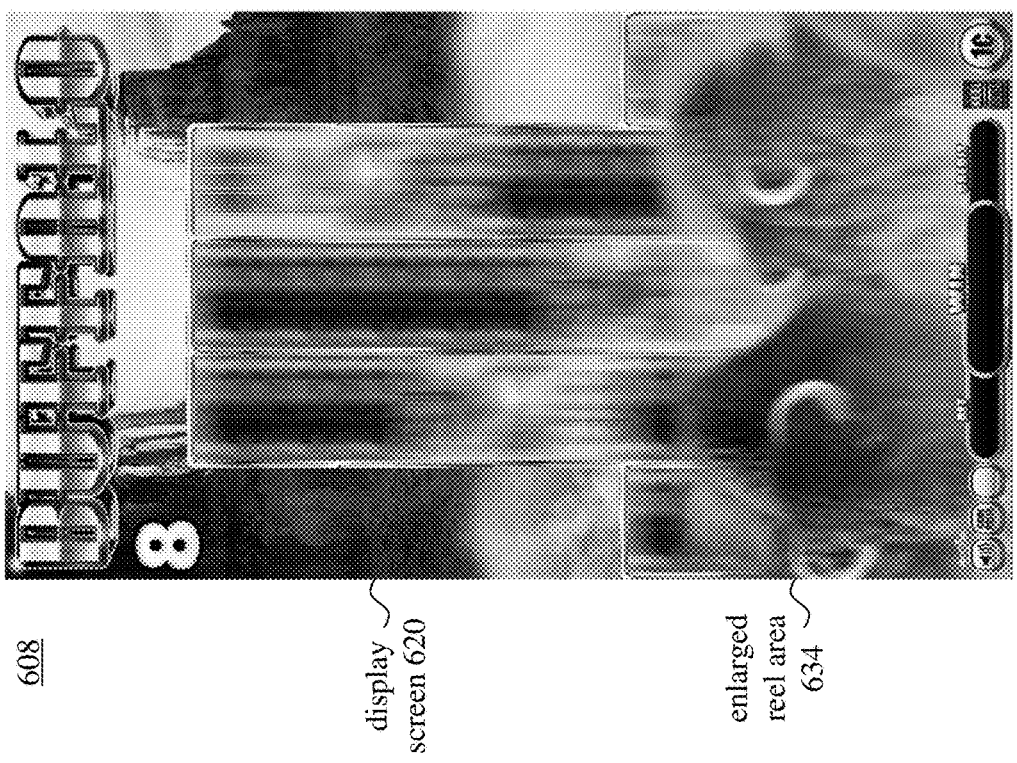
Figure 6G:
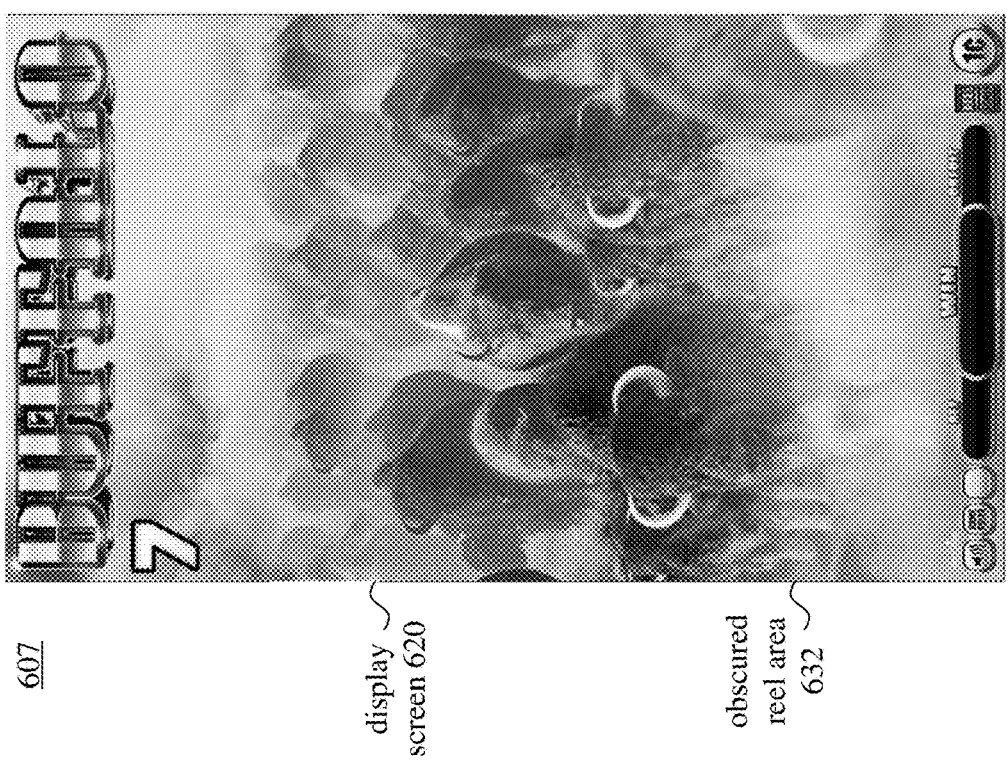
Figure 6J:
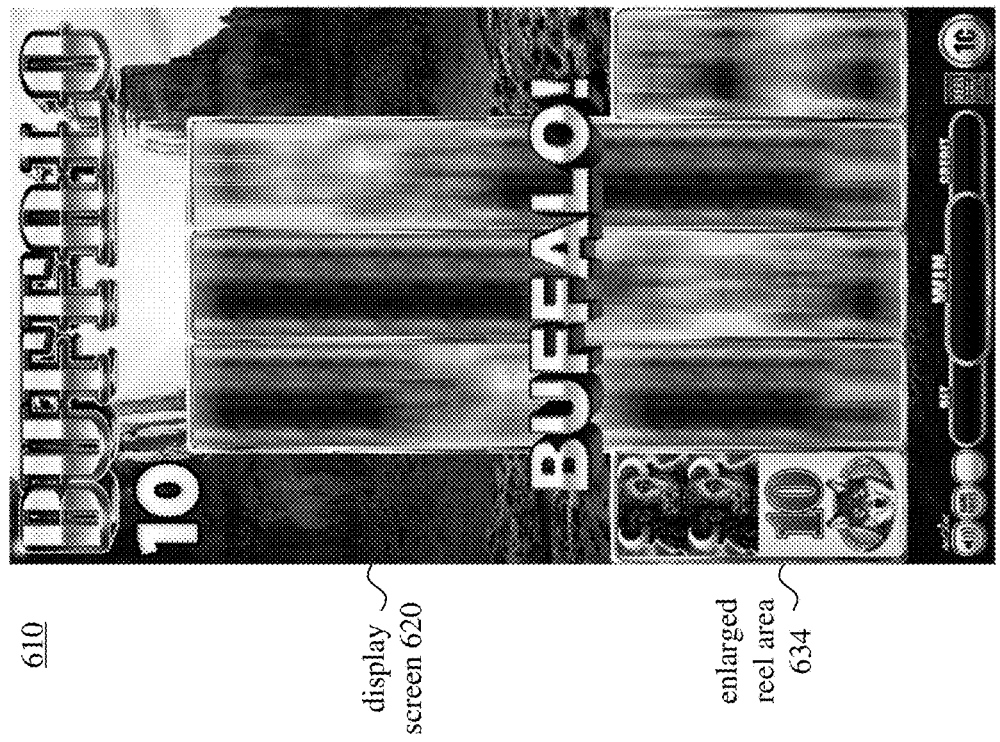
Figure 6I:
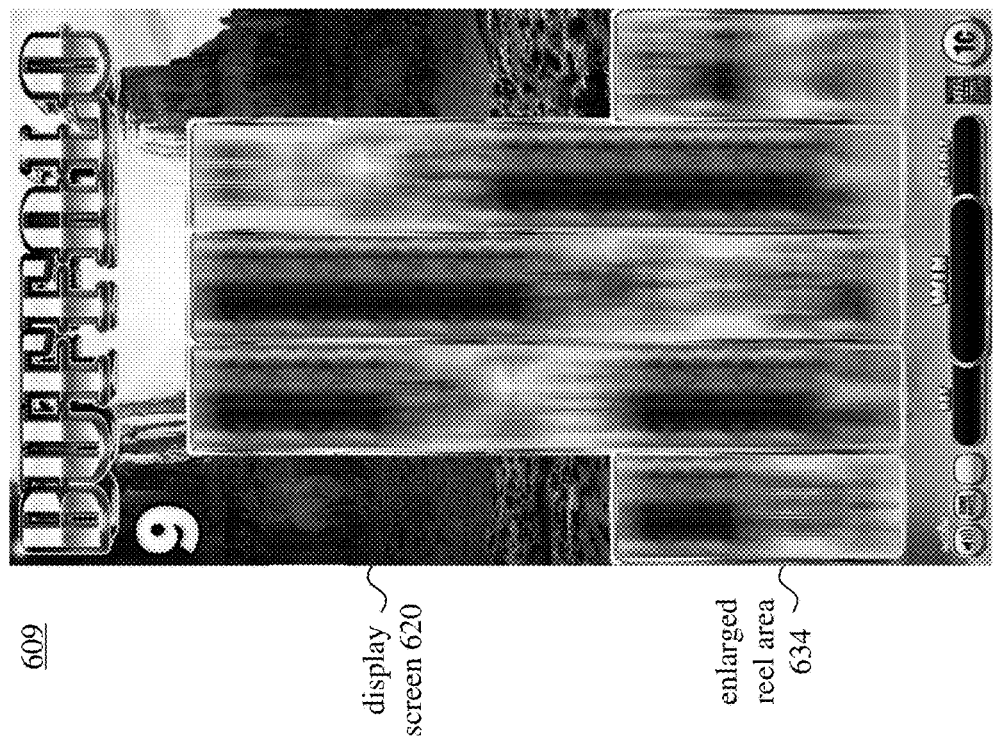
Figure 6L:
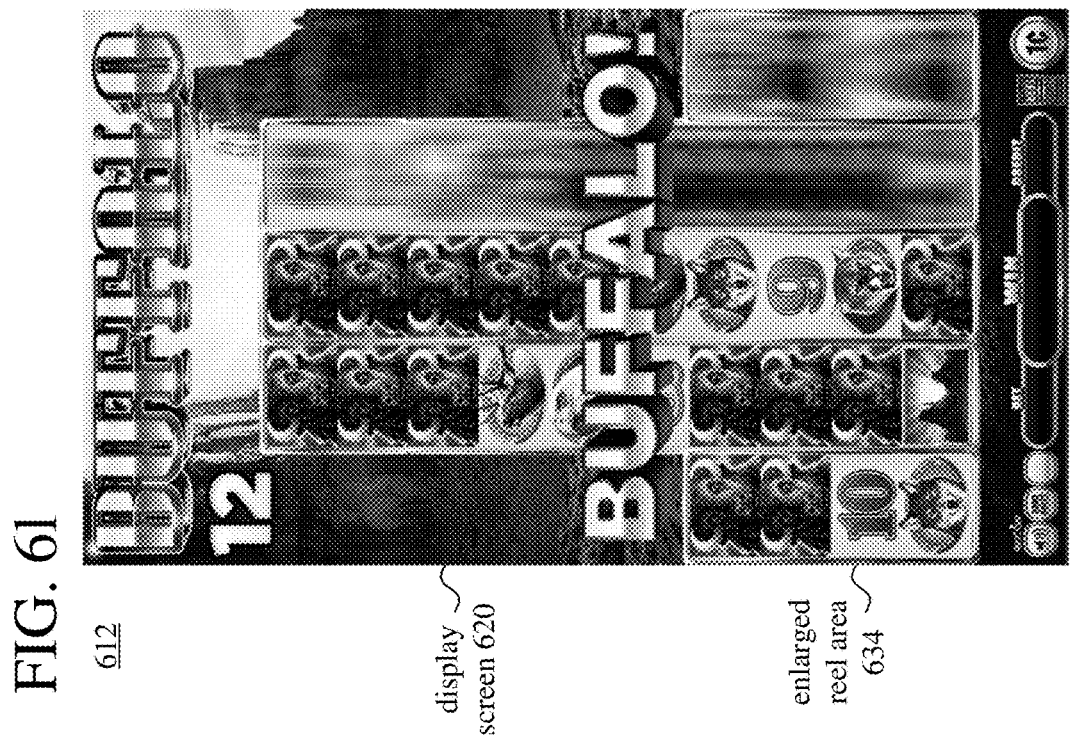
Figure 6K:
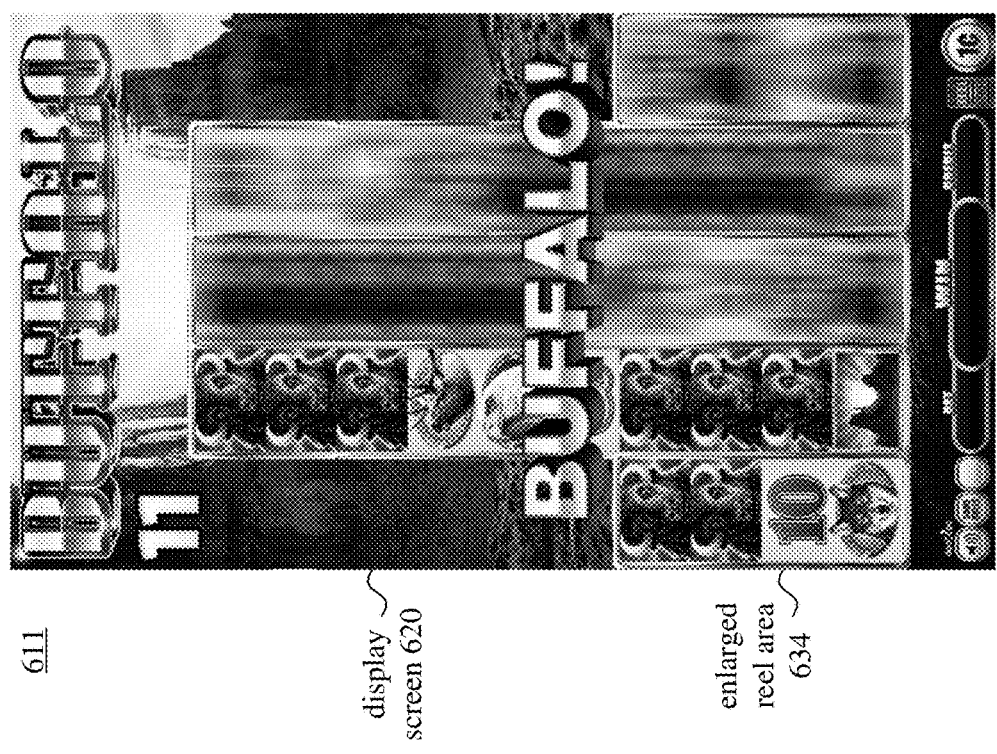
Figure 6N:
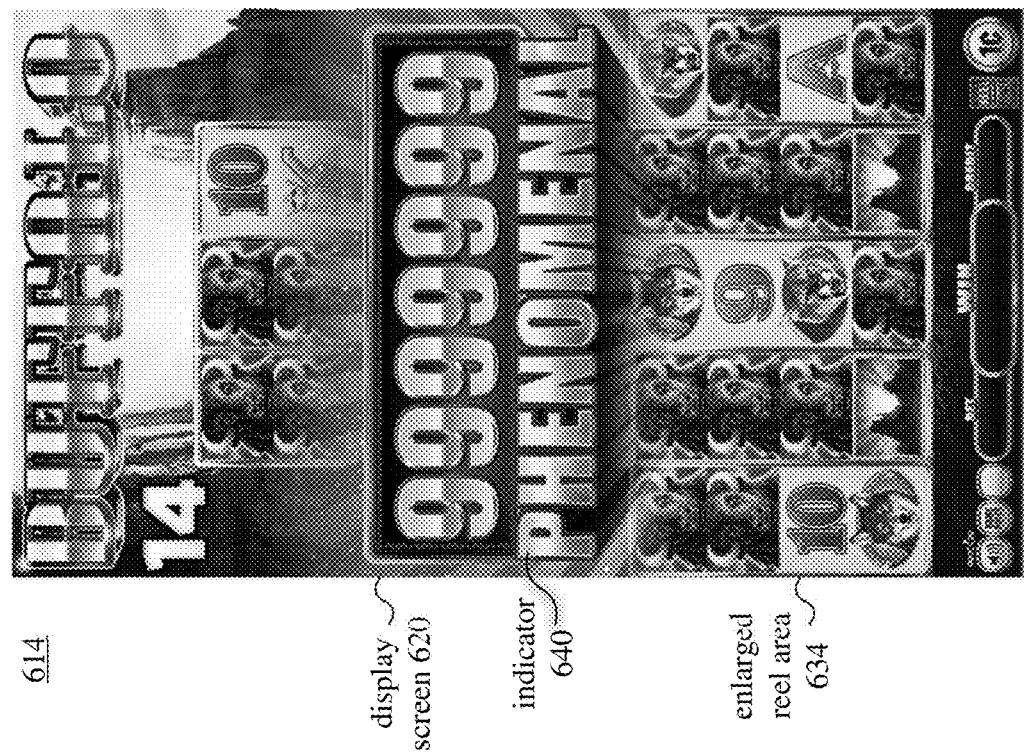
Figure 6M:
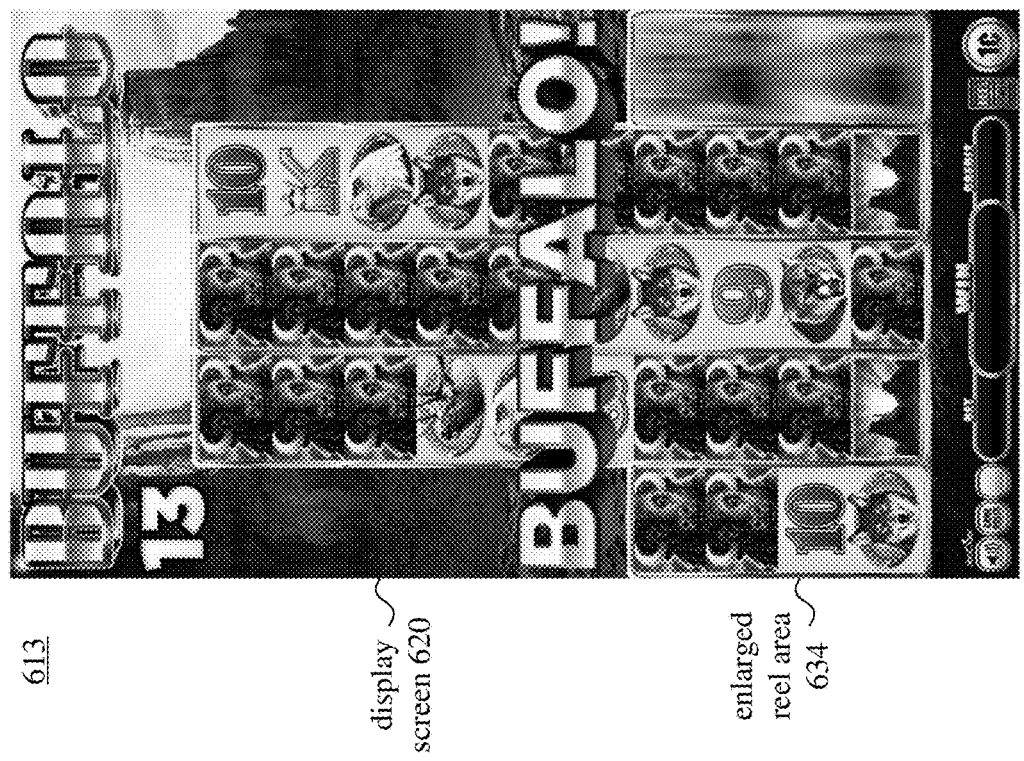

FIGS. 6a-6n show example stages of gameplay for a special mode in the example implementation described in section IV, with a reel area growing for the special mode and reel strips having a higher concentration of target symbol instances for the special mode. FIGS. 6a-6n show the example stages of gameplay on a display screen 620 for an electronic gaming device.

In the example screenshot 601 of FIG. 6a, the display screen 620 shows a reel area 630 for a regular mode of the base reel game. The enlarged reel area 630 shows five reels in a 4-6-6-6-4 configuration. In FIG. 6a, the reels of the base reel game are stopped in the reel area 630. The reel strips for the reels includes some instances of a target symbol (shown as a buffalo). The electronic gaming device receives user input from a player indicating the start of a spin of the base reel game. This, in turn, causes a decision to be made about whether or not the special mode is triggered. In the example implementation, the decision uses an RNG event, with the chance of the special mode being triggered increasing as the bet amount increases.

In the example screenshot 602 of FIG. 6b, the reels of the base reel game are shown spinning in the reel area 630, in response to the user input indicating the start of the spin. In addition, in response to a decision that the special mode is triggered, a transition animation starts for the special mode. The transition animation is accompanied by audible cues. In FIG. 6b, the transition animation affects the background shown on the display screen 620 (showing a flash) while darkening the reel area 630.

In the example screenshots 603-609 of FIGS. 6c-6i, the transition animation continues for the special mode, as the reels continue to spin. In particular, in the example screenshots 603-606 of FIGS. 6c-6f, the reel area 630 and other graphical elements on the display screen 620 shift horizontally and/or vertically to simulate shaking motion, and the electronic gaming device produces a low rumbling sound to simulate the sound of an approaching herd of buffalos. Also, a dust cloud grows in the background on the display screen 620. As the rumbling sound increases in volume, the background shows the herd of buffalos approaching, from the perspective of the player. In the example screenshot 607 of FIG. 6g, the herd of buffalos "stampedes" over the reels, obscuring the reel area 632. In the example screenshot 608 of FIG. 6h, an enlarged reel area 634 is revealed as the animation dissolves. In the example screenshot 609 of FIG. 6i, the transition animation finished. The enlarged reel area 634 shows five reels in a 4-10-10-10-4 configuration, with the reels still spinning in the enlarged reel area 634.

In the example screenshots 610-614 of FIGS. 6*j*-6*n*, the reels land in the enlarged reel area 634. As explained above, the reel strips for the reels in the special mode are different than the reel strips in the regular mode. The reel strips for the reels in the special mode include a higher concentration of instances of the target symbol (buffalo). The example screenshot 610 of FIG. 6*j* shows the first reel landed in the enlarged reel area. The reel strip for the first reel is configured so that at least one instance of the target symbol (buffalo) lands in the reel area 634 for the first reel. When the reel lands, the presence of at least one target symbol instance is emphasized graphically and audibly. Delays between times the respective reels land can further emphasize the target symbol instances. In the example screenshots 611-614 of FIGS. 6*k*-6*n*, the remaining reels successively land in the enlarged reel area 634. The reel strips for the remaining reels are configured so that at least two instances of the target symbol (buffalo) lands in the reel area 634 for each of the remaining reels. Finally, the final outcome of the special mode is evaluated using all-ways evaluation, and an indicator 640 of the final outcome is presented on the display screen 620, as shown in the example screenshot of FIG. 6*n*.

D. Alternative Approaches to Ensuring Threshold Reached in Special Mode.

In many of the examples described earlier in this section, when the special mode is triggered, the process is adjusted so that a final outcome necessarily satisfies a threshold condition for the final outcome in the special mode. For example, the process can be adjusted by changing the reels and/or enlarging the reel area. Or, the process can be adjusted by switching to an iterative evaluation mode in which candidate outcomes are successively evaluated until a suitable outcome is found. Alternatively, operations can be performed in a different order while still ensuring that a final outcome necessarily satisfies a threshold condition for the final outcome in the special mode.

In a first alternative approach, a multi-stage check is used, with an eligibility check followed by evaluation of an outcome for an instance of a process (e.g., a spin of a base reel game). When the instance of the process starts, a determination is made whether the instance of the process is eligible for the special mode (e.g., using an RNG event). If the instance is not eligible for the special mode, the instance of the process proceeds in a regular mode. If the instance is eligible for the special mode, a candidate outcome is determined for the instance of the process. The candidate outcome can be determined and evaluated using regular reel strips, for symbol instances enclosed in an enlarged reel area (e.g., reels in a 4-10-10-10-4 configuration). If the candidate outcome satisfies the threshold condition, the special mode is triggered, and the candidate outcome is used as the final outcome. If the candidate outcome does not satisfy the threshold condition, the special mode is not triggered, and another candidate outcome is evaluated using a regular reel area, for the regular mode. In this approach, outcome evaluations for the enlarged reel area are avoided except when the instance of the process is eligible for the special mode. Alternatively, if the instance is eligible for the special mode, a candidate outcome can be determined and evaluated using regular reel strips, for symbol instances enclosed in a regular reel area (e.g., reels in a 4-6-6-6-4 configuration), but such an evaluation might not accurately capture whether the threshold condition is satisfied for an enlarged reel area, or at least might require that winning combinations happen within the regular reel area. This alternative approach can be used in combination with the reel strip switching mechanism described above. If higher-RTP reel strips are selected, the eligibility condition for the special mode can be deemed satisfied, which saves computing resources that would otherwise be used to check the eligibility condition.

Or, in a second alternative approach, a multi-stage check is used. An evaluation of an outcome for an instance of a process (e.g., a spin of a base reel game) is followed by a check for whether or not to trigger the special mode (e.g., using an RNG event). After a candidate outcome is determined for an instance of a process (e.g., spin of a base reel game), a determination is made whether the candidate outcome satisfies the threshold condition. If the candidate outcome satisfies the threshold condition, a special mode trigger check is performed. On the other hand, if the candidate outcome does not satisfy the threshold condition, the special mode trigger check is skipped. This approach avoids the special mode trigger check in many cases. In this alternative approach, the candidate outcome can be evaluated using regular reels and a regular reel area. If the special mode is triggered, the same symbol positions at which to stop reel strips can be used in an enlarged reel area, yielding an outcome that is at least as good as the outcome for the regular reel area. This alternative approach can be used in combination with the reel strip switching mechanism described above. If higher-RTP reel strips are selected, the candidate outcome is more likely to satisfy the threshold condition.

E. Example Techniques for Ensuring Threshold Reached in Special Mode.

Figure 7A:
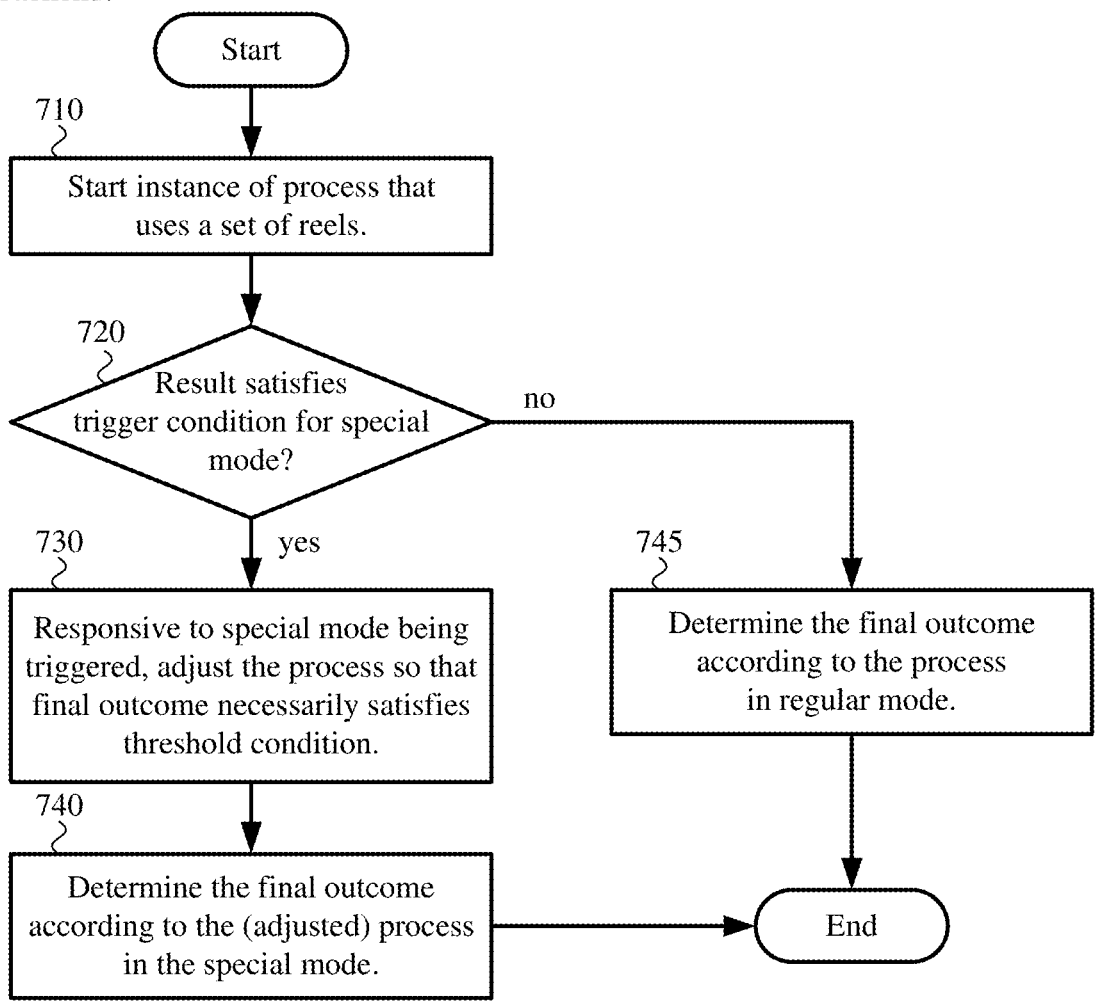
FIG. 7a is a flowchart showing an example technique for controlling the UI of an electronic gaming device, focusing on backend operations, for a special mode in which a final outcome necessarily satisfies a threshold condition.

FIGS. 7*a* and 7*b* show different aspects of controlling a user interface ("UI") of an electronic gaming device such as an electronic gaming machine ("EGM"), for a special mode in which a final outcome necessarily satisfies a threshold condition. In particular, FIG. 7*a* shows an example technique 700 for a special mode in which a final outcome necessarily satisfies a threshold condition, from the perspective of a backend. Operations of the example technique 700 shown in FIG. 7*a* can be performed, for example, in a game processing backend system 314 explained with reference to FIG. 3. FIG. 7*b* shows an example technique 750 for a special mode in which a final outcome necessarily satisfies a threshold condition, from the perspective of a UI frontend. Operations of the example technique 750 shown in FIG. 7*b* can be performed, for example, in a UI system 302 explained with reference to FIG. 3. FIGS. 7*c* and 7*d* show alternative techniques 701, 702 for a special mode in which a final outcome necessarily satisfies a threshold condition, from the perspective of a backend. The game processing backend system and UI system can be implemented using memory and one or more processors that are part of the electronic gaming device and/or part of a gaming system located remotely from the electronic gaming device. Depending on implementation, the backend system and UI system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

In general, the techniques 700-702, 750 shown in FIGS. 7*a*-7*d* use one or more reel areas on one or more display screens of an electronic gaming device. The reel area(s) can be displayed on a single display screen (e.g., main display screen, or secondary display screen). Or, the reel areas(s) can be split among multiple display screens (e.g., one reel area on a first display screen, and a reel area on a second display screen). The number of reel areas depends on implementation. As used herein, the term "game window" or "reel area" can be used interchangeably.

In the techniques 700-702, 750 shown in FIGS. 7a-7d, a special mode is selectively triggered for a process that uses a set of reels. Each of the reels has a reel strip, which for UI-focused operations can be displayed as spinning through a reel area on a display screen of the electronic gaming device upon a spin of the reel. In some implementations, the process is a base reel game. Alternatively, the process can be a supplemental feature or other type of process. The set of reels includes n reels, where n depends on implementation. For example, n is 3, 4, or 5.

In some implementations, the electronic gaming device is an EGM with video reels. Alternatively, the electronic gaming device is another type of electronic gaming device.

1. Example Backend Operations.

With reference to FIG. 7a, at stage 710, a backend system (such as the game processing backend system 314 described with reference to FIG. 3) starts an instance of a process that uses a set of reels.

At stage 720, the backend system determines whether or not a result satisfies a trigger condition for a special mode of the process. For example, the backend system generates a random number with an RNG and performs a lookup operation for the random number in a lookup table. The lookup table includes at least one entry indicating the trigger condition is satisfied and at least one entry indicating the trigger condition is not satisfied. Based at least in part on bet amount, the backend system can adjust the lookup table or select the lookup table from among multiple available lookup tables. In this way, the likelihood of the special mode being triggered can be adjusted, depending on bet amount. Alternatively, the backend system can determine whether or not a result satisfies the trigger condition for the special mode by determining whether or not a symbol combination is present in the reel area. Or, the backend system can determine whether or not a result satisfies the trigger condition for the special mode in some other way.

At stage 730, the backend system, responsive to the special mode being triggered, adjusts the process so that a final outcome of the instance of the process necessarily satisfies a threshold condition for the final outcome. For example, the backend system adjusts the process so that, for all-ways evaluation of instances of symbols enclosed in the reel area, the final outcome necessarily satisfies the threshold condition. The backend system can adjust the process by changing the set of reels. For at least one of the reels, the backend process can swap or modify the reel strip for the reel to include a higher concentration of target symbol instances. In some implementations, after the set of reels is changed, for a first reel of the set of reels, the reel area will necessarily enclose at least one target symbol instance upon a spin of the first reel, and for each other reel of the set of reels, the reel area will necessarily enclose at least two target symbol instances upon a spin of the other reel. Alternatively, the reels can be changed in some other way.

The backend system can also adjust the process by enlarging the reel area and, for at least some of the set of reels, increasing a count of instances of symbols that are enclosed in the reel area. In some implementations, for a first reel of the set of reels and for a last reel of the set of reels, the enlarged reel area encloses a first count of instances of symbols that is unchanged by the adjusting. For each of one or more interior reels of the set of reels, the enlarged reel area encloses a second count of instances of symbols that is increased as part of the adjusting. Alternatively, the reel area is enlarged in some other way.

The backend system can perform additional operations as part of the special mode. For example, when the reel strips for the reels of the process include dynamic symbols, the backend system can, for each reel of the set of reels, replace any instance of a placeholder in the reel strip for the reel with an instance of an actual symbol.

Finally, the backend system determines the final outcome according to the adjusted process if the special mode has been triggered (at stage 740) or determines the final outcome according to the process in regular mode (at stage 745) if the special mode has not been triggered). For example, the backend system determines the final outcome according to the all-ways evaluation of the instances of symbols enclosed in the reel area. When the set of reels for the process has been changed, the backend system determines the final outcome using the changed set of reels. When the reel area has been enlarged, the backend system determines the final outcome using symbol instances enclosed in the enlarged reel area. For example, to determine the final outcome, for each reel of the set of reels, the backend system generates a random number using an RNG and performs a lookup operation for the random number in a lookup table. The lookup table includes entries that indicate different symbol positions of the reel strip in use. With the lookup operation, the backend system determines one of the different symbol positions at which to stop the reel strip. The backend system then determines the final outcome based at least in part on the determined symbol positions of the reel strips for the reels, respectively.

Alternatively, the backend system can adjust the process (at stage 730) by switching to an iterative evaluation mode of the process. In this case, when the special mode has been triggered, the backend system can determine the final outcome (at stage 740) according to the adjusted process by iteratively evaluating candidate outcomes until it finds one that satisfies the threshold condition for the final outcome. In an iteration, the backend system determines a candidate outcome of the instance of the process evaluates the candidate outcome against the threshold condition for the final outcome. For example, for each reel of the set of reels, the backend system generates a random number using an RNG and performs a lookup operation for the random number in a lookup table. The lookup table includes entries that indicate different symbol positions of the reel strip for the reel. In this way, the backend system determines one of the different symbol positions at which to stop the reel strip for the reel. The candidate outcome is determined based at least in part on the determined symbol positions at which to stop the reel strips for the reels, respectively. The candidate outcome can be determined using an enlarged reel area and, for at least some of the set of reels, an increased count of instances of symbols that are enclosed in the reel area. Or, the candidate outcome can be determine using a regular reel area. In any case, if the candidate outcome satisfies the threshold condition for the final outcome, the backend system uses the candidate outcome as the final outcome. Otherwise (the candidate outcome not satisfying the threshold condition for the final outcome), for a new outcome as the candidate outcome, the backend system repeats the determining the candidate outcome for the instance of the process and the evaluating.

2. Example Frontend Operations.

With reference to FIG. 7b, at stage 760, a UI system (such as the UI system 302 described with reference to FIG. 3) receives user input at the electronic gaming device. The user input indicates a start to an instance of a process that uses a set of reels. The process is associated with graphical elements for display.

At stage 770, the UI system determines whether or not a special mode of the process has been triggered. The special mode can be triggered using any of the approaches described with reference to FIG. 7a.

At stage 780, based on the special mode having been triggered, the UI system changes one or more of the graphical elements associated with the process. At this point, the process has been adjusted so that a final outcome of the instance of the process necessarily satisfies a threshold condition for the final outcome. For example, the process has been adjusted so that, for all-ways evaluation of instances of symbols enclosed in the reel area, the final outcome necessarily satisfies the threshold condition. The UI system can change the set of reels by, for at least one of the reels, swapping or modifying the reel strip for the reel to include a higher concentration of target symbol instances. In some implementations, after the set of reels is changed, for a first reel of the set of reels, the reel area will necessarily enclose at least one target symbol instance upon a spin of the first reel, and for each other reel of the set of reels, the reel area will necessarily enclose at least two target symbol instances upon a spin of the other reel. Alternatively, the reels can be changed in some other way.

The UI system can also enlarge the reel area and, for at least some of the set of reels, increase a count of instances of symbols that are enclosed in the reel area. In some implementations, for a first reel of the set of reels and for a last reel of the set of reels, the enlarged reel area encloses a first count of instances of symbols that is unchanged by the adjusting. For each of one or more interior reels of the set of reels, the enlarged reel area encloses a second count of instances of symbols that is increased as part of the adjusting. Alternatively, the reel area is enlarged in some other way.

The UI system displays, using the graphical elements for the adjusted process in the special mode if the special mode has been triggered (at stage 790) or using the graphical elements for the process in regular mode if the special mode has not been triggered (at stage 795), indicators of the instance of the process and the final outcome (which has been determined, e.g., according to the all-ways evaluation of instances of symbols enclosed in the reel area). For example, when the special mode has been triggered, the UI system displays the reel area in a first configuration (e.g., with the reels in a 4-6-6-6-4 configuration), then displays an animation that obscures the reel area. The UI system subsequently displays the reel area in a second configuration, different than the first configuration, that incorporates the changed graphical element(s). Finally, the UI system displays an indicator of the final outcome. Alternatively, the UI system displays the indicators of the instance of the process and the final outcome in some other way.

3. First Alternative Backend Operations.

FIG. 7c shows operations for an alternative technique 701 for a special mode in which a final outcome necessarily satisfies a threshold condition, where the decision about whether the special mode is triggered happens only after a determination of eligibility for the special mode. With reference to FIG. 7c, at stage 710, a backend system (such as the game processing backend system 314 described with reference to FIG. 3) starts an instance of a process that uses a set of reels.

At stage 721, the backend system determines whether or not a result satisfies a trigger condition for eligibility for a special mode of the process. For example, the backend system generates a random number using an RNG and performs a lookup operation for the random number in a lookup table. The lookup table includes at least one entry indicating the trigger condition can be satisfied (eligible) and at least one entry indicating the trigger condition cannot be satisfied (not eligible). Based at least in part on bet amount, the backend system can adjust the lookup table or select the lookup table from among multiple available lookup tables. In this way, the likelihood of eligibility for the special mode can be adjusted, depending on bet amount. Alternatively, the backend system can determine whether or not a result satisfies the trigger condition for eligibility for the special mode in some other way.

Responsive to a determination of eligibility for the special mode of the process, the backend system determines (at stage 722) a candidate outcome of the instance of the process and evaluates (at stage 723) the candidate outcome against a threshold condition for a final outcome of the instance of the process (e.g., for all-ways evaluation of instances of symbols enclosed in the reel area). Based at least in part on a result of the evaluating, the backend system determines (at stage 724) whether or not to trigger the special mode. At stage 741, responsive to the special mode being triggered, the backend system determines the final outcome in the special mode (e.g., according to the all-ways evaluation of instances of symbols enclosed in the reel area). Otherwise, responsive to the special mode not being triggered, or responsive to a determination of non-eligibility for the special mode, the backend system determines (at stage 746) the final outcome in the regular mode (e.g., according to the all-ways evaluation of instances of symbols enclosed in the reel area).

For example, to determine the candidate outcome (at stage 722), for each reel of the set of reels, the backend system generates a random number using and RNG and performs a lookup operation for the random number in a lookup table. The lookup table includes entries that indicate different symbol positions of a reel strip for the reel. In this way, the backend system determines one of the different symbol positions at which to stop the reel strip for the reel. The candidate outcome is determined based at least in part on the determined symbol positions at which to stop the reel strips for the reels, respectively. The candidate outcome can be determined using an enlarged reel area and, for at least some of the set of reels, an increased count of instances of symbols that are enclosed in the reel area. In this case, the determining the final outcome in the special mode uses the candidate outcome as the final outcome. Alternatively, the candidate outcome can be determined using a regular reel area. In this case, when the special mode is triggered, the final outcome can be determined in the special mode (a) based at least in part on the determined symbol positions at which to stop reel strips for the reels, respectively, (b) using an enlarged reel area, and (c) for at least some of the set of reels, an increased count of symbols that are enclosed in the reel area.

According to the approach shown in FIG. 7c, responsive to the determination of eligibility for the special mode of the process and/or responsive to the candidate outcome satisfying the threshold condition, the backend system can adjust the process. The backend system can adjust the process by changing the set of reels. For at least one of the reels, the backend process can swap or modify the reel strip for the reel to include a higher concentration of target symbol instances. In some implementations, after the set of reels is changed, for a first reel of the set of reels, the reel area will necessarily enclose at least one target symbol instance upon a spin of the first reel, and for each other reel of the set of reels, the reel area will necessarily enclose at least two target symbol instances upon a spin of the other reel. Alternatively, the reels can be changed in some other way. The backend system can also adjust the process by enlarging the reel area and, for at least some of the set of reels, increasing a count of instances of symbols that are enclosed in the reel area. In some implementations, for a first reel of the set of reels and for a last reel of the set of reels, the enlarged reel area encloses a first count of instances of symbols that is unchanged by the adjusting. For each of one or more interior reels of the set of reels, the enlarged reel area encloses a second count of instances of symbols that is increased as part of the adjusting. Alternatively, the reel area is enlarged in some other way.

4. Second Alternative Backend Operations.

FIG. 7d shows operations for an alternative technique 702 for a special mode in which a final outcome necessarily satisfies a threshold condition, where the decision about whether the special mode is triggered happens only after a determination that a candidate outcome would satisfy the threshold condition. With reference to FIG. 7d, at stage 710, a backend system (such as the game processing backend system 314 described with reference to FIG. 3) starts an instance of a process that uses a set of reels.

The backend system determines (at stage 725) a candidate outcome of the instance of the process and evaluates (at stage 726) the candidate outcome against a threshold condition for a final outcome of the instance of the process (e.g., for all-ways evaluation of instances of symbols enclosed in the reel area). For example, to determine the candidate outcome (at stage 725), for each reel of the set of reels, the backend system generates a random number using an RNG and performs a lookup operation for the random number in a lookup table. The lookup table includes entries that indicate different symbol positions of a reel strip for the reel. In this way, the backend system determines one of the different symbol positions at which to stop the reel strip for the reel. The candidate outcome is determined based at least in part on the determined symbol positions at which to stop the reel strips for the reels, respectively. The candidate outcome can be determined using an enlarged reel area and, for at least some of the set of reels, an increased count of instances of symbols that are enclosed in the reel area. (In this case, later operations to determine the final outcome in the special mode use the candidate outcome as the final outcome.) Alternatively, the candidate outcome can be determined using a regular reel area. (In this case, when the special mode is triggered, the final outcome can be subsequently determined in the special mode (a) based at least in part on the determined symbol positions at which to stop the reel strips for the reels, respectively, (b) using an enlarged reel area, and (c) for at least some of the set of reels, an increased count of symbols that are enclosed in the reel area.)

At stage 727, the backend system determines whether or not the candidate outcome satisfies the threshold condition. If so, responsive to the candidate outcome satisfying the threshold condition, the backend system determines (at stage 728) whether or not a result satisfies a trigger condition for a special mode of the process. For example, the backend system generates a random number using an RNG and performs a lookup operation for the random number in a lookup table. The lookup table includes at least one entry indicating the trigger condition is satisfied and at least one entry indicating the trigger condition is not satisfied. Based at least in part on bet amount, the backend system can adjust the lookup table or select the lookup table from among multiple available lookup tables. In this way, the likelihood of the special mode being triggered can be adjusted, depending on bet amount. Alternatively, the backend system can determine whether or not a result satisfies the trigger condition for the special mode by determining whether or not a symbol combination is present in the reel area (e.g., a count of instances of one or more scatter symbols). Or, the backend system can determine whether or not a result satisfies the trigger condition for the special mode in some other way.

At stage 741, responsive to the special mode being triggered, the backend system determines the final outcome in the special mode (e.g., according to the all-ways evaluation of instances of symbols enclosed in the reel area). Otherwise, responsive to the special mode not being triggered, or responsive to a determination of non-eligibility for the special mode, the backend system determines (at stage 746) the final outcome in the regular mode (e.g., according to the all-ways evaluation of instances of symbols enclosed in the reel area).

According to the approach shown in FIG. 7d, responsive to the candidate outcome satisfying the threshold condition and/or responsive to the special mode being triggered, the backend system can adjust the process. The backend system can adjust the process by changing the set of reels. For at least one of the reels, the backend process can swap or modify the reel strip for the reel to include a higher concentration of instances of a target symbol. In some implementations, after the set of reels is changed, for a first reel of the set of reels, the reel area will necessarily enclose at least one target symbol instance upon a spin of the first reel, and for each other reel of the set of reels, the reel area will necessarily enclose at least two target symbol instances upon a spin of the other reel. Alternatively, the reels can be changed in some other way. The backend system can also adjust the process by enlarging the reel area and, for at least some of the set of reels, increasing a count of instances of symbols that are enclosed in the reel area. In some implementations, for a first reel of the set of reels and for a last reel of the set of reels, the enlarged reel area encloses a first count of instances of symbols that is unchanged by the adjusting. For each of one or more interior reels of the set of reels, the enlarged reel area encloses a second count of instances of symbols that is increased as part of the adjusting. Alternatively, the reel area is enlarged in some other way.

F. Examples of Integration into Electronic Gaming Devices.

Innovations described herein can be implemented in a gaming server 102 and/or gaming device 104A, 104B, 104C, 104X, 200 described with reference to FIGS. 1 and 2. Thus, a gaming server 102 or gaming device 104A, 104B, 104C, 104X, 200 is an example of an electronic gaming device as described in section V.

For example, for the electronic gaming device, a game controller such as a game controller 202 described with reference to FIG. 2 can perform operations for a special mode in which a final outcome necessarily satisfies a threshold condition. In some implementations, the game controller 202 performs backend operations as well as frontend UI operations. With respect to frontend UI operations, the game controller 202 can receive user input indicating a start to an instance of a process that uses a set of reels. Further, based on the special mode being triggered, the game controller 202 can adjust graphical elements for the process (e.g., reel strips, reel area). The game controller 202 can also control display of indicators of the instance of the process and final outcome. With respect to backend operations, the game controller 202 can start an instance of a process that uses a set of reels and determine whether a result satisfies a trigger condition for a special mode. When the special mode is triggered, the game controller 202 can adjust the process so that a final outcome of the instance of the process necessarily satisfies a threshold condition, and determine the final outcome.

Innovations described in section V can be implemented in a game processing pipeline that follows the example game processing architecture 300 described with reference to FIG. 3. As described with reference to FIG. 3, RNG conversion engine 320 utilizes one or more lookup tables 322A-322N. In the context of the innovations described herein, for example, one or more of the lookup tables 322A-322N can be used to determine whether or not a special mode is triggered, to determine symbol positions at which to stop reel strips, and/or to determine other results. In some variations, different lookup tables can be used, so as to adjust the likelihood of specific results depending on bet amount.

In general, the example game processing architecture 300 shown in FIG. 3 can be used to process game play instructions and generate outcomes. In some implementations, the game processing architecture 300 implements a game processing pipeline for a process (e.g., base reel game). The UI system 302 (e.g., the game play UI 304 of the UI system 302) receives user input that indicates a start to an instance of a process that uses a set of reels. The backend system 314 starts an instance of the process. For the instance of the process, the UI system 302 (e.g., the game play UI 304) makes one or more RNG calls to the game processing backend system 314. In response, the backend system 314 performs various operations. Using a gaming RNG 318, the RNG engine 316 generates one or more random numbers, which are passed to the RNG conversion engine 320. The RNG conversion engine 320, using one or more of the random number(s) and one or more of the lookup tables 322A-322N, determine whether a special mode is triggered. Responsive to the special mode being triggered, the backend system 314 adjusts the process for the special mode (e.g., changing reel strips for the reels, enlarging a reel area) and determines symbol positions at which to stop reel strips for the reels. After determining the symbol positions at which to stop the reel strips for the reels, the backend system 314 determines an outcome (e.g., calculating win conditions for all-ways evaluation). The backend system 314 returns the generated results to the game play UI 304 of the UI system 302, which can, among other operations, change graphical elements for the process and control display of indicators of the instance of the process and final outcome.

In general, the generated results returned by the backend system 314 can include game-related information (such as symbol positions at which to stop reel strips for the respective reels, outcomes) as well as animation effects not related to game parameters. Alternatively, the game play UI 304 can make one or more separate RNG calls to the backend system 314 to determine animation effects. In response, the backend system 314 can use the gaming RNG 318 and/or one or more of the non-gaming RNGs 319A-319N to generate random numbers, which the RNG conversion engine 320 uses (with one or more of the lookup tables 322A-322N) to determine animation effects. The game play UI 304 (or bonus game play UI 308) can perform operations consistent with the animation effects, which are returned from the backend system 314.

G. Technical Advantages.

Approaches described herein address the technical problem of controlling volatility for a target level of RTP in an electronic gaming device. The approaches provide ways to achieve a desired volatility of a base reel game without significantly deviating from a designated level of RTP for the base reel game.

In particular, in some implementations, for a special mode of the base reel game, the base reel game is adjusted so that a final outcome necessarily satisfies a threshold condition (e.g., a minimum award for the special mode, for all-ways evaluation of instances of symbols enclosed in a reel area). The adjustments can include changes to reel strips and/or enlarging a reel area for the special mode of the base reel game. In terms of technical effects, innovative features of a special mode represent improvements in the technical area of electronic gaming software and provide new technology, in that they provide a computationally-effective way to manage volatility for a designated level of RTP for the special mode. Furthermore, by managing lookup tables and/or other aspects of RNG events for the special mode, game play can be kept fair and consistent with regulations while also enabling variation of volatility for the designated level of RTP. Also, UI-focused operations for the special mode can improve the usability of electronic gaming devices by enhancing the user experience for players, extending player time on the electronic gaming devices, and maintaining the interest of current players in the electronic gaming devices. These embodiments are thus not merely new game rules or new display patterns.

VI. Examples of Re-spin Series.

This section describes innovations for a linked reel strip mechanism that can be used to switch reel strips when iteratively spinning a reel in a re-spin series, as well as other mechanisms that can be used to adapt a reel strip when iteratively spinning a reel in a re-spin series. The linked reel strip mechanism uses one or more data structures for reel strips of a reel strip group. The reel strips are linked, in the data structure(s), using multiple logical links. For each of one or more iterations of a re-spin series, a current reel strip is selected (from among the reel strips of the reel strip group) by traversing the data structure(s). In particular, after a symbol position for a given reel strip is selected in one iteration of the re-spin series, the next reel strip to use in a subsequent iteration of the re-spin series is determined, and the next reel strip is missing the symbol position selected from the given reel strip. This approach simulates sampling without replacement for iterative spins of a reel using a reel strip with multiple symbol positions. The linked reel strip mechanism is a computationally-effective way to switch reel strips when iteratively spinning a reel, which provides a useful tool for managing volatility for a target level of RTP in an electronic gaming device, while also improving usability of the electronic gaming device and enhancing the user experience.

In the example implementation described in section IV, the linked reel strip mechanism is used to switch reel strips for spins of a ribbon wheel during a free games feature. In a spin of a base reel game (regular mode) or the free games feature, if an instance of a super coin symbol is part of a combination of symbol instances that triggers or re-triggers the free games feature, operations for a ribbon wheel are triggered. For each instance of the super coin symbol, a spin of the ribbon wheel gives a count of instances of a highest-value symbol to add to the reels for the free game feature. Specifically, an animation zooms in to the super coin symbol instance, and a graphical element for the ribbon wheel slides out from behind the super coin symbol instance. A reel strip, selected using a linked reel strip mechanism, spins for the ribbon wheel. A symbol position of the reel strip, at which to stop the reel strip, is determined using an RNG event with a lookup table for the reel strip, and a count of instances of the highest-value symbol is determined as the outcome of the spin of the ribbon wheel. After the spin, an animation zooms back out to the reel area for the free games feature. If the combination of symbol instances that triggers or re-triggers the free games feature includes multiple instances of the super coin symbol, the ribbon wheel spin series occurs for each of the instances of the super coin symbol, successively zooming in, spinning, and zooming out for each of the instances of the super coin symbol. After the iteration(s) of the ribbon wheel spin series finish, the instances of the highest-value symbol are added to the reels for the free games feature.

The example implementation described in section IV is one possible use of the linked reel strip mechanism, but the linked reel strip mechanism can be used in many other ways. For example, the linked reel strip mechanism can be used to switch reel strips when iteratively spinning a reel for another type of supplemental feature in an electronic gaming device, for a base reel game in an electronic gaming device, or for some other process. Although some examples described herein use the linked reel strip mechanism to select reel strips for spins of a ribbon wheel, the linked reel strip mechanism can be used to select reel strips for spins of some other type of reel. A re-spin series that uses the linked reel strip mechanism can be triggered when a defined event occurs, or a re-spin series that uses the linked reel strip mechanism can be performed by default in a process. The outcome of the reel spins can be a count of instances of a target symbol (e.g., highest-value symbol) or some other outcome or outcomes.

A. Examples of Linked Reel Strip Mechanisms.

A linked reel strip mechanism organizes reel strips that can be selected for different spins of a reel. Each of the reel strips includes symbol positions, which are associated with outcomes. Each of the reel strips is associated with a lookup table, which includes entries with weights for the respective symbol positions of the reel strip, and which is used when selecting one of the symbol positions of the reel strip.

The reel strips in the linked reel strip mechanism are connected by logical links in one or more data structures. For example, the logical links are reel strip identifiers. Alternatively, the reel strips can be connected by pointers, logical references, or some other type of logical link. The root (starting) reel strip for the linked reel strip mechanism can be identified by a root logical link, such as an initial reel strip identifier. Each other reel strip for the linked reel strip mechanism can be identified by a reel strip identifier associated with at least one symbol position of a preceding reel strip. In some cases, a reel strip is a "terminal" or "leaf" reel strip for the linked reel strip mechanism, and its symbol positions are not associated with any logical links to other reel strips.

The linked reel strip mechanism can be traversed by following logical links. For the first iteration of a re-spin series, the root reel strip can be selected by following a root logical link to the root reel strip. In or after a given iteration in which a given reel strip has been selected, the reel strip for a subsequent iteration of the re-spin series can be selected by following the logical link associated with the symbol position selected in the given reel strip. The reel strip used a given iteration of the re-spin series is missing previously-selected entries from any earlier iterations, which simulates sampling without replacement for multiple spins of a reel using the root reel strip.

A linked reel strip mechanism uses one or more data structures to organize the reel strips of the linked reel strip mechanism. In general, the data structure(s) include, for the respective symbol positions (outcomes) of the reel strips, logical links to the next reel strips to use, in subsequent iterations of the re-spin series, after selection of the respective symbol positions (outcomes). For example, for each of the outcomes for symbol positions of a given reel strip, a data structure associates that outcome with a next reel strip to use if the outcome is selected for the given reel strip. For the next reel strip, the previously-selected outcome can be removed, or given a lower weight, or replaced with another outcome, to account for the previous selection of the outcome of the given reel strip.

The data structure(s) for the linked reel strip mechanism can be implemented as an array, a linked list, linked tables, a tree, or another type of data structure. The data structure(s) for the linked reel strip mechanism can include a data structure (e.g., array, linked list, table) per reel strip, where the data structure for a reel strip includes fields for the respective symbol positions (outcomes) of the reel strip. The field for a symbol position can store a logical link to a next reel strip to use after selection of that symbol position, in addition to storing an indication of the outcome associated with the symbol position. Data structures for the linked reel strip mechanism can be lookup tables for reel strips, which are logically linked to other lookup tables for reel strips. For example, for a reel strip, a lookup table can include multiple entries for symbol positions of the reel strip. For a given one of the symbol positions, an entry in the lookup table can include a weight, an outcome, and a logical link to a next reel strip to use if the outcome is selected. Or, an entry in the lookup table can include a weight and logical link, with the outcome included in a different table that maps symbol positions to outcomes. Alternatively, the data structure for a reel strip can be separate from the lookup table associated with the reel strip. For example, for a reel strip, a lookup table includes multiple entries for symbol positions of the reel strip, with each entry including a weight and possibly an outcome. A separate data structure for the reel strip maps the respective symbol positions (and outcomes) of the reel strip to logical links to next reel strips to use in subsequent iterations of the re-spin series. Alternatively, the data structure(s) for the linked reel strip mechanism can include a single data structure for all of the reel strips, aggregating such information.

Figure 8A:
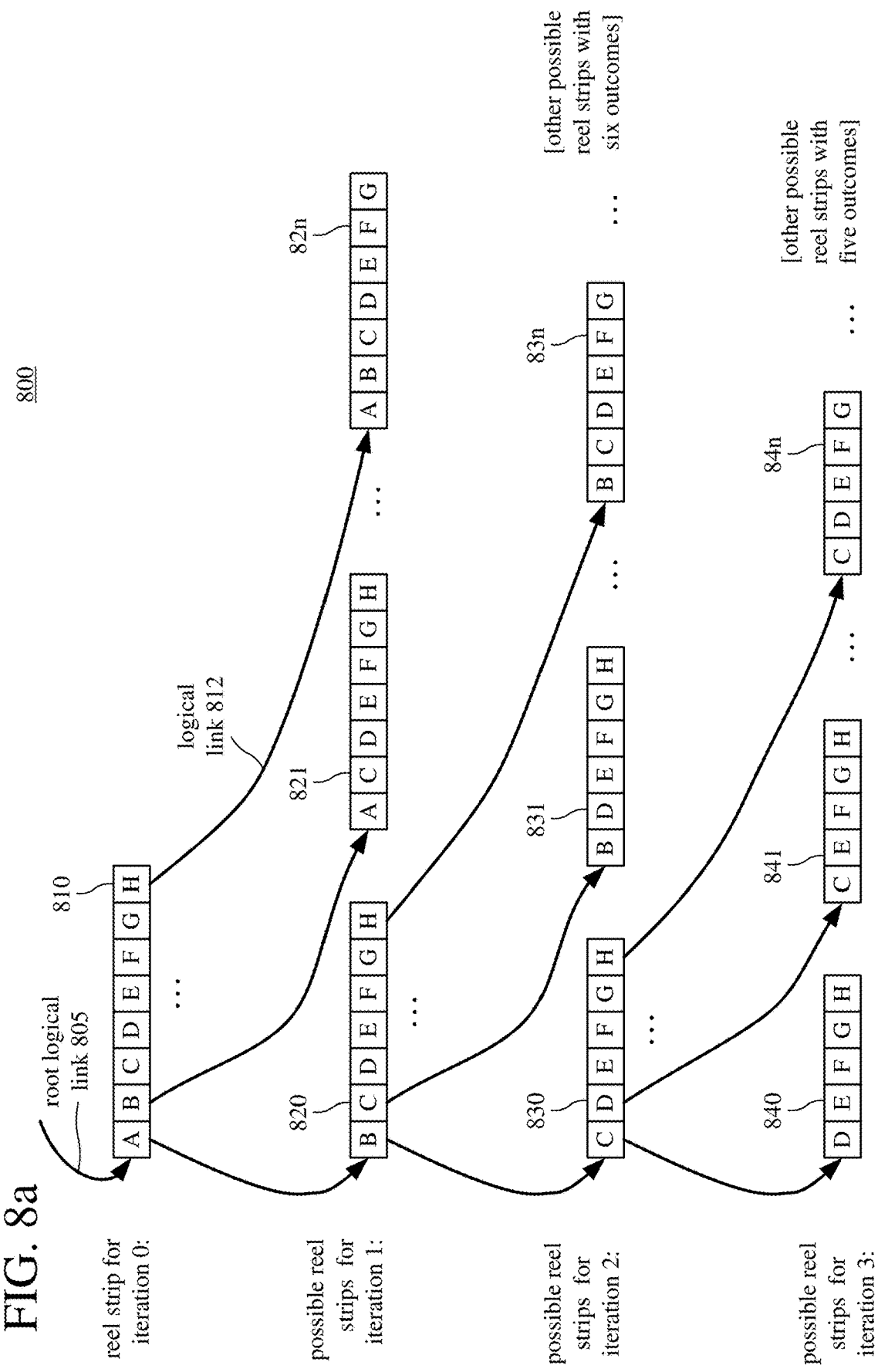
FIGS. 8a and 8b are diagrams showing reel strips for example linked reel strip mechanisms.

FIG. 8a shows reel strips for an example linked reel strip mechanism 800. In FIG. 8a, the reel strips include a small number of symbol positions to illustrate various features of the linked reel strip mechanisms 800. In practice, the reel strips for a linked reel strip mechanism can include more symbol positions (e.g., 20, 40, 100) or fewer symbol positions (e.g., 4, 5), with the number of symbol positions depending on implementation. In FIG. 8a, the reel strips are linked by logical links, such as the logical link 812.

With reference to FIG. 8a, the linked reel strip mechanism 800 includes a root reel strip 810, which is used for an initial iteration (iteration 0) of a re-spin series. A root logical link 805 references the root reel strip 810. The root reel strip 810 has eight symbol positions, which are associated with different outcomes (shown as A, B, C, D, E, F, G, and H). Each of the eight symbol positions/outcomes of the root reel strip 810 is associated (in a data structure of the linked reel strip mechanism) with a logical link to one of the reel strips 820-82*n* possible for the next iteration (iteration 1) of the re-spin series, for which the symbol position (outcome) of the root reel strip 810 is missing. For example, the symbol position for outcome A in the root reel strip 810 is associated with a logical link to a reel strip 820 that is missing a symbol position for outcome A. The symbol position for outcome B in the root reel strip 810 is associated with a logical link to a reel strip 821 that is missing a symbol position for outcome B, and the symbol position for outcome H in the root reel strip 810 is associated with a logical link to a reel strip 82$n$ that is missing a symbol position for outcome H.

Each of the reel strips 820-82$n$ possible for iteration 1 of the re-spin series has seven symbol positions, which are associated with different outcomes. Each of the seven symbol positions of the reel strip (one of the reel strips 820-82$n$) is associated (in a data structure of the linked reel strip mechanism) with a logical link to one of the reel strips 830-83$n$ possible for the next iteration (iteration 2) of the re-spin series, for which the symbol position (outcome) of the reel strip (one of the reel strips 820-82$n$) is missing. For example, for the first reel strip 820 possible for iteration 1, the symbol position for outcome B is associated with a logical link to a reel strip 830 that is missing a symbol position for outcome B (and is still missing a symbol position for outcome A). For the reel strip 820, the symbol position for outcome C is associated with a logical link to a reel strip 831 that is missing a symbol position for outcome C (and the symbol position for outcome A). Finally, for the reel strip 820, the symbol position for outcome H is associated with a logical link to a reel strip 83$n$ that is missing a symbol position for outcome H (and the symbol position for outcome A).

Similarly, each of the reel strips 830-83$n$ possible for iteration 2 of the re-spin series has six symbol positions, which are associated with different outcomes. Each of the six symbol positions of the reel strip (one of the reel strips 830-83$n$) is associated with a logical link to one of the reel strips 840-84$n$ possible for the next iteration (iteration 3) of the re-spin series, for which the symbol position (outcome) of the reel strip (one of the reel strips 830-83$n$) is missing. For example, for the first reel strip 830 possible for iteration 2, the symbol position for outcome C is associated with a logical link to a reel strip 840 that is missing a symbol position for the outcome C (and is still missing symbol positions for the outcomes A and B). For the reel strip 830, the symbol position for the outcome D is associated with a logical link to a reel strip 841 that is missing a symbol position for the outcome D (and symbol positions for the outcomes A and B). For the reel strip 830, the symbol position for the outcome H is associated with a logical link to a reel strip 84$n$ that is missing symbol positions the outcome H (and symbol positions for the outcomes A and B).

Figure 8B:
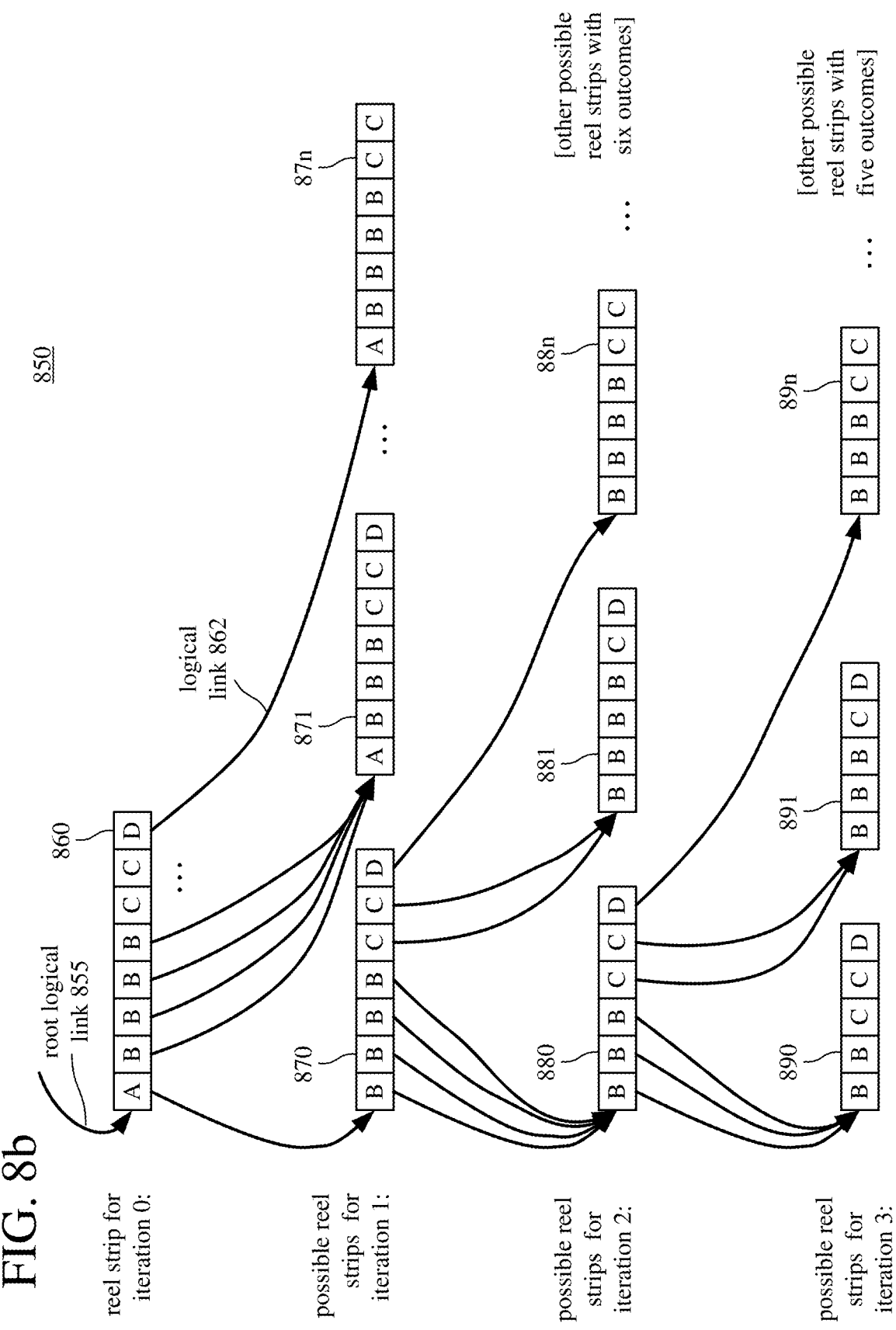

FIG. 8*b* shows reel strips for another example linked reel strip mechanism 850. The linked reel strip mechanism 850 shown in FIG. 8*b* is similar to the linked reel strip mechanism 800 shown in FIG. 8*a*, but the reel strips for linked reel strip mechanism 850 shown in FIG. 8*b* include symbol positions with repeated outcomes. As shown in FIG. 8*b*, this reduces the number of reel strips used by the linked reel strip mechanism 850, compared to linked reel strip mechanism 800 shown in FIG. 8*a*.

In FIG. 8*b*, the example linked reel strip mechanism 850 includes a root reel strip 860, which is used for an initial iteration (iteration 0) of a re-spin series. A root logical link 855 references the root reel strip 860. The root reel strip 860 has eight symbol positions with associated outcomes, including at least some repeated outcomes (shown as A, B, B, B, B, C, C, and D). Each of the eight symbol positions of the root reel strip 860 is associated (in a data structure of the linked reel strip mechanism) with a logical link to one of the reel strips 870-87$n$ possible for the next iteration (iteration 1) of the re-spin series, for which the symbol position (outcome) of the root reel strip 810 is missing. For example, the symbol position for outcome A of the root reel strip 860 is associated with a logical link to a reel strip 870 that is missing a symbol position for outcome A. Each of the four symbol positions for outcome B of the root reel strip 860 is associated with a logical link to a reel strip 871 that is missing one symbol position for outcome B. The symbol position for outcome D of the root reel strip 860 is associated with a logical link to a reel strip 87$n$ that is missing a symbol position for outcome D. As shown in FIG. 8B, each of the four symbol positions for outcome B in the root reel strip 860 is associated with a logical link to the same reel strip 871 for the next iteration.

Each of the reel strips 870-87$n$ possible for iteration 1 of the re-spin series has seven symbol positions, which are associated with outcomes (including some repeated outcomes). Each of the seven symbol positions of the reel strip (one of the reel strips 870-87$n$) is associated (in a data structure of the linked reel strip mechanism) with a logical link to one of the reel strips 880-88$n$ possible for the next iteration (iteration 2) of the re-spin series, for which the symbol position (outcome) of the reel strip (one of the reel strips 870-87$n$) is missing. For example, for the first reel strip 870 possible for iteration 1, each of the four symbol positions for outcome B is associated with a logical link to a reel strip 880 that is missing one symbol position for outcome B (and is still missing a symbol position for outcome A). For the reel strip 870, each of the two symbol positions for outcome C is associated with a logical link to a reel strip 881 that is missing one symbol position for outcome C (and the symbol position for outcome A). Finally, for the reel strip 870, the symbol position for outcome D is associated with a logical link to a reel strip 88$n$ that is missing a symbol position for outcome D (and the symbol position for outcome A). As shown in FIG. 8B, each of the four symbol positions for outcome B in the first reel strip 870 is associated with a logical link to the same reel strip 880 for the next iteration, and each of the two symbol positions for outcome C in the first reel strip 870 is associated with a logical link to the same reel strip 881 for the next iteration.

Similarly, each of the reel strips 880-88$n$ possible for iteration 2 of the re-spin series has six symbol positions, which are associated with outcomes (including some repeated outcomes). Each of the six symbol positions of the reel strip (one of the reel strips 880-88$n$) is associated (in a data structure of the linked reel strip mechanism) with a logical link to one of the reel strips 890-89$n$ possible for the next iteration (iteration 3) of the re-spin series, for which the symbol position (outcome) of the reel strip (one of the reel strips 880-88$n$) is missing. For example, for the first reel strip 880 possible for iteration 2, each of the three symbol positions for outcome B is associated with a logical link to a reel strip 890 that is missing two symbol positions for outcome B (and is still missing a symbol position for outcome A). For the reel strip 880, each of the two symbol positions for outcome C is associated with a logical link to a reel strip 891 that is missing one symbol position for outcome C (and the symbol position for outcome A and one symbol position for outcome B). Finally, for the reel strip 880, the symbol position for outcome D is associated with a logical link to a reel strip 89$n$ that is missing a symbol position for outcome D (and the symbol position for outcome A and one symbol position for outcome B). As shown in FIG. 8B, each of the three symbol positions for outcome B in the first reel strip 880 is associated with a logical link to the same reel strip 890 for the next iteration, and each of the two symbol positions for outcome C in the first reel strip 880 is associated with a logical link to the same reel strip 891 for the next iteration.

When a symbol position (outcome) is missing from a reel strip, the lookup table associated with the reel strip can be modified to lack an entry for the symbol position (outcome) or to give the entry for the symbol position (outcome) a weight of zero, so that the entry cannot be selected. When symbol position is missing from a reel strip, the graphic associated with the reel strip lacks a graphical indication for the symbol position. Alternatively, when a symbol position is missing from a reel strip, the graphical indication for the symbol position can be dimmed in the graphic associated with the reel strip to indicate the symbol position is not active or available, or the graphic associated with the reel strip can be unchanged (but selection of the symbol position can be made to be impossible).

FIG. 9 shows a set of example data structures 900 for the linked reel strip mechanism 850 of FIG. 8*b*. For the root reel strip (reel strip 0), a data structure (e.g., table, array, linked list) includes fields for the respective symbol positions of the reel strip. For each symbol position, the corresponding field stores an indication of the associated outcome and a reel strip identifier for the next reel strip, if that symbol position is selected. For example, for the root reel strip (reel strip 0), the first field stores an indication of outcome A and a reel strip identifier for reel strip 1, which lacks a symbol position for outcome A. The next four fields each store an indication of outcome B and a reel strip identifier for reel strip 2, which is missing one symbol position for outcome B. The next two fields each store an indication of outcome C and a reel strip identifier for reel strip 3, which is missing one symbol position for outcome C. The last field stores an indication of outcome D and a reel strip identifier for reel strip 4, which lacks a symbol position for outcome D.

For reel strip 1, the first four fields each store an indication of outcome B and a reel strip identifier for reel strip 5, which is missing a symbol position for outcome A and one symbol position for outcome B. The next two fields each store an indication of outcome C and a reel strip identifier for reel strip 6, which is missing a symbol position for outcome A and one symbol position for outcome C. The last field stores an indication of outcome D and a reel strip identifier for reel strip 7, which lacks a symbol position for outcome A and a symbol position for outcome D.

In some cases, a given reel strip can be reached by traversal through various paths. For example, reel strip 14 includes three symbol positions for outcome B, a symbol position for outcome C, and a symbol position for outcome D. Reel strip 14 can be reached after selection of symbol positions for outcomes A, B, and C at any symbol positions, in any order.

In the example implementation described in section IV, for a linked reel strip mechanism used in iterations of a re-spin series for spins of a ribbon wheel, the initial reel strip includes ten symbol positions. The ten symbol positions are associated with different counts of target symbol instances to add to reels of a supplemental feature. For example, the different counts are +10, +15, +15, +20, +20, +20, +25, +25, +50, and +50, but the outcomes for the symbol positions could instead be other count values.

In the example implementation described in section IV, after a symbol position is selected for a reel strip, the selected symbol position is missing from reel strips that can be used in later iterations of the re-spin series (which simulates sampling without replacement). For example, after the symbol position for the outcome +10 is selected, the symbol position for the outcome +10 is missing from reel strips that can be used in later iterations of the re-spin series. If any of the symbol positions for the outcome +20 is selected, one fewer symbol position for the outcome +20 is present in the reel strips that can be used in later iterations of the re-spin series. The selected symbol position can be "removed" by using a lookup table that lacks an option for the selected symbol position or has a weight of zero for the selected symbol position, and by using a graphic with a corresponding change (if desired) for the reel strip.

In a lookup table associated with a reel strip, entries for symbol positions are given weights that depend on implementation. In the example implementation described in section IV, the weights can vary between entries to make specific outcomes more or less likely. Alternatively, the weights can be the same for all entries in the lookup table associated with a reel strip.

In the example implementation described in section IV, the lookup table associated with a reel strip can include logical links for the respective symbol positions (outcomes) of the reel strip. That is, the lookup table is the data structure for the linked reel strip mechanism. For each of the symbol positions of the reel strip, in addition to including a weight and an associated outcome, the lookup table can include a logical link (e.g., reel strip identifier) that identifies a next reel strip to use if the symbol position is selected. Alternatively, a data structure separate from the lookup table can include logical links for the respective symbol positions (outcomes) of the reel strip.

In the example implementation described in section IV, for which the initial reel strip includes ten symbol positions (outcomes), the linked reel strip mechanism includes 215 reel strips, which are each associated with a different combination of symbol positions (outcomes). Each of the 215 reel strips has a different reel strip identifier. In general, with each successive spin of the reel, the next reel strip includes fewer symbol positions since the previously-selected symbol positions are missing. In practice, the graphics associated with the reel strips can have a minimum number of symbol positions, so that the graphics are correctly rendered when spinning. In the example implementation, each reel strip includes at least six symbol positions, although the weights for at least some of the symbol positions in the corresponding lookup table can be zero to prevent selection of those symbol positions.

In general, the number of iterations possible for the re-spin series, and hence the number of levels of reel strips in the linked reel strip mechanism, depends on implementation. In the example implementation described in section IV, there is a limit on the number of iterations of the re-spin series. Specifically, there can be at most ten spins of the ribbon wheel that uses the linked reel strip mechanism in the example implementation. Alternatively, the number of iterations possible for the re-spin series can be larger or smaller. Or, the number of iterations possible for the re-spin series can be unlimited, but eventually there are no more symbol positions (outcomes) of the reel strip to remove. For example, instead of removing an entry in a lookup table or changing the weight for the entry to zero, a selected entry can be replaced with a different entry associated with a different outcome (e.g., adding credits or free spins, instead of adding a count of target symbol instances). In this way, the count of target symbol instances that are added to the reel can be limited, by replacing a selected entry with a new entry associated with a different outcome.

B. Example Screenshots Showing Use of a Linked Reel Strip Mechanism.

FIGS. 10a-10m show example stages of gameplay including use of a ribbon wheel with a linked reel strip mechanism. FIGS. 10a-10m show the example stages of gameplay on a display screen 1020 for an electronic gaming device.

Figure 10B:
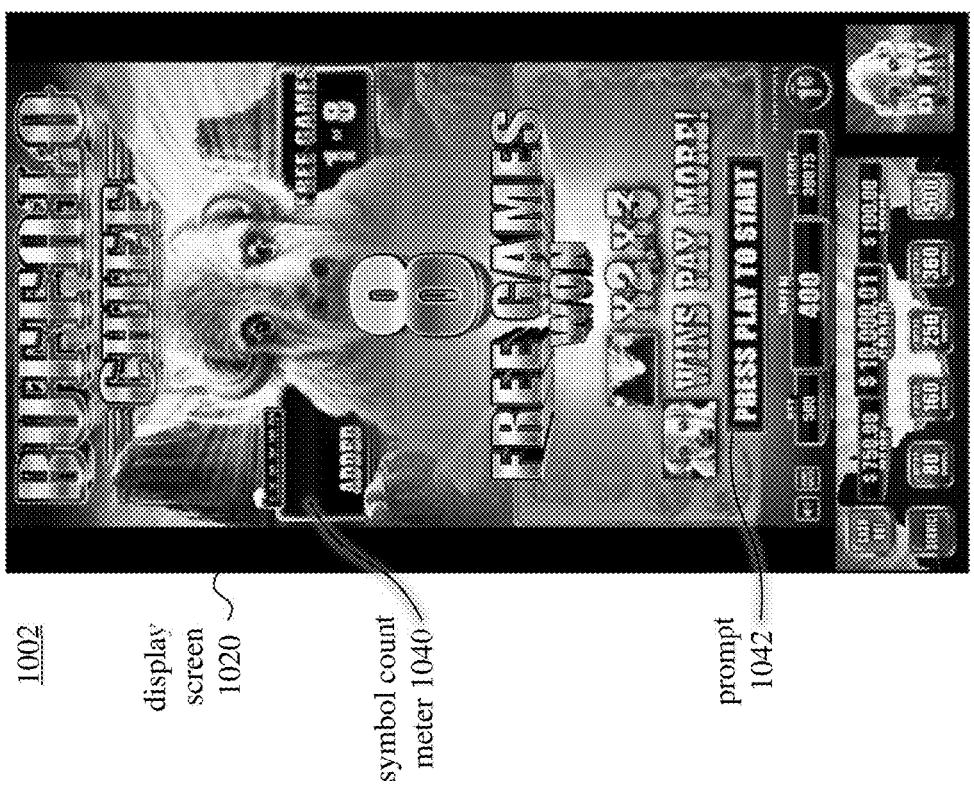
FIGS. 10a-10m are screenshots showing example stages of gameplay including use of a ribbon wheel with a linked reel strip mechanism in a re-spin series.
Figure 10A:
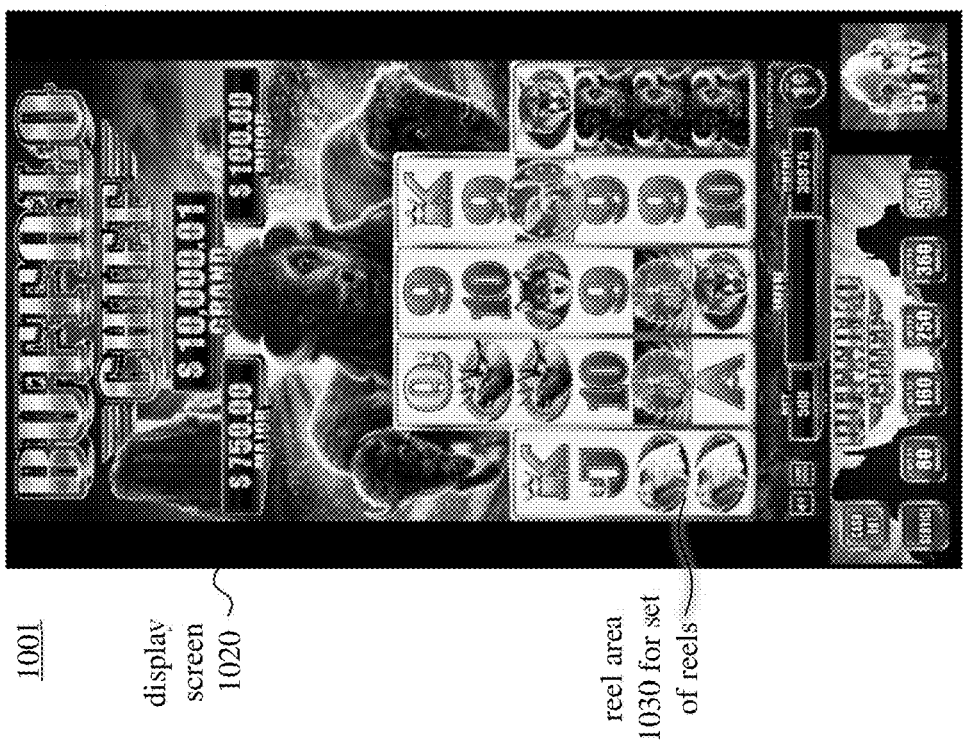
Figure 10C:
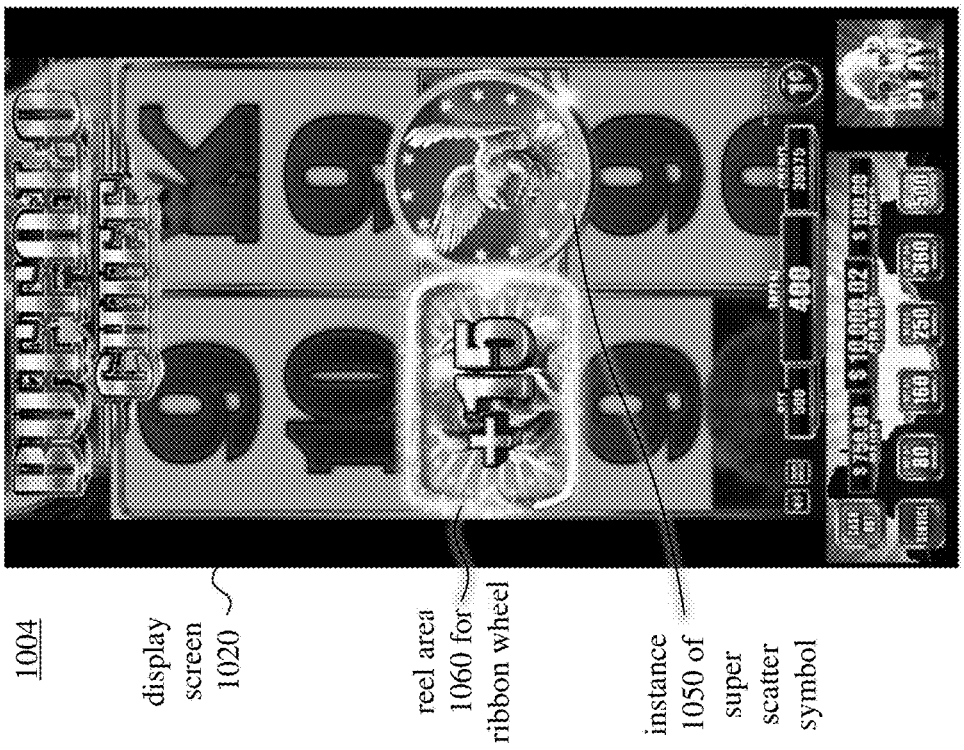

In the example screenshot 1001 of FIG. 10a, the display screen 1020 shows a reel area 1030 for a regular mode of a base reel game. The reel area 1030 shows five reels in a 4-6-6-6-4 configuration. In FIG. 10a, the reels of the base reel game are stopped in the reel area 1030. The reel area 1030 encloses a combination of instances of scatter symbols (shown as coins). The combination of instances of the scatter symbols includes at least a threshold count (3 instances) of instances of the scatter symbols. In the example implementation described in section IV, a free games feature is triggered if the reel area 1030, after a spin of the base reel game, encloses three, four, or five instances of a scatter symbol. Each reel strip includes one instance of a scatter symbol, which is a dynamic symbol that can resolved as a coin symbol, super coin symbol, or jackpot coin symbol. The number of free games awarded depends on the count of scatter symbol instances.

In the example screenshot 1001 shown in FIG. 10a, at least one of the scatter symbol instances is an instance of a super scatter symbol (shown as a super coin symbol depicting an eagle coin). As such, a re-spin series is also triggered for the free games feature. In the example implementation described in section IV, one iteration of the re-spin series is performed for each instance of the super scatter symbol, when a combination of scatter symbol instances satisfies the threshold count. (The jackpot coin symbol is treated as a type of super scatter symbol in the example implementation.)

In the example screenshot 1002 of FIG. 10b, the display screen 1020 shows a different background, a symbol count meter 1040, a prompt 1042, and a running count of free games. The prompt 1042 includes a graphic indicator that free games have been awarded for the free games feature and a graphic indicator that the free games feature will begin upon receipt of user input. The symbol count meter 1040 indicates that instances of a target symbol (white buffalo) can be added to reels for the free games feature. (Later, the symbol count meter 1040 will show a running total count of instances of the target symbol to be added to the reels for the free games feature.)

The electronic gaming device receives user input from a player indicating the start of the free games feature. Upon receipt of user input to start the free games feature, a transition animation starts for the free games feature. The transition animation is accompanied by audible cues. The transition animation affects the background shown on the display screen 1020 (e.g., showing a flash).

Since the combination of scatter symbol instances that triggered the free games feature includes at least one instance of the super scatter symbol, an iteration of a re-spin series occurs for each instance of the super scatter symbol. An animation starts for the re-spin series. The animation can be accompanied by audible cues. For example, the animation zooms in to the location of an instance of the super scatter symbol. In the example screenshot 1003 of FIG. 10c, the animation has zoomed in so that an instance 1050 of the super scatter symbol (eagle coin) is approximately 250% of its normal size. The example screenshot 1003 of FIG. 10c also shows a reel area 1060 for a ribbon wheel sliding out from behind the instance of the super scatter symbol (eagle coin). In the example screenshot 1003 of FIG. 10c, a reel strip for the ribbon wheel is shown spinning in the reel area 1060, in response to the user input indicating the start of the free games feature. In the example implementation described in section IV, the reel strip for the ribbon wheel is selected using a linked reel strip mechanism, as described herein.

Figure 10D:
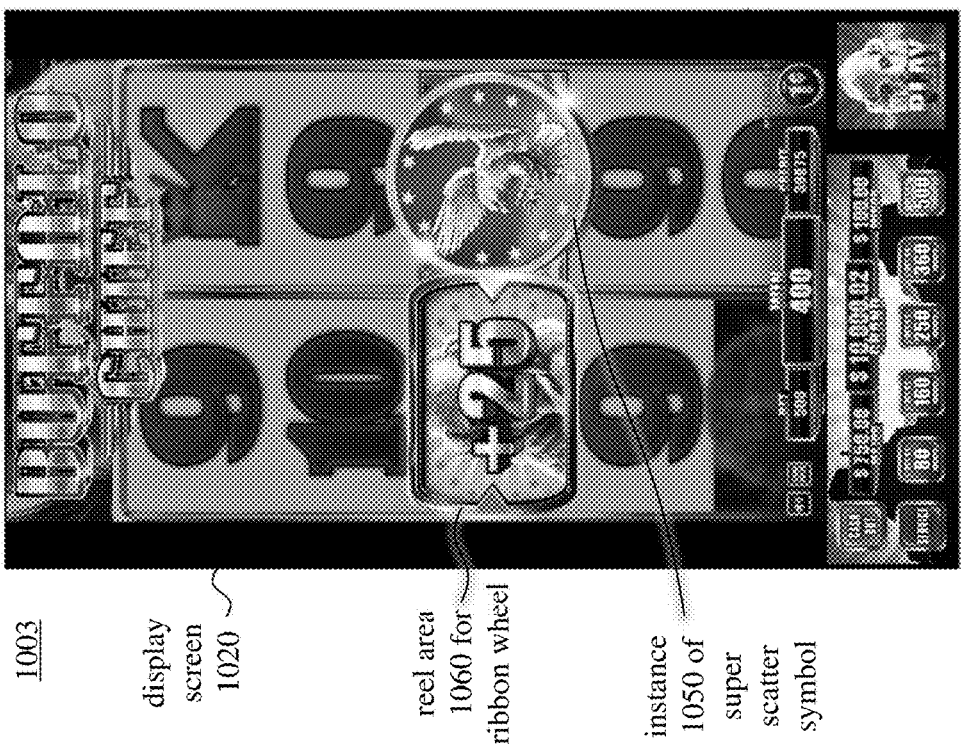
Figure 10F:
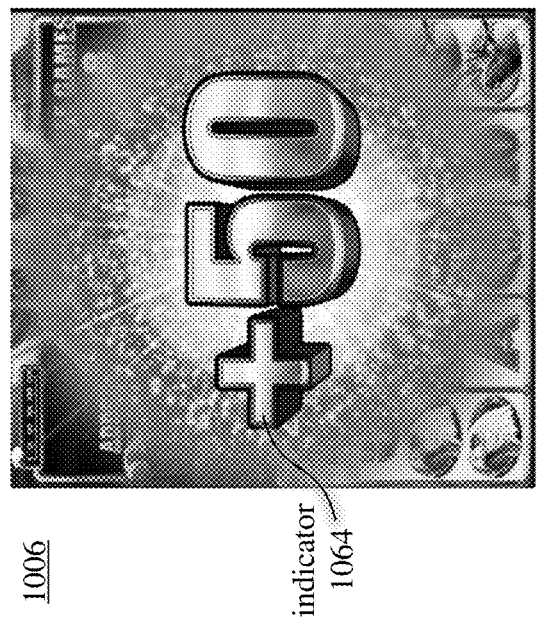
Figure 10E:
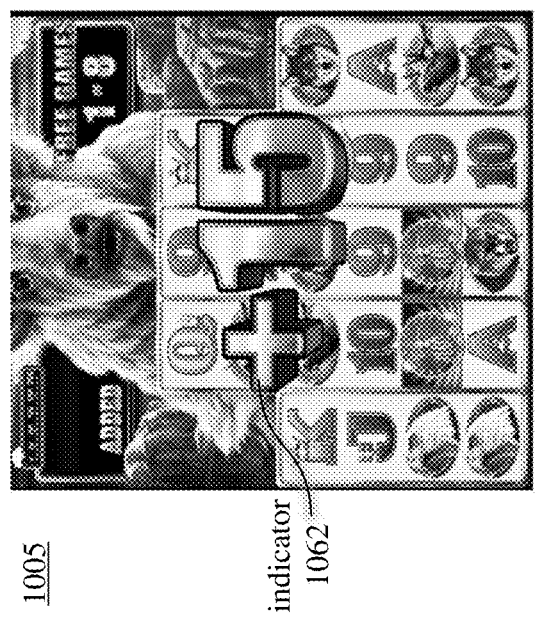

The reel strip for the ribbon wheel stops in the reel area 1060 for the ribbon wheel. The example screenshot 1004 of FIG. 10d shows the ribbon wheel stopped at a symbol position of the reel strip associated with a count "+15" of additional target symbol instances for reel strips of the reels of the free games feature. An indicator of the count of additional target symbol instances can be displayed on the display screen 1020. FIGS. 10e and 10f show two examples of indicators of a count of additional target symbol instances. The indicator 1062 in the screenshot 1005 of FIG. 10e shows the count in large text, while the indicator 1064 in the screenshot 1006 of FIG. 10f shows the count in larger text with an animation that emphasizes the award.

Figure 10H:
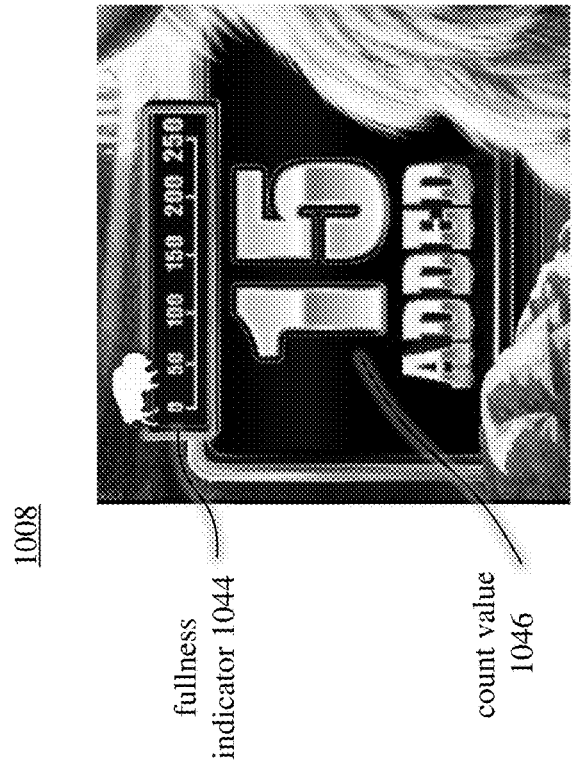
Figure 10G:
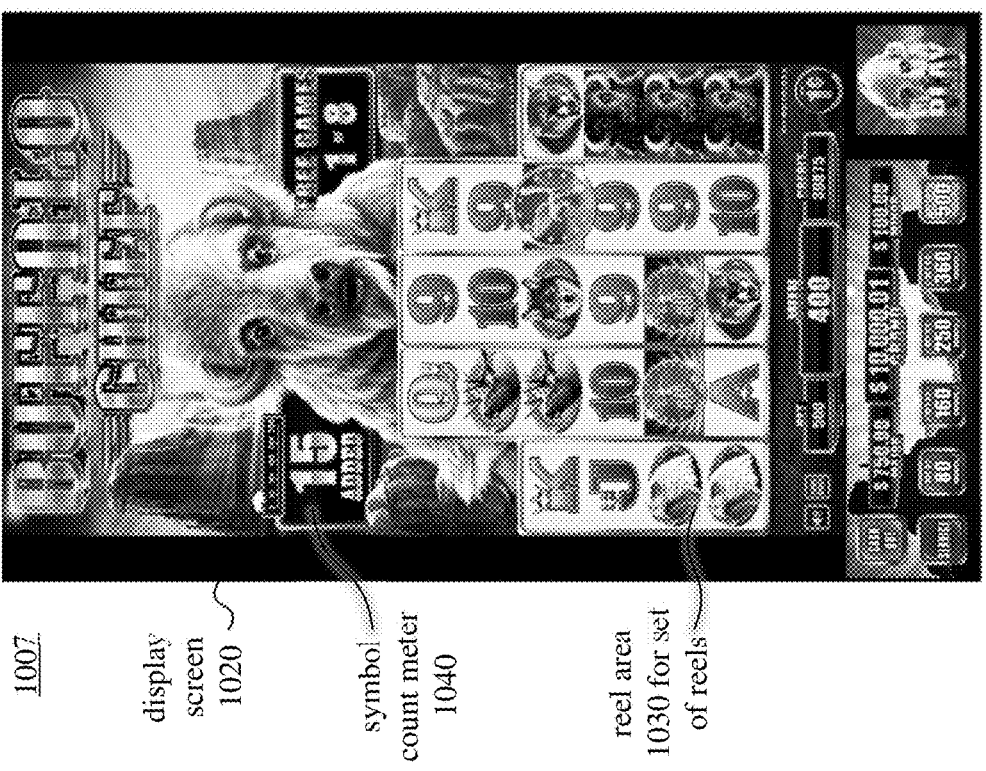

As shown in the example screenshot 1007 of FIG. 10g, the animation for the re-spin series zooms out from the location of the instance of the super scatter symbol (eagle coin). For example, the animation zooms out to the reel area 1030 for the set of reels for the free games feature, with the instance of the super scatter symbol (eagle coin) returning to its normal size. The count of additional target symbol instances can still be shown near the instance of the super scatter symbol, then move (via an animation) to the symbol count meter 1040. As shown in the example screenshot 1007 of FIG. 10g, the symbol count meter 1040 is updated by the count of additional target symbol instances. At this point, the display screen 1020 can also show the pay table for the free games feature along with the running count of free games.

The example screenshot 1008 of FIG. 10h shows details of the symbol count meter 1040. The symbol count meter 1040 shows the current total count value 1046 for target symbol instances to be added to reel strips for the free games feature. The symbol count meter 1040 also includes a fullness indicator 1044, which graphically indicates the current total count value in a range of possible values for the count of target symbol instances to be added to reel strips for the free games feature. The fullness indicator 1044 can show a minimum count value, a maximum count value, and multiple intermediate count values. The fullness indicator 1044 also shows a graphical marker (white buffalo) of the current total count value in the range of possible values.

In the example implementation described in section IV, the re-spin series can continue in other iterations—one iteration for each instance of the super scatter symbol (treating an instance of the jackpot coin symbol as an instance of the super scatter symbol). Between zero and five instances of the super scatter symbol can land as part of a combination of scatter symbol instances in the example implementation. In the series of screenshots shown in FIGS. 10a-10d and 10g, only one iteration is shown. In successive iterations of the re-spin series, symbol positions (outcomes) that have been already been selected for the ribbon wheel for the free games features are missing from consideration (e.g., missing from the reel strips still available for the ribbon wheel, or effectively skipped by giving them a weight of zero in lookup tables for the reel strips). Counts of new instances of the target symbol are combined across the iterations of the re-spin series.

Figure 10J:
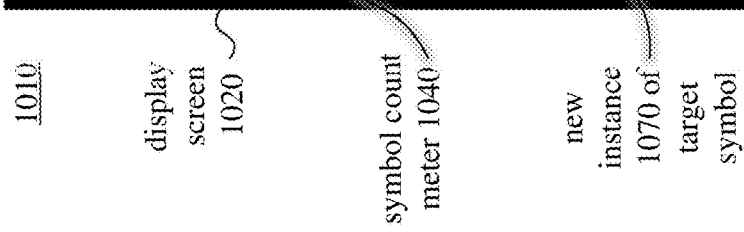
Figure 10I:
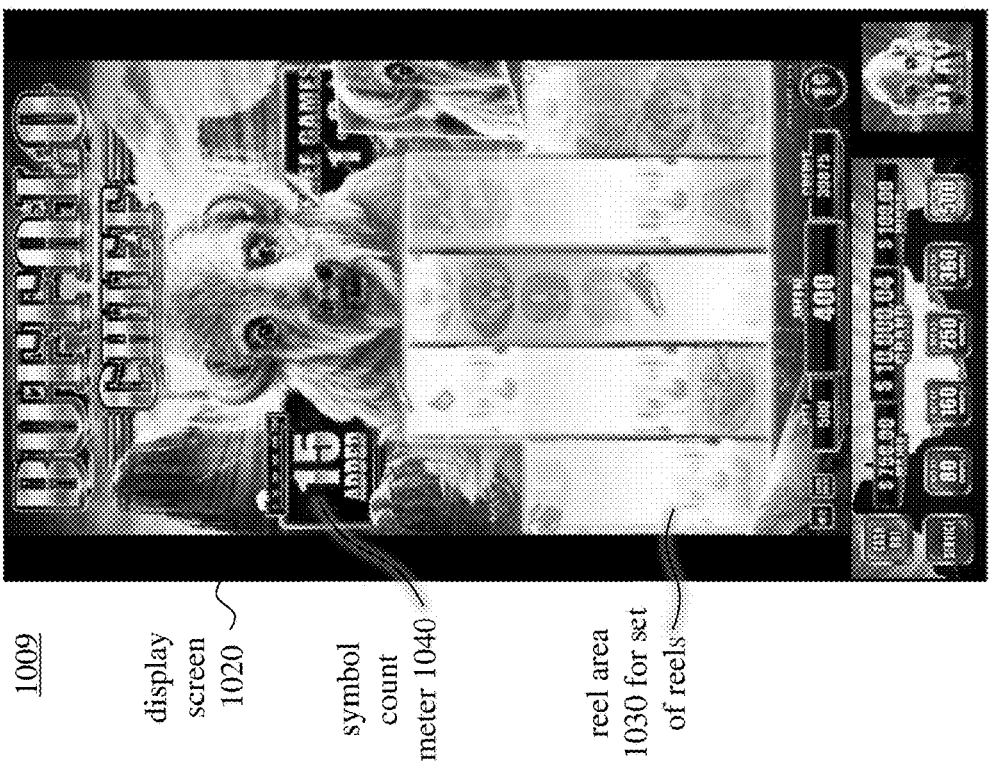

After the iterations of the re-spin series have completed, the reels spin for the free games feature. In the example screenshots 1009-1011 of FIGS. 10i-10k, the reels spin in the reel area 1030. At this point, the additional instances of the target symbol (white buffalo) are graphically added to the reel strips of the reels. FIG. 10*j* shows a new instance 1070 of the target symbol being added to the first reel in the reel area 1030. In the example implementation described in section IV, the addition of the target symbol instances is animated by showing the new instances, e.g., after a launch from behind the perspective of the player or floating in from the sides of the display screen 1020, successively land on the reel strips. FIGS. 10*i* and 10*j* show the reels continuing to spin. In this way, new target symbol instances can be added to the reels according to a pattern, e.g., from side to side, from top to bottom.

Figure 10L:
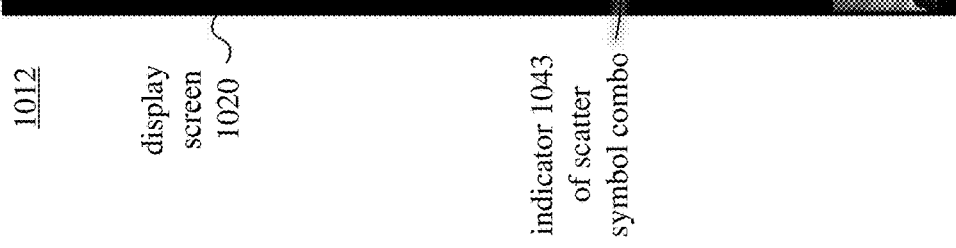
Figure 10K:
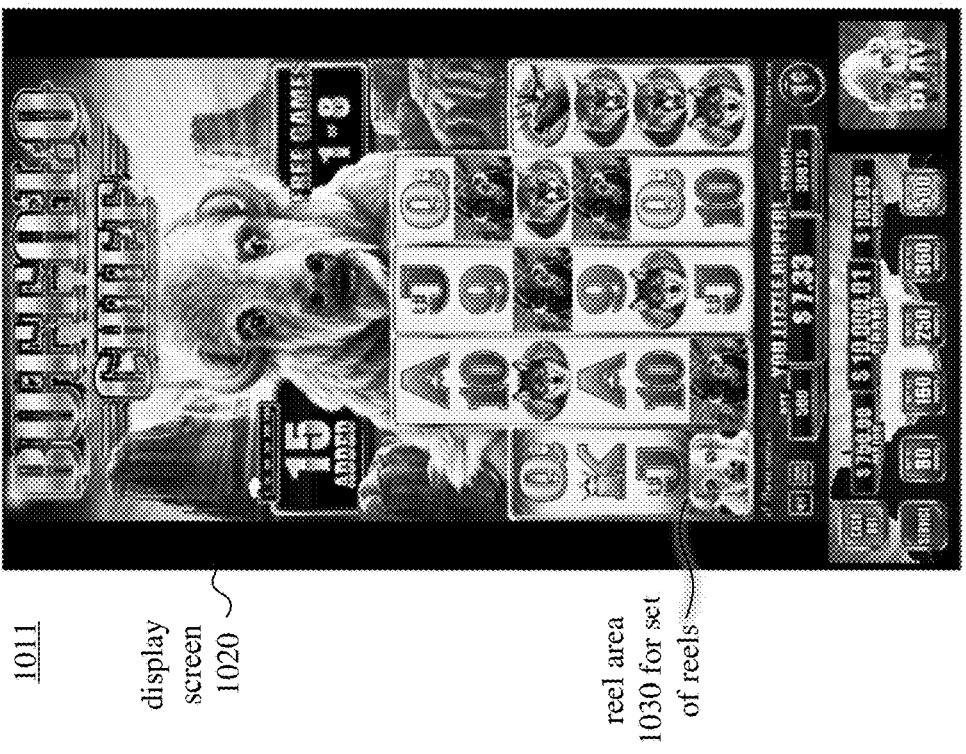

After all new instances of the target symbol have been added to the reels, the reels land in the reel area 1030 for the first spin of the free games feature, and an outcome is determined for the spin of the free games feature (using all-ways evaluation), as shown in the example screenshot 1011 of FIG. 10*k*. The free games feature continues for other spins. For the other spins, the new target symbol instances remain on the reels. The display screen 1020 can show an indicator of the outcome for the spin of the free games feature.

During a spin of the free games feature, the free games feature can be re-triggered. In the example implementation, a free games feature is re-triggered if the reel area 1030, after a spin of the free games feature, encloses two, three, four, or five instances of a scatter symbol. The number of free games awarded depends on the count of scatter symbol instances. If at least one of the scatter symbol instances is an instance of a super scatter symbol (eagle coin), the re-spin series is also re-triggered for the free games feature. One iteration of the re-spin series is performed for each instance of the super scatter symbol (treating an instance of the jackpot coin symbol as an instance of the super scatter symbol), when a combination of scatter symbol instances satisfies the threshold count for re-triggering the free games feature.

In the example screenshot 1012 of FIG. 10*l*, the reel area 1030 encloses two instances of the scatter symbol. The display screen 1020 shows a graphic indicator that more free games have been awarded for the free games feature. If at least one of the instances of the scatter symbol is a super scatter symbol, the display screen 1020 can also show a prompt, which includes a graphic indicator that the free games feature will continue upon receipt of user input. For each instance of the super scatter symbol, an iteration of the re-spin series occurs, involving another spin of the ribbon wheel, as shown in FIGS. 10*c*-10*g*, with the linked reel strip mechanism resuming from its final state when the re-spin series was previously triggered. After the re-spin series, new instances of the target symbol are added to the reels, as shown in FIGS. 10*i*-10*k*. To limit the number of iterations of the re-spin series, and thereby limit the count of new target symbol instances that can be added to the reels for the free games feature, the way that the scatter symbol is resolved (as a dynamic symbol) can be changed depending on the number of iterations of the re-spin series that have already occurred. Specifically, the option for the super scatter symbol (and jackpot coin symbol) can disabled for a reel when resolving a dynamic symbol.

Figure 10M:
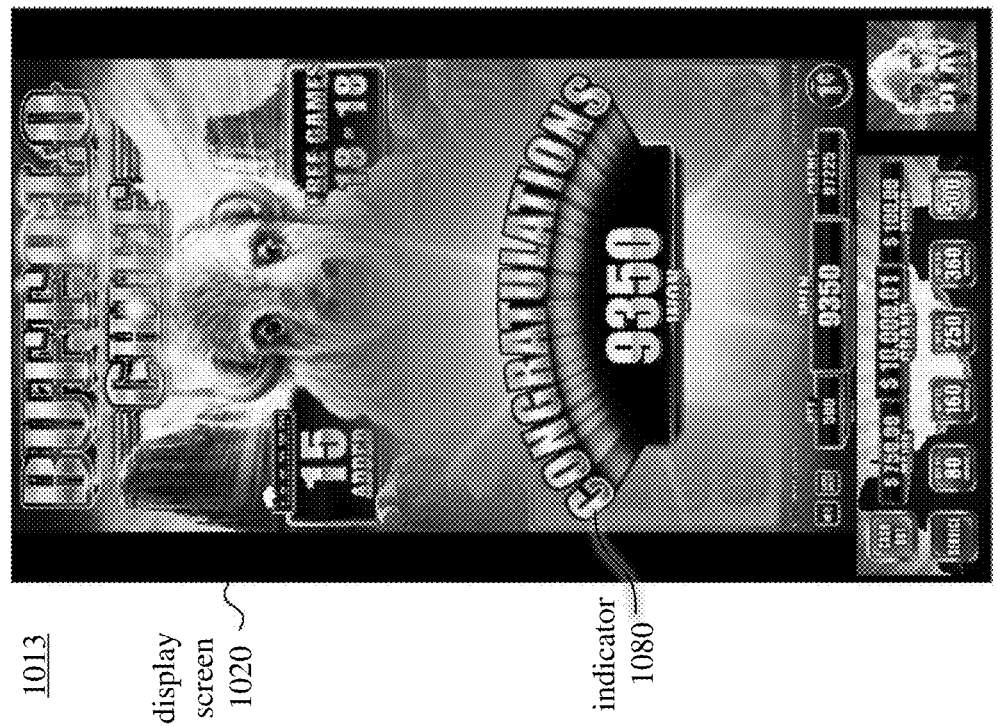

Finally, after all spins have completed for the free games feature, an indicator of the final outcome of the free games feature is presented on the display screen 1020. The example screenshot 1013 of FIG. 10*m* shows an indicator 1080 of a final award amount for the free games feature.

C. Example Techniques for Using a Linked Reel Strip Mechanism.

Figure 11A:
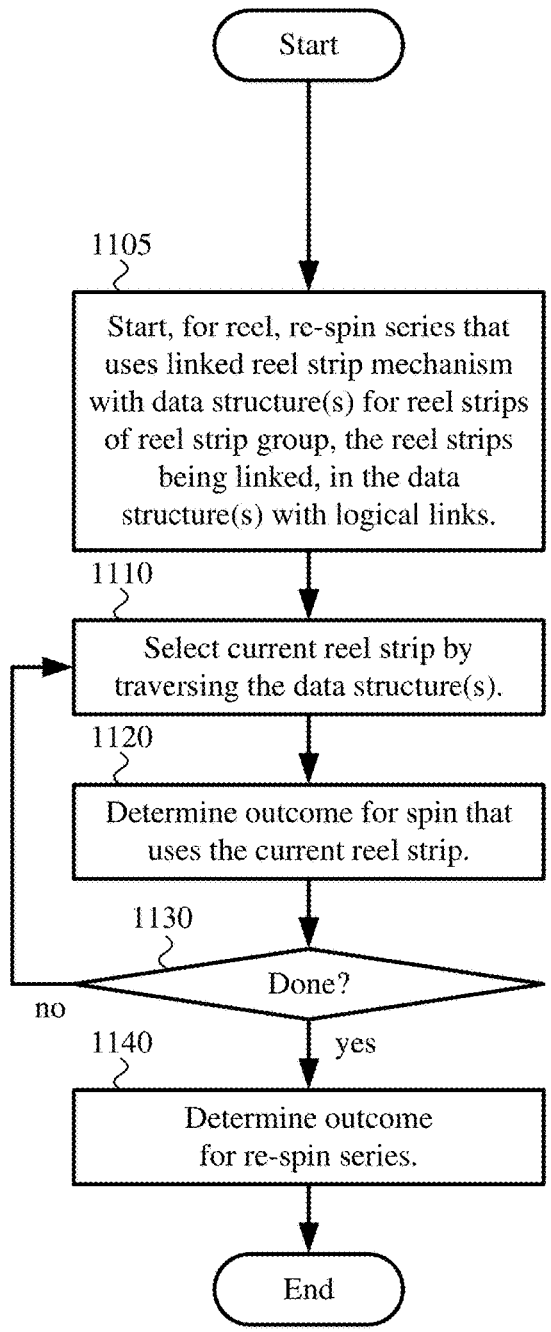
FIG. 11a is a flowchart showing an example technique for controlling the UI of an electronic gaming device that uses a linked reel strip mechanism, focusing on backend operations.
Figure 11B:
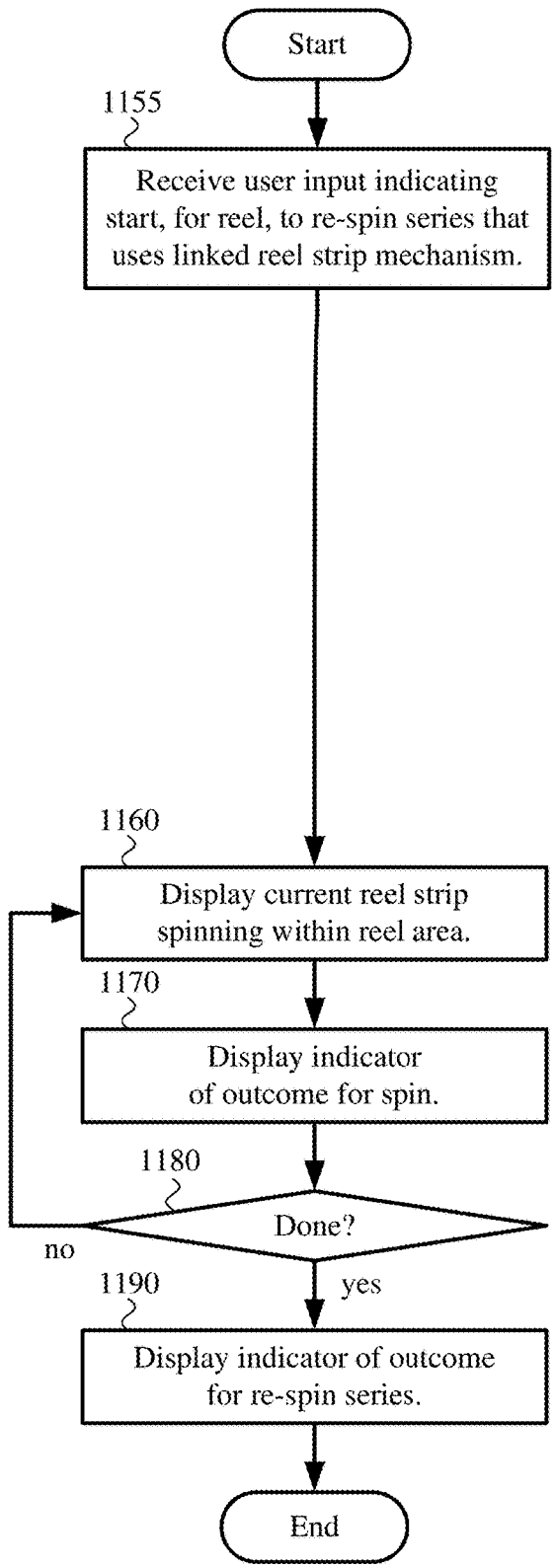
FIG. 11b is a flowchart showing an example technique for controlling the UI of an electronic gaming device that uses a linked reel strip mechanism, focusing on UI-frontend operations.

FIG. 11*a* shows an example technique 1100 for controlling the UI of an electronic gaming device that uses a linked reel strip mechanism, focusing on backend operations. Operations of the example technique 1100 shown in FIG. 11*a* can be performed, for example, in a game processing backend system 314 explained with reference to FIG. 3. FIG. 11*b* shows an example technique 1150 for controlling the UI of an electronic gaming device that uses a linked reel strip mechanism, focusing on UI-frontend operations. Operations of the example technique 1150 shown in FIG. 11*b* can be performed, for example, in a UI system 302 explained with reference to FIG. 3. The game processing backend system and UI system can be implemented using memory and one or more processors that are part of the electronic gaming device and/or part of a gaming system located remotely from the electronic gaming device. Depending on implementation, the backend system and UI system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

In general, the techniques 1100, 1150 shown in FIGS. 11*a* and 11*b* involve a reel area on a display screen of an electronic gaming device. The reel area can be displayed on a single display screen (e.g., main display screen, or secondary display screen).

In the techniques 1100, 1150 shown in FIGS. 11*a* and 11*b*, a linked reel strip mechanism is used for a supplemental feature such as a free games feature. Alternatively, the linked reel strip mechanism can be used as part of another type of supplemental feature, as part of a base reel game, or as part of another type of process of an electronic gaming device. In some implementations, the electronic gaming device is an EGM with video reels. Alternatively, the electronic gaming device is another type of electronic gaming device.

At least for backend processing, the linked reel strip mechanism uses one or more data structures for multiple reel strips of a reel strip group. For example, the reel strips of the reel strip group are associated with a ribbon wheel, and the reel area for the ribbon wheel encloses at most one complete instance of a symbol at a time. Alternatively, the associated reel for the reel strips of the reel strip group can be another type of reel, for which the reel area encloses a single instance of a symbol or multiple instances of symbols at a time. At least for backend processing, the reel strips of the reel strip group are linked, in the data structure(s), using multiple logical links. Each of the logical links (a) is associated with an outcome for one of the reel strips of the reel strip group and (b) indicates a next reel strip to use, from among the reel strips of the reel strip group. The logical links can be reel strip identifiers or another type of reference to other reel strips, where a given reel strip is associated with a lookup table for the given reel strip and/or a data structure for the linked reel strip mechanism. The data structure(s) for the linked reel strip mechanism can be the lookup tables for reel strips. For example, an entry in the lookup table for a reel strip can include an outcome, a weight for the outcome, and a logical link (such as a reel strip identifier) to the reel strip to use in the next iteration of the re-spin series. Alternatively, the data structure(s) for the linked reel strip mechanism can be separate from the lookup tables for reel strips.

1. Example Backend Operations.

With reference to FIG. 11*a*, at stage 1105, a backend system (such as the game processing backend system 314 described with reference to FIG. 3) starts, for a reel, a re-spin series that uses a linked reel strip mechanism with data structure(s) for reel strips of a reel strip group.

For each of one or more iterations of a re-spin series, a current reel strip is selected (at stage 1110), from among the multiple reel strips of the reel strip group, by traversing the data structure(s). In general, the backend system can traverse the data structure(s) by following logical links. For an initial iteration among the iteration(s) of the re-spin series, the backend system can determine a root reel strip (from among the reel strips of the reel strip group) to use as the current reel strip, e.g., by following a root logical link that indicates the root reel strip. For a successive iteration (after an initial iteration among the iteration(s) of the re-spin series), the backend system can determine the next reel strip to use (from among the reel strips of the reel strip group) to use as the current reel strip by following a logical link, in one of the data structure(s), that is associated with an outcome for a previous spin that used a previous reel strip (among the multiple reel strips of the reel strip group). For example, after the outcome is found for the previous spin, the backend system follows a logical link to the next reel strip.

At stage 1120, the backend system determines an outcome for a spin that uses the current reel strip. For example, the backend system generates a random number using an RNG and performs a lookup operation for the random number in a lookup table. The lookup table includes entries that indicate different symbol positions of the current reel strip. In this way, the backend system can determine one of the different symbol positions at which to stop the current reel strip. The outcome for the spin can be a count of new target symbol instances to add to reel strips for a set of reels used in a process. In the example implementation described in section IV, the outcome for a spin is a count of new instances of a highest-value symbol (white buffalo) to add to reel strips for a set of reels used in a free games feature. Alternatively, the target symbol can be another symbol for which instances of the symbol are added to reels of the process. The process can be any supplemental feature or base reel game that uses a set of reels.

After the backend system determines the outcome for the spin that uses the current reel strip, the backend system can update one or more counters or other variables. For example, in each of the iteration(s) of the re-spin series, the backend system can update a symbol count meter that indicates a running total count of target symbol instances to add to reel strips for a set of reels used in a process.

At stage 1130, the backend system determines whether to continue the re-spin series for another iteration. If so, the backend system selects (at stage 1110) the next reel strip to use as the current reel strip by traversing the data structure(s). Otherwise (after the iteration(s) of the re-spin series have finished), the backend system determines (at stage 1140) an outcome for the re-spin series. The outcome for the re-spin series is based on the outcome(s) for the spins in the iteration(s) of the re-spin series. For example, the outcome for the re-spin series is a final count of instances of a target symbol to add to reel strips for a set of reels used in a process.

In terms of the timing of operations, as shown in FIG. 11*a*, the backend system can determine a next reel strip to use as the current reel strip in a given iteration of the iteration(s) of the re-spin series, and then determine (at stage 1120) the outcome for the spin that uses the current reel strip later in the given iteration. Alternatively, the backend system can determine a next reel strip to use as the current reel strip in a given iteration of the iteration(s) of the re-spin series, and then determine the outcome for the spin that uses the current reel strip in a next iteration of the iteration(s) of the re-spin series. Thus, the backend system can determine the next reel strip to use at the end of a given iteration.

In any case, when the backend system determines the next reel strip to use, the next reel strip can be different in any of several ways compared to the previous reel strip. For example, the next reel strip includes fewer symbol positions for possible outcomes, because the next reel strip lacks a symbol position for an outcome for a previous spin that used a previous reel strip). Or, as another example, the next reel strip includes a symbol position for a possible outcome with a decreased likelihood, because the possible outcome with the decreased likelihood is an outcome for a previous spin that used a previous reel strip. For each successive iteration (after an initial iteration among the iteration(s) of the re-spin series), a lookup table used (at stage 1120) to determine the outcome for a spin that uses the current reel strip (a) is missing an entry associated with an outcome for a previous spin that used a previous reel strip, or (b) includes an entry associated with a possible outcome with a decreased likelihood, where the possible outcome with the decreased likelihood is the outcome for the previous spin that used the previous reel strip.

Alternatively, for a successive iteration (after an initial iteration among the iteration(s) of the re-spin series), a lookup table used (at stage 1120) to determine the outcome for a spin that uses the current reel strip can include a new entry for a new outcome. The new entry replaces an entry associated with an outcome for a previous spin that used a previous reel strip.

After the iteration(s) of the re-spin series finish, to add target symbol instances to reel strips for a set of reels used in a process, the backend system can increase the length of the reel strips or replace, with the target symbol instances, instances of other symbols in the reel strips for the set of reels used in the process. Alternatively, the backend system can add the target symbol instances to the reel strips during the iteration(s) of the re-spin series.

Although not shown in FIG. 11*a*, the operations of the re-spin series can be contingent on the occurrence of an earlier event. For example, the backend system determines whether or not a trigger result satisfies a trigger condition for the re-spin series. The re-spin series starts responsive to satisfaction of the trigger condition. To determine whether or not the trigger result satisfies the trigger condition, the backend system can determine whether or not a combination of instances of one or more scatter symbols includes at least one instance of a super scatter symbol. In this case, each of the at least one instance of the super scatter symbol corresponds to one of the iteration(s) of the re-spin series. In the example implementation described in section IV, the super scatter symbol is a super coin symbol, but alternatively the super scatter symbol could be a different type of symbol. The scatter symbol(s) can be dynamic symbols having any of multiple possible symbol types, such as a regular scatter symbol, a super scatter symbol, and a jackpot symbol. For the trigger condition, the combination of instances of the scatter symbol(s) includes at least a threshold count of instances of the scatter symbol(s). The threshold count can be different between a first use of the linked reel strip mechanism (triggering the re-spin series) and a second use of the linked reel strip mechanism (re-triggering the re-spin series).

2. Example Frontend Operations.

With reference to FIG. 11b, at stage 1155, a UI system (such as the UI system 302 described with reference to FIG. 3) receives user input at the electronic gaming device. The user input indicates a start to a re-spin series that uses a linked reel strip mechanism, which (at least for backend processing) has one or more data structures for reel strips of a reel strip group.

In each of one or more iterations of the re-spin series, a current reel strip is selected from among the reel strips of the reel strip group. For example, the UI system can select the current reel strip based on a reel strip identifier of the current reel strip. (During backend processing, the current reel strip was selected by traversing the data structure(s), as explained above.)

At stage 1160, the UI system displays, for a spin that uses the current reel strip, the current reel strip spinning within a reel area on a display screen of the electronic gaming device. Before displaying the current reel strip spinning within the reel area on the display screen, the UI system can zoom in to the reel area on the display screen. (Conversely, after the displaying an indicator of an outcome for the spin that uses the current reel strip, the UI system can zoom out from the reel area on the display screen.)

At stage 1170, the UI system displays an indicator of an outcome for the spin that uses the current reel strip. For example, the outcome for the spin is a count of new instances of a target symbol to add to reel strips for a set of reels used in a process. In the example implementation described in section IV, the outcome for the spin is a count of instances of a highest-value symbol (white buffalo) to add to reel strips for a set of reels used in a free games feature. Alternatively, the target symbol can be another symbol for which instances of the symbol are added to reels of the process. The process can be any supplemental feature or base reel game that uses a set of reels, where for UI-focused operations each of the reel strips for the set of reels can be displayed as spinning through a reel area for the set of reels on the display screen of the electronic gaming device upon a spin of the reel. The UI system can display an updated symbol count meter that indicates a running total count of target symbol instances to add to the reel strips for the set of reels used in the process.

At stage 1180, the UI system determines whether to continue the re-spin series for another iteration. If so, the UI system displays (at stage 1160) the next reel strip, as the current reel strip, spinning within the reel area. Otherwise (after the iteration(s) of the re-spin series have finished), the UI system displays (at stage 1190) an indicator of an outcome for the re-spin series. The outcome for the re-spin series is based on the outcome(s) for the spins in the iteration(s) of the re-spin series. For example, the outcome for the re-spin series is a final count of instances of a target symbol to add to reel strips for a set of reels used in a process.

In terms of the timing of operations, the UI system can determine a next reel strip to use as the current reel strip in a given iteration of the iteration(s) of the re-spin series, and then display (at stage 1160) the current reel strip spinning within the reel area later in the given iteration. Alternatively, the UI system can determine a next reel strip to use as the current reel strip in a given iteration of the iteration(s) of the re-spin series, and then display the current reel strip spinning within the reel area in a next iteration of the iteration(s) of the re-spin series. Thus, the UI system can determine the next reel strip to use at the end of a given iteration.

In any case, when the UI system determines the next reel strip to use, the next reel strip can be different compared to the previous reel strip. For example, the next reel strip includes fewer symbol positions for possible outcomes, because the next reel strip lacks a symbol position for an outcome for a previous spin that used the previous reel strip. Thus, for a successive iteration (after an initial iteration among the iteration(s) of the re-spin series), the current reel strip can be missing a symbol position for an outcome for a previous spin that used a previous reel strip. Alternatively, for a successive iteration (after an initial iteration among the iteration(s) of the re-spin series), the current reel strip can include a symbol position for a new outcome. The symbol position for the new outcome replaces a symbol position for an outcome for a previous spin that used a previous reel strip.

After the iteration(s) of the re-spin series have finished, to add instances of a target symbol to reel strips for a set of reels used in a process, the UI system can display one or more animations that depict (a) adding the target symbol instances to the reel strips for the set of reels used in the process by lengthening the reel strips or (b) replacing, with the target symbol instances, instances of other symbols in the reel strips for the set of reels used in the process. For example, after the UI system receives additional user input that indicates a start of the process, the UI system can display the animation(s) during spinning of the reels for the set of reels used in the process. The animation(s) can depict, according to a pattern, the target symbol instances being successively added to the reel strips for the set of reels used in the process, or successively replacing the instances of the other symbols in the reel strips for the set of reels used in the process. Alternatively, the backend system can add the target symbol instances to the reel strips during the iteration(s) of the re-spin series.

Although not shown in FIG. 11b, the operations of the re-spin series can be contingent on the occurrence of an earlier event. For example, the backend system determines whether or not a trigger result satisfies a trigger condition for the re-spin series. The re-spin series starts responsive to satisfaction of the trigger condition. In this case, the UI system displays a trigger result that satisfies a trigger condition for re-spin series. The UI system can then display a prompt, and the user input can be received (at stage 1155) responsive to the displaying the prompt. The trigger condition can be a combination of instances of one or more scatter symbols that includes at least one instance of a super scatter symbol. In this case, each of the at least one instance of the super scatter symbol corresponds to one of the iteration(s) of the re-spin series. In the example implementation described in section IV, the super scatter symbol is a super coin symbol, but alternatively the super scatter symbol could be a different type of symbol. The scatter symbol(s) can be dynamic symbols having any of multiple possible symbol types, such as a regular scatter symbol, a super scatter symbol, and a jackpot symbol.

D. Alternative Approach for Re-Spin Series.

Instead of using a linked reel strip mechanism that simulates sampling without replacement, a re-spin series for a reel can use an approach in which adjustments are made to a reel strip and lookup table for iterations of the re-spin series. Such an approach directly incorporates sampling without replacement for spins of the reel, and can be used to implement a re-spin series for a ribbon wheel as described in section IV.

For example, for a reel, a reel strip initially includes symbol positions, which are associated with outcomes. The reel strip is associated with a lookup table, which initially includes weights for the respective symbol positions of the reel strip, and which is used when selecting one of the symbol positions of the reel strip. In an initial iteration of the re-spin series, one of the initial symbol positions of the reel strip is selected using the lookup table.

For a later iteration of the re-spin series, the entry for the previously-selected symbol position is removed from the lookup table, producing an updated lookup table. The previously-selected symbol position can also be removed from the reel strip, producing an updated reel strip. For example, the lookup table can be modified to remove an entry for the previously-selected symbol position or to give the entry for the previously-selected symbol position a weight of zero, so that the entry cannot be selected from the updated lookup table. The graphic associated with the reel strip can be modified to remove a graphical indication for the previously-selected symbol position or to dim the graphical indication for the previously-selected symbol position. Or, the graphic associated with the reel strip can be unchanged (while still making selection of the entry for the previously-selected symbol position impossible by changing the lookup table).

After the updated lookup table and reel strip are used in the later iteration, the entry for a symbol position selected in the later iteration can be removed from the updated lookup table, as described above. Similarly, the symbol position selected in the later iteration can be removed from the reel strip, as described above. In this way, any previously-selected symbol position (outcome) is removed from consideration in any later iteration of the re-spin series.

The number of iterations possible for the re-spin series depends on implementation. For example, the number of iterations can be limited to ten, e.g., for ten spins of a ribbon wheel. Alternatively, the number of iterations possible for the re-spin series can be larger or smaller. Or, the number of iterations possible for the re-spin series can be unlimited, but eventually there are no more symbol positions of the reel strip to remove. For example, instead of removing an entry for a selected symbol position in a lookup table or changing the weight for the entry to zero, a selected entry can be replaced with a different entry associated with a different outcome (e.g., adding credits or free spins, instead of adding a count of target symbol instances). In this way, the count of target symbol instances that are added to the reel can be limited, by replacing a selected entry with a new entry associated with a different outcome. Or, as another alternative, instead of removing selected symbol positions from a reel strip, after a maximum count of target symbol instances is reached, the symbol positions of the reel strip are replaced with symbol positions associated with different outcomes (e.g., adding credits or free spins, instead of adding a count of target symbol instances).

Figure 12A:
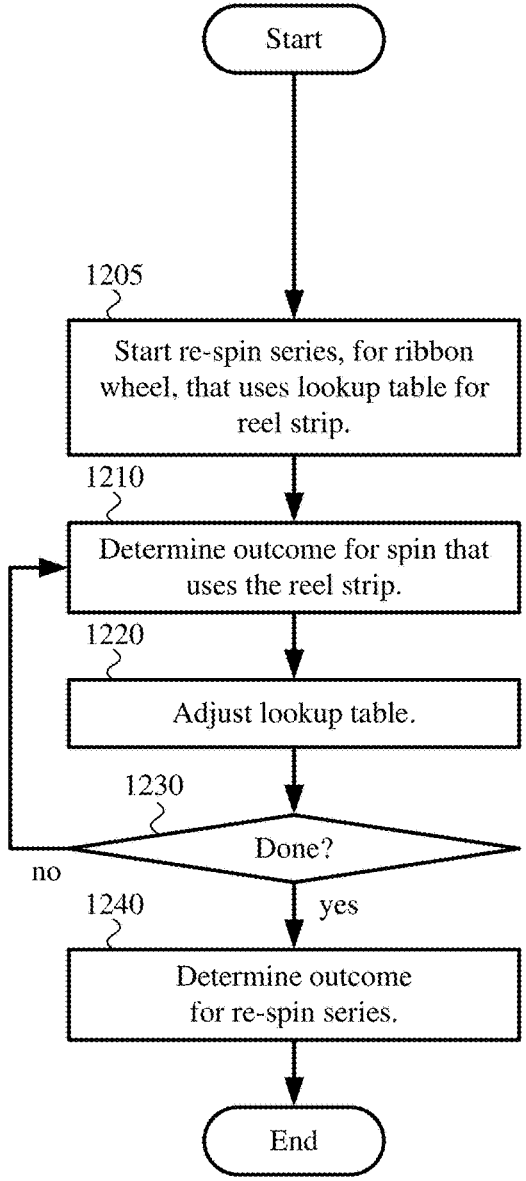
FIG. 12a is a flowchart showing an example technique for controlling the UI of an electronic gaming device that uses sampling without replacement in a re-spin series for a ribbon wheel, focusing on backend operations.
Figure 12B:
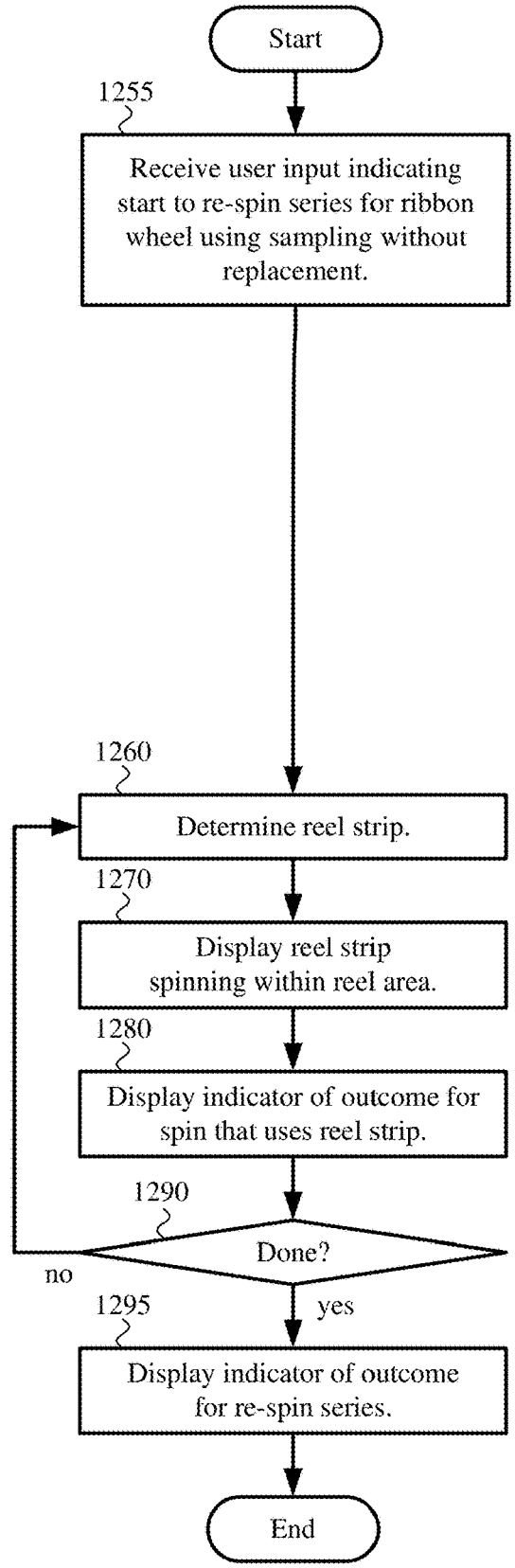
FIG. 12b is a flowchart showing an example technique for controlling the UI of an electronic gaming device that uses sampling without replacement in a re-spin series for a ribbon wheel, focusing on UI-frontend operations.

FIG. 12a shows an example technique 1200 for controlling the UI of an electronic gaming device that uses sampling without replacement in a re-spin series for a ribbon wheel, focusing on backend operations. Operations of the example technique 1200 shown in FIG. 12a can be performed, for example, in a game processing backend system 314 explained with reference to FIG. 3. FIG. 12b shows an example technique 1250 for controlling the UI of an electronic gaming device that uses sampling without replacement in a re-spin series for a ribbon wheel, focusing on UI-frontend operations. Operations of the example technique 1250 shown in FIG. 12b can be performed, for example, in a UI system 302 explained with reference to FIG. 3. The game processing backend system and UI system can be implemented using memory and one or more processors that are part of the electronic gaming device and/or part of a gaming system located remotely from the electronic gaming device. Depending on implementation, the backend system and UI system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

In general, the techniques 1200, 1250 shown in FIGS. 12a and 12b use a reel area on a display screen of an electronic gaming device. The reel area can be displayed on a single display screen (e.g., main display screen, or secondary display screen). In the techniques 1200, 1250 shown in FIGS. 12a and 12b, a re-spin series for a ribbon wheel is used for a supplemental feature such as a free games feature. A reel area for the ribbon wheel encloses at most one complete instance of a symbol at a time. Alternatively, the re-spin series for a ribbon wheel can be used as part of another type of supplemental feature, as part of a base reel game, or as part of another type of process of an electronic gaming device. In some implementations, the electronic gaming device is an EGM with video reels. Alternatively, the electronic gaming device is another type of electronic gaming device.

1. Example Backend Operations.

With reference to FIG. 12a, at stage 1205, a backend system (such as the game processing backend system 314 described with reference to FIG. 3) starts, for a ribbon wheel, a re-spin series that uses a lookup table for a reel strip. The re-spin series uses sampling without replacement for entries of the lookup table.

In each of one or more iterations of the re-spin series, the backend system determines (at stage 1210) an outcome for a spin that uses the reel strip. For an initial iteration (among the iteration(s) of the re-spin series), the reel strip can be an initial version of the reel strip. For a successive iteration (after an initial iteration among the iteration(s) of the re-spin series), the reel strip may have been modified to modify or remove one of the symbol positions of the reel strip. For example, to determine the outcome for the spin, the backend system generates a random number using an RNG and performs a lookup operation for the random number in the lookup table for the reel strip. The lookup table includes entries that indicate different symbol positions of the reel strip. In this way, the backend system can determine one of the different symbol positions at which to stop the reel strip.

The outcome for the spin can be a count of new target symbol instances to add to reel strips for a set of reels used in a process. For example, the outcome for the spin is a count of new instances of a highest-value symbol (white buffalo) to add to reel strips for a set of reels used in a free games feature. Alternatively, the target symbol can be another symbol for which instances of the symbol are added to reels of the process. The process can be any supplemental feature or base reel game that uses a set of reels.

After the backend system determines the outcome for the spin that uses the reel strip, the backend system can update one or more counters or other variables. For example, in each of the iteration(s) of the re-spin series, the backend system can update a symbol count meter that indicates a running total count of target symbol instances to add to reel strips for a set of reels used in a process.

At stage 1220, the backend system adjusts the lookup table. For example, the backend system modifies a weight in one of the entries of the lookup table for the selected one of the symbol positions of the reel strip, or the backend system removes one of the entries of the lookup table for the selected one of the symbol positions of the reel strip. In some implementations, for each successive iteration (after an initial iteration among the iteration(s) of the re-spin series), the lookup table (a) is missing one of the entries that is associated with an outcome for a previous spin that used the reel strip, or (b) includes one of the entries that is associated with a possible outcome with a decreased likelihood (where the possible outcome with the decreased likelihood is the outcome for the previous spin that used the reel strip). Alternatively, the lookup table can (c) include a new entry for a new outcome (where the new entry for the new outcome replaces an entry that is associated with the outcome for the previous spin that used the reel strip).

At stage 1230, the backend system determines whether to continue the re-spin series for another iteration. If so, the backend system determines (at stage 1210) an outcome for another spin that uses the reel strip. In terms of the timing of operations, the backend system can determine (at stage 1210) the outcome for a spin that uses the reel strip, and then adjust (at stage 1220) the lookup table later in a given iteration. Alternatively, the backend system can adjust the lookup table in a given iteration, and then determine the outcome for the spin in the given iteration using the adjusted lookup table. Thus, the backend system can determine the outcome for the spin at the end of a given iteration.

In any case, after an initial iteration, the reel strip can be different in any of several ways compared to the previously-used reel strip. For example, the reel strip includes fewer symbol positions for possible outcomes, because the reel strip lacks a symbol position for an outcome for the previous spin that used the reel strip. Or, as another example, the reel strip can include a symbol position for a possible outcome with a decreased likelihood, because the possible outcome with the decreased likelihood is an outcome for the previous spin that used the reel strip. For each successive iteration (after an initial iteration among the iteration(s) of the re-spin series), the reel strip is missing one of the symbol positions for an outcome for a previous spin that used the reel strip. The lookup table is missing one of the entries for the outcome or has a weight of zero for the one of the entries for the outcome. Alternatively, for each successive iteration (after an initial iteration among the iteration(s) of the re-spin series), the reel strip includes a new symbol position for a new outcome, the new symbol position for the new outcome replacing one of the symbol positions for an outcome for a previous spin that used the reel strip.

After the iteration(s) of the re-spin series finish, the backend system determines (at stage 1240) an outcome for the re-spin series. The outcome for the re-spin series is based on the outcome(s) of the iteration(s) of the re-spin series. For example, the outcome for the re-spin series is a final count of instances of a target symbol to add to reel strips for a set of reels used in a process. To add the target symbol instances to the reel strips for the set of reels used in the process, the backend system can increase the length of the reel strips or replace, with the target symbol instances, instances of other symbols in the reel strips for the set of reels used in the process. Alternatively, the backend system can add the target symbol instances to the reel strips during the iteration(s) of the re-spin series.

Although not shown in FIG. 12*a*, the operations of the re-spin series can be contingent on the occurrence of an earlier event, as described with reference to FIG. 11*a*. For example, the backend system determines whether or not a trigger result satisfies a trigger condition for the re-spin series. The initialization and the iteration(s) of the re-spin series are performed responsive to satisfaction of the trigger condition.

2. Example Frontend Operations.

With reference to FIG. 12*b*, at stage 1255, a UI system (such as the UI system 302 described with reference to FIG. 3) receives user input at the electronic gaming device. The user input indicates a start to a re-spin series for a ribbon wheel. The re-spin series uses sampling without replacement for symbol positions of a reel strip associated with the ribbon wheel. For UI-focused operations, the reel strip can be displayed as spinning through a reel area on a display screen of the electronic gaming device upon a spin of the ribbon wheel.

In each of one or more iterations of the re-spin series, the UI system determines (at stage 1260) the reel strip. For example, for an initial iteration (among the iteration(s) of the re-spin series), the UI system selects an initial version of the reel strip. Or, for a successive iteration (after an initial iteration among the iteration(s) of the re-spin series), the UI system modifies one of the symbol positions of the reel strip or removes one of the symbol positions of the reel strip.

At stage 1270, the UI system displays, for a spin that uses the reel strip, the reel strip spinning within the reel area on the display screen. Before displaying the reel strip spinning within the reel area on the display screen, the UI system can zoom in to the reel area on the display screen. (Conversely, after the displaying the outcome for the spin that uses the reel strip, the UI system can zoom out from the reel area on the display screen.)

At stage 1280, the UI system displays an indicator of an outcome for the spin that uses the reel strip. For example, the outcome for the spin is a count of new instances of a target symbol to add to reel strips for a set of reels used in a process. The target symbol can be a highest-value symbol (white buffalo) to add to reel strips for a set of reels used in a free games feature. Alternatively, the target symbol can be another symbol for which instances of the symbol are added to reels of the process. The process can be any supplemental feature or base reel game that uses a set of reels. The UI system can display an updated symbol count meter that indicates a running total count of target symbol instances to add to the reel strips for the set of reels used in the process.

At stage 1290, the UI system determines whether to continue the re-spin series for another iteration. If so, the UI system determines (at stage 1260) the reel strip to use for the next iteration. In terms of the timing of operations, the UI system can determine (at stage 1260) the reel strip in a given iteration, and then display (at stage 1270) the reel strip spinning within the reel area later in the given iteration. Alternatively, the UI system can determine the reel strip to use in a given iteration, and then display the reel strip spinning within the reel area in a next iteration. Thus, the UI system can determine the reel strip to use next at the end of a given iteration.

In any case, when the UI system determines the reel strip to use, the reel strip can be different compared to the previously-used reel strip. For example, the reel strip includes fewer symbol positions for possible outcomes, because the reel strip lacks a symbol position for an outcome for the previous spin that used the reel strip. For a successive iteration (after an initial iteration among the iteration(s) of the re-spin series), the reel strip can be missing a symbol position for an outcome for the previous spin that used the reel strip. Alternatively, for a successive iteration (after an initial iteration among the iteration(s) of the re-spin series), the reel strip includes a symbol position for a new outcome. The symbol position for the new outcome replaces a symbol position for an outcome for the previous spin that used the reel strip.

After the iteration(s) of the re-spin series have finished), the UI system displays (at stage 1295) an indicator of an outcome for the re-spin series. The outcome for the re-spin series is based on the outcome(s) for the spins in the iteration(s) of the re-spin series. For example, the outcome for the re-spin series is a final count of instances of a target symbol to add to reel strips for a set of reels used in a process. As described with reference to FIG. 11*b*, to add the instances of the target symbol to the reel strips for the set of reels used in the process, the UI system can display one or more animations that depict (a) adding the target symbol instances to the reel strips for the set of reels used in the process by lengthening the reel strips or (b) replacing, with the target symbol instances, instances of other symbols in the reel strips for the set of reels used in the process.

As described with reference to FIG. 11*b*, the operations of the re-spin series can be contingent on the occurrence of an earlier event. For example, the backend system determines whether or not a trigger result satisfies a trigger condition for the re-spin series. The iteration(s) of the re-spin series are performed responsive to satisfaction of the trigger condition. In this case, the UI system displays a trigger result that satisfies a trigger condition for re-spin series. The UI system can then display a prompt, and the user input can be received (at stage 1255) responsive to the displaying the prompt.

E. Examples of Integration into Electronic Gaming Devices.

Innovations described herein can be implemented in a gaming server 102 and/or gaming device 104A, 104B, 104C, 104X, 200 described with reference to FIGS. 1 and 2. Thus, a gaming server 102 or gaming device 104A, 104B, 104C, 104X, 200 is an example of an electronic gaming device as described in section VI.

For example, for the electronic gaming device, a game controller such as a game controller 202 described with reference to FIG. 2 can perform operations that use a linked reel strip mechanism and/or otherwise implement a re-spin series for a ribbon wheel. In some implementations, the game controller 202 performs backend operations as well as frontend UI operations. With respect to frontend UI operations, the game controller 202 can receive user input indicating a start to a re-spin series. Further, for an iteration of the re-spin series, the game controller 202 can select or adjust a reel strip, cause display of the reel strip spinning through a reel area, and display an indicator of an outcome for a spin that uses the reel strip. With respect to backend operations, for the re-spin series, the game controller 202 can start a re-spin series. Further, for an iteration of the re-spin series, the game controller 202 can select or adjust a reel strip and/or associated lookup table and determine an outcome for a spin that uses the reel strip.

Innovations described in section VI can be implemented in a game processing pipeline that follows the example game processing architecture 300 described with reference to FIG. 3. As described with reference to FIG. 3, RNG conversion engine 320 utilizes one or more lookup tables 322A-322N. In the context of the innovations described herein, for example, one or more of the lookup tables 322A-322N can be used to determine a symbol position at which to stop a reel strip and/or to determine other results. Different lookup tables can be used for different reel strips or different adjusted versions of a given reel strip, having different entries as symbol positions (outcomes) are removed or adjusted based on previous results.

In general, the example game processing architecture 300 shown in FIG. 3 can be used to process game play instructions and generate outcomes. In some implementations, the game processing architecture 300 implements a game processing pipeline for a process (e.g., a free games feature or other supplemental feature). The UI system 302 (e.g., the game play UI 304 of the UI system 302) receives user input that indicates a start to a re-spin series. The UI system 302 (e.g., the bonus game play UI 308) makes one or more calls to the game processing backend system 314. In response, the backend system 314 performs various operations. The backend system 314 starts a re-spin series. For each iteration of the re-spin series, the backend system 314 determines or adjusts the reel strip to use for the iteration. Using a gaming RNG 318, the RNG engine 316 generates one or more random numbers, which are passed to the RNG conversion engine 320. The RNG conversion engine 320, using one or more of the random number(s) and one or more of the lookup tables 322A-322N, determines a symbol position at which to stop a reel strip for a spin of the reel strip and determines the outcome associated with that symbol position. The backend system 314 returns generated results (e.g., reel strip identifier, indicators of the outcome) to the bonus game play UI 308 of the UI system 302, which can, among other operations, select or adjust the reel strip for the iteration, cause display of the reel strip spinning within the reel area, and then display an indicator of the outcome for the spin. The backend system 314 and bonus game play UI 308 can iteratively repeat their operations in multiple iterations of the re-spin series.

In general, the generated results returned by the backend system 314 can include game-related information (such as reel strip identifiers, outcomes) as well as animation effects not related to game parameters. Alternatively, the game play UI 304 can make one or more separate RNG calls to the backend system 314 to determine animation effects, as described in section V.

F. Technical Advantages of a Re-spin Series.

Approaches described herein address the technical problem of controlling volatility for a target level of RTP in an electronic gaming device. The approaches provide ways to achieve a desired volatility of a supplemental feature without significantly deviating from a designated level of RTP for the supplemental feature.

In particular, in some implementations that use a linked reel strip mechanism, for each of one or more iterations of a re-spin series, a current reel strip is selected (from among reel strips of reel strip group) by traversing one or more data structures of the linked reel strip mechanism. In terms of technical effects, innovative features of the linked reel strip mechanism represent improvements in the technical area of electronic gaming software and provide new technology, in that they provide a computationally-effective way to switch reel strips when iteratively spinning a reel. Furthermore, by managing lookup tables and/or other aspects of RNG events for the linked reel strip mechanism, game play can be kept fair and consistent with regulations while also enabling variation of volatility for the designated level of RTP. Also, UI-focused operations for the re-spin series for a ribbon wheel can improve the usability of electronic gaming devices by enhancing the user experience for players, extending player time on the electronic gaming devices, and maintaining the interest of current players in the electronic gaming devices. These embodiments are thus not merely new game rules or new display patterns.

VII. Examples of Low-Complexity Reel Symbol Replacement Strategies with Clustering.

This section describes innovations for replacing instances of symbols in reel strips with instances of a target symbol, using index tables configured to cluster the instances of the target symbol. The index tables are used to identify symbol positions in the reel strips at which to swap in the target symbol instances. After the target symbol instances are swapped in at the identified symbol positions, spin results are determined for one or more spins of the reels using the reel strips. Using index tables is a computationally-effective way to swap target symbol instances in to symbol positions in reel strips, while also clustering the target symbol instances. This provides another useful tool for managing volatility for a target level of RTP in an electronic gaming device.

In the example implementation described in section IV, index tables used to swap in instances of a highest-value symbol (white buffalo) during a free games feature. For a count of instances of the highest-value symbol, the index tables indicate symbol positions in one or more reel strips at which the previous symbol instances are replaced. The instances of the highest-value symbol are then swapped in to the reel strips before continuing with free games (spins) of the free games feature, with the swapped-in target symbol instances remaining in the reel strips for the duration of the free games feature. This is one possible use of index tables for reel symbol replacement, but reel symbol replacement with index tables as described herein can be used in many other ways. For example, the index tables can be used when replacing symbol instances for another type of supplemental feature in an electronic gaming device, for a base reel game in an electronic gaming device, or for some other process. Reel symbol replacement that uses the index tables can be triggered when a defined event occurs, or reel symbol replacement that uses the index tables can be performed by default in a process. The target symbol can be a highest-value symbol or some other type of symbol.

A. Examples of Index Tables.

FIG. 13 shows a reel strip before and after operations to swap in instances of a target symbol at symbol positions of the reel strip. In FIG. 13, the reel strip 1310 includes instances of a variety of symbols. Instances of the target symbol (shown as a shaded star) are swapped in at positions indicated in an index table. The modified reel strip 1312 includes clusters of swapped-in target symbol instances. In contrast, if target symbol instances were added to reel strips using RNG events to determine symbol positions, the target symbol instances would likely not be clustered to the same extent.

FIG. 14 shows example index tables 1400 that indicate symbol positions of reel strips at which to swap in target symbol instances. The index tables 1400 are per-reel index tables, which are indexed by a per-reel counter. For each reel strip, a corresponding index table includes symbol positions 1410 at which target symbol instances may be swapped in. During reel symbol replacement, for a reel strip, target symbol instances are swapped in at symbol positions successively listed in the index table for the reel strip, starting at index 0 and continuing for successive indexes (according to the per-reel counter). For example, for reel strip 0, twelve instances of the target symbol are swapped in a symbol positions 3, 4, 5, 11, 12, 13, 14, 15, 19, 20, 21, and 22.

The index tables for the reel strips can have the same length. Or, the index tables for the reel strips can have different lengths. In any case, the total count of symbol positions in the index tables is equal to the maximum count of target symbol instances that can be added to the reel strips.

In some implementations, target symbol instances are added to reel strips by completely traversing the index table for a given reel strip, from index 0 to the last index for the index table, then continuing by traversing the index table for a next reel strip, and so on, until reaching the count of target symbol instances to add. For example, suppose each index table includes 50 symbol positions. To add 70 instances of the target symbol, 50 target symbol instances are swapped in to a first reel strip at the 50 symbol positions indicated in the index table for the first reel strip, and 20 target symbol instances are swapped in to a second reel strip at symbol positions indicated by the first 20 symbol positions in the index table for the second reel strip.

Alternatively, target symbol instances can be added to reel strips in amounts indicated for the reel strips, respectively. A separate table can list the counts of target symbol instances to be added for the respective reel strips. The separate table can implicitly indicate the order of reel strips to which target symbol instances are added. For a given reel strip, target symbol instances for that reel strip are swapped in at symbol positions successively listed in the index table for the given reel strip, starting at index 0 and continuing for successive indexes in the index table, up to the count for the reel strip. For example, to add 80 instances of the target symbol apportioned between five reels as 30 instances, 20 instances, 10 instances, 10 instances, and 10 instances, 30 target symbol instances are swapped in to a first reel strip at symbol positions indicated by the first 30 symbol positions in the index table for the first reel strip, 20 target symbol instances are swapped in to a second reel strip at symbol positions indicated by the first 20 symbol positions in the index table for the second reel strip, and so on. When the count of target symbol instances is determined (e.g., with one or more spins of a reel in a re-spin series), the counts of target symbol instances to be added for the respective reel strips can be incremented. For example, if 20 target symbol instances are added, those 20 target symbol instances can be allocated evenly between five reel strips in the separate table. Or, the added target symbol instances can be allocated unevenly in the separate table, according to a distribution indicated in a table or data structure (e.g., a data structure for a linked reel strip mechanism, a lookup table with entries for symbol positions of a reel strip, or another table).

FIG. 15 shows another example index table 1500 that indicates symbol positions of reel strips at which to swap in instances of a target symbol. The index table 1500 is a combined 2D index table, which combines the index tables 1400 shown in FIG. 14 into a single index table. The single index table 1500 is indexed by reel strip identifier and per-reel counter. The symbol positions 1510 in the index table 1500 of FIG. 15 are the same as the symbol positions 1410 in the index tables of FIG. 14. The index table 1500 can be traversed in different orders to identify symbol positions at which to add target symbol instances, as described above with reference to FIG. 14.

FIG. 16 shows another example index table 1600 that indicates symbol positions of reel strips at which to swap in instances of a target symbol. The index table 1600 is a combined 1D index table, which is indexed by an overall counter. The index table 1600 includes the symbol positions 1410 from the index tables shown in FIG. 14 as a one-dimensional series of symbol positions 1620 in the index table 1600. For each index, the index table 1600 also lists a reel strip identifier for a reel strip that includes the symbol position for the index. The index table 1600 can be traversed from index 0 to the last index to add target symbol instances, one reel strip at a time, finishing swapping in target symbol instances for a given reel strip before continuing with the next reel strip.

In the example implementation described in section IV, an index table for each reel strip indicates symbol positions at which to swap in target symbol instances for that reel strip. The index tables have equal length. For example, if the maximum count of target symbol instances that can be added to the reel strips is 250, the length of each of five index tables is 50. Alternatively, the index tables can have different lengths whose total length is equal to the maximum count of target symbol instances that can be added to the reel strips (e.g., lengths of 38, 48, 48, 48, 68 for index tables for five reel strips).

In the example implementation, target symbol instances replace instances of low-value symbols. Instances of high-value symbols (such as a buffalo symbol, dynamic symbol, or wild symbol) are not replaced by target symbol instances. That said, the target symbol instances are clustered in the reel strips after replacement. Alternatively, target symbol instances can replace instances for any type of symbol.

In the example implementation described in section IV, target symbol instances are added successively at symbol positions listed in the index table for a given reel strip. Target symbol instances can be swapped in at all symbol positions in the index table for a given reel strip, before continuing with the next reel strip. Or, target symbol instances can be swapped in to the reel strips by counts indicated for the respective reel strips. A separate table can include the counts of target symbol instances to add for the respective reel strips, and implicitly indicate the order of reel strips to which target symbol instances are added.

B. Example Techniques for Low-Complexity Reel Symbol Replacement.

FIG. 17a shows an example technique 1700 for controlling the UI of an electronic gaming device, focusing on backend operations, when swapping in instances of a target symbol at symbol positions of a reel strip. Operations of the example technique 1700 shown in FIG. 17a can be performed, for example, in a game processing backend system 314 explained with reference to FIG. 3. FIGS. 17b-17d show example backend operations when swapping in target symbol instances at symbol positions of a reel strip. The game processing backend system can be implemented using memory and one or more processors that are part of the electronic gaming device and/or part of a gaming system located remotely from the electronic gaming device. Depending on implementation, the backend system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs.

In the technique 1700 shown in FIG. 17a, low-complexity reel symbol replacement is performed for a process that uses a set of reels. The set of reels includes n reels, where n depends on implementation. For example, n is 3, 4, or 5. Each of the reels has a reel strip. In some implementations, the process is a supplemental feature such as a free games feature. Alternatively, the process is a base reel game or another type of process of an electronic gaming device. In some implementations, the electronic gaming device is an EGM with video reels. Alternatively, the electronic gaming device is another type of electronic gaming device.

With reference to FIG. 17a, at symbol positions of at least one of the reel strips, the backend system swaps in instances of a target symbol. In doing so, the backend system uses one or more index tables to identify the symbol positions at which to swap in the target symbol instances. The count of target symbol instances to be added for the reels can depend at least in part on RNG events (e.g., as described in section VI). For example, the backend system can determine, as an outcome of one or more iterations of a re-spin series for a ribbon wheel, the count of instances of the target symbol to be added for the reels, depending at least in part on RNG events. Alternatively, the count of target symbol instances to be added for the reels can be determined in another manner. The target symbol instances can be swapped in sequentially for entries in the index table(s), as described above, one reel strip after another, or for multiple reel strips before any given reel strip finishes. In some implementations, the swapped-in target symbol instances replace only instances of low-value symbols in the at least one of the reel strips. In particular, when the reel strips include instances of a dynamic symbol, none of the instances of the dynamic symbol is replaced by the target symbol instances when swapping in the target symbol instances. Alternatively, the swapped-in target symbol instances can replace instances of any type of symbols in the reel strips.

The target symbol can be pre-defined. For example, the target symbol is a highest-value symbol (e.g., a white buffalo, in the example implementation). Alternatively, the target symbol can be dynamically determined. For example, the backend system selects, using an RNG event, one of multiple possible symbol types for the target symbol. The multiple possible symbol types for the target symbol can include a highest-value symbol, a wild symbol, and/or another symbol type.

In general, the index table(s) are configured to cluster the instances of the target symbol according to a deterministic approach, without using RNG events to identify the symbol positions at which to swap in the instances of the target symbol. Each of the index table(s) has entries that include at least some of the symbol positions. The index tables can be organized in any of various ways.

For example, the index table(s) can consist of one index table per reel, with the per-reel index table being indexed along a dimension for a per-reel counter. In this case, each entry of the per-reel index table includes one of the symbol positions of the reel strip for the reel. FIG. 14 shows examples of such index tables. The length can be identical for each of the index table(s), or the length can be different for at least some of the index table(s).

As another example, the index table(s) can consist of a single index table for all of the reels, with the single index table being indexed along a first dimension for a reel strip identifier and being indexed along a second dimension for a per-reel counter. In this case, each entry of the single index table includes one of the symbol positions of a reel strip, which is indicated by the reel strip identifier that indexes the entry. FIG. 15 shows an example of such an index table.

As another example, the index table(s) can consist of a single index table for all of the reels, with the single index table being indexed along a dimension for an overall counter. In this case, each entry of the single index table includes a reel strip identifier and one of the symbol positions of a reel strip, which is indicated by the reel strip identifier. FIG. 16 shows an example of such an index table.

Alternatively, the index table(s) are organized in some other way.

In some implementations, the swapping in the target symbol instances also uses a reel strip table. The reel strip table can include count values for target symbol instances to be added for the reels, respectively. For example, given a total count of target symbol instances to be added for the reels, the reel strip table includes count values that allocate the target symbol instances between the respective reels. In this case, the reel strip table implicitly indicates the order for adding the target symbol instances to the reel strips. Alternatively, the reel strip table can include reel strip identifiers for successive target symbol instances to be added for the reels. In this case, the reel strip table explicitly indicates the order for adding the target symbol instances to the reel strips.

FIG. 17*b* shows first example backend operations 1701 that can be performed when swapping in target symbol instances at symbol positions of reel strips. In the first example backend operations 1701, a total count of target symbol instances to be added for a set of reels is provided, and target symbol instances are swapped in at symbol positions of a reel strip for a given reel, up to a maximum count for the given reel, before continuing with the next reel. At stage 1711, the backend system determines the total count of target symbol instances to be added for a set of reels. The backend system sets (at stage 1715) an overall counter to zero. At stage 1721, the backend system identifies a next reel to process as a current reel (given reel). The backend system determines (at stage 1731) a maximum count of target symbol instances that can be added for the given reel and sets (at stage 1735) a per-reel counter to zero. At stage 1741, the backend system uses one of the index table(s) to identify a symbol position of the reel strip for the given reel at which to swap in a target symbol instance. The backend system swaps in (at stage 1751) the target symbol instance at the identify symbol position of the reel strip for the given reel. At stage 1761, the backend system increments the per-reel counter and the overall counter. If the overall counter has reached the total count of target symbol instances to be added ("yes" path at stage 1771), the last target symbol instance has been added, and the backend operations 1701 end. Otherwise, the overall counter being less than the total count of target symbol instances to be added ("no" path at stage 1771), the backend system checks (at stage 1775) whether the reel counter has reached the maximum count of target symbol instances that can be added for the given reel. If not ("no" path at stage 1775), the backend system continues by identifying the next symbol position of the reel strip for the given reel at which to swap in a target symbol instance. Otherwise, the reel counter having reached the maximum count of target symbol instances that can be added for the given reel ("yes" path at stage 1775), the backend system continues by identifying (at stage 1721) the next reel to process as a current reel (given reel).

FIG. 17*c* shows second example backend operations 1702 that can be performed when swapping in target symbol instances at symbol positions of reel strips. In the second example backend operations 1702, actual counts of target symbol instances to be added for respective reels are provided, and target symbol instances are swapped in at symbol positions of a reel strip for a given reel, up to the actual count for the given reel, before continuing with the next reel. At stage 1722, the backend system identifies a next reel to process as a current reel (given reel). The backend system determines (at stage 1732) the actual count of target symbol instances to be added for the given reel and sets (at stage 1735) a per-reel counter to zero. At stage 1741, the backend system uses one of the index table(s) to identify a symbol position of the reel strip for the given reel at which to swap in a target symbol instance. The backend system swaps in (at stage 1751) the target symbol instance at the identify symbol position of the reel strip for the given reel. At stage 1762, the backend system increments the per-reel counter. The backend system checks (at stage 1772) whether the reel counter has reached the actual count of target symbol instances to be added for the given reel. If not ("no" path at stage 1772), the backend system continues by identifying the next symbol position of the reel strip for the given reel at which to swap in a target symbol instance. Otherwise, the reel counter having reached the actual count of target symbol instances to be added for the given reel ("yes" path at stage 1772), the backend system continues by checking (at stage 1778) whether the last reel has been processed. If so, the backend operations 1702 end. Otherwise, the backend system continues by identifying (at stage 1722) the next reel to process as a current reel (given reel).

FIG. 17*d* shows third example backend operations 1703 that can be performed when swapping in target symbol instances at symbol positions of reel strips. In the third example backend operations 1703, a total count of target symbol instances to be added for a set of reels is provided, and target symbol instances are swapped in at symbol positions of a reel strip for a given reel identified using an overall counter. At stage 1711, the backend system determines the total count of target symbol instances to be added for a set of reels. The backend system sets (at stage 1715) an overall counter to zero. At stage 1723, the backend system identifies one of the reels using the overall counter (e.g., using the overall counter as an index for an index table as shown in FIG. 16, to identify a reel strip identifier for the reel). At stage 1743, the backend system uses one of the index table(s) to identify a symbol position of the reel strip for the identified reel at which to swap in a target symbol instance. The backend system swaps in (at stage 1753) the target symbol instance at the identify symbol position of the reel strip for the identified reel. At stage 1763, the backend system increments the overall counter. If the overall counter has reached the total count of target symbol instances to be added ("yes" path at stage 1771), the last target symbol instance has been added, and the backend operations 1703 end. Otherwise, the overall counter being less than the total count of target symbol instances to be added ("no" path at stage 1771), the backend system continues by identifying (at stage 1723) one of the reels using the overall counter.

Alternatively, backend operations can be performed in some other way when swapping in target symbol instances at symbol positions of reel strips.

With reference to FIG. 17*a*, at stage 1790, after swapping in the instance of the target symbol, the backend system determines spin results for one or more spins of the reels, respectively, using the reel strips. For example, for each reel of the set of reels, the backend system generates a random number using an RNG and performs a lookup operation for the random number in a lookup table. The lookup table includes entries that indicate different symbol positions of the reel strip for the reel. In this way, the backend system determines one of the different symbol positions at which to stop the reel strip for the reel. After determining the spin results, the backend system can determine an outcome of the process based at least in part on the spin results (e.g., using all-ways evaluation of different possible paths through the reel area).

C. Examples of Integration of Low-Complexity Reel Symbol Replacement with Clustering into Electronic Gaming Devices.

Innovations described herein can be implemented in a gaming server 102 and/or gaming device 104A, 104B, 104C, 104X, 200 described with reference to FIGS. 1 and 2. Thus, a gaming server 102 or gaming device 104A, 104B, 104C, 104X, 200 is an example of an electronic gaming device as described in section VII.

For example, for the electronic gaming device, a game controller such as a game controller 202 described with reference to FIG. 2 can perform operations for reel symbol replacement using one or more index tables. In some implementations, the game controller 202 performs backend operations as well as frontend UI operations. With respect to backend operations, the game controller 202 can use the index table(s) to identify symbol positions of reel strips at which to swap in target symbol instances. Further, the game controller 202 can determine spin results for one or more spins that use the reel strips after symbol replacement, and determine outcomes associated with the spin results.

Innovations described in section VII can be implemented in a game processing pipeline that follows the example game processing architecture 300 described with reference to FIG. 3. As described with reference to FIG. 3, RNG conversion engine 320 utilizes one or more lookup tables 322A-322N. In the context of the innovations described herein, for example, one or more of the lookup tables 322A-322N can be used to determine spin results for one or more spins that use reel strips after symbol replacement, and/or to determine other results. Different lookup tables can be used for different reel strips.

In general, the example game processing architecture 300 shown in FIG. 3 can be used to process game play instructions and generate outcomes. In some implementations, the game processing architecture 300 implements a game processing pipeline for a process (e.g., a free games feature or other supplemental feature). The backend system 314 loads one or more index tables for reel symbol replacement. Using the index table(s), the backend system 314 identifies symbol positions of reel strips at which to swap in target symbol instances. The backend system 314 then swaps in target symbol instances at the identified symbol positions of the reel strips. Using a gaming RNG 318, the RNG engine 316 generates one or more random numbers, which are passed to the RNG conversion engine 320. The RNG conversion engine 320, using one or more of the random number(s) and one or more of the lookup tables 322A-322N, determines symbol positions at which to stop reel strips for spins of the reel strips, respectively, and determines outcomes associated with the symbol positions, respectively. The backend system 314 returns generated results (indicators of the outcomes) to a bonus game play UI 308 of the UI system 302, which can, among other operations, cause display of the reel strips within the reel area, and then display indicators of the outcomes associated with the spin results.

In general, the generated results returned by the backend system 314 can include game-related information (such as reel strip identifiers, outcomes) as well as animation effects not related to game parameters. Alternatively, the game play UI 304 can make one or more separate RNG calls to the backend system 314 to determine animation effects, as described in section V.

D. Technical Advantages of Low-Complexity Reel Symbol Replacement with Clustering.

Approaches described herein address the technical problem of controlling volatility for a target level of RTP in an electronic gaming device. The approaches provide computationally-effective ways to achieve a desired volatility of a supplemental feature without significantly deviating from a designated level of RTP for the supplemental feature.

In particular, in some implementations, index tables are used to swap target symbol instances in to symbol positions in reel strips, while also clustering the target symbol instances. In terms of technical effects, using index tables to identify symbol positions at which to swap in target symbol instances has various benefits. For example, using index tables allows a designer to set clusters of target symbol instances in a reel strip (as opposed to having the target symbol instances randomly distributed in the reel strips). Because the clusters of target symbol instances tend to lead to higher awards (e.g., for all-ways evaluation), the index tables provide a way for the designer to increase volatility for a designated level of RTP, which can enhance the user experience. Similarly, using index tables can reduce the number of spins needed to reach a certain game outcome (e.g., clusters of the target symbol), again providing a way for the designer to increase volatility for a designated level of RTP. As another example, using index tables to cluster target symbol instances, which are retained in reel strips throughout a supplemental feature, enables a supplemental feature to payout higher awards the longer the player remains in the feature. Again, this provides a way to increase volatility for a designated level of RTP, while enhancing the user experience. As another example, using index tables to identify symbol positions at which to swap in target symbol instances (as opposed to adding target symbol instances by increasing the length of a reel strip), allows the target symbol instances to be added without affecting the probability of events dependent on other symbols that remain in the reels. For example, trigger conditions that depend on combinations of scatter symbols (e.g., coin symbols) are not affected when target symbol instances replace instances of low-value symbols, whereas adding target symbol instances by increasing the lengths of a reel strip could decrease the probabilities of occurrence for the combinations of scatter symbols. This provides a non-disruptive way to increase volatility for a designated level of RTP. Using index tables to identify symbol positions at which to add target symbol instances provides flexibility to add a variable count of target symbol instances. In contrast, if entire reel strips were replaced, the number of reel strips to account for different counts and placements of target symbol instances could quickly become infeasible. Using index tables for reel symbol replacement, game play can be kept fair and consistent with regulations while also enabling variation of volatility for the designated level of RTP. These embodiments are thus not merely new game rules or new display patterns.

VIII. Other Features of Electronic Gaming Devices.

A typical electronic gaming device is a specially-configured computer system, and not merely a general-purpose computer. For example, one difference between a typical electronic gaming device and common processor-based computer system is that the electronic gaming device is designed to be a state-based system. In a state-based system, the system stores and maintains its current state in non-volatile memory, which can be implemented using battery-backed RAM, flash memory, a solid-state drive, or other persistent memory. Different functions of a game (e.g., bet, play, result, points in the graphical presentation, etc.) may be defined as a state. When a game moves from one state to another, data regarding the game state is stored in a custom non-volatile memory subsystem. In some cases, the gaming device does not advance from a current state to a subsequent state until information that allows the current state to be reconstructed is stored. In the event of a power failure or other malfunction, the gaming device will return to its current state when the power is restored by recovering state information from non-volatile memory. The restored state may include metering information and graphical information that was displayed on the gaming device in the state prior to the malfunction. For instance, if a player was shown an award for a game of chance and, before the award could be provided to the player, the power failed, the gaming device, upon the restoration of power, would return to the state where the award is indicated. More generally, the gaming device records, in non-volatile memory, the values of game parameters assigned during play, such as variables determined by an RNG or internal counters. (A game parameter, in general, can be one or more variables whose values govern play at the gaming device and depend on a random selection process.) The value of a game parameter can be recorded periodically, in response to some event such as user input, or whenever the value of the game parameter changes. This way, the gaming device can recover its state in case of a power failure or "tilt" event, allowing the gaming device to reconstruct events that have taken place before the power failure or "tilt" event. This requirement affects the software and hardware design on a gaming device. Game history information regarding previous games played, such as an amount wagered, the outcome of the game and so forth, may also be stored in a non-volatile memory device.

In the context of the innovations described herein, for example, a game controller 202 can save information about mode for a base reel game (special mode or regular mode), the reel strips in use, the reel area in use, and symbol positions at which to stop reel strips for reels in non-volatile memory at various stages. The non-volatile memory can also store other state information, such as a current bet amount, an amount of credits remaining, and/or a win amount for a base reel game, bonus reel game, and/or other supplemental feature. More generally, non-volatile memory can store state information such as positions of the respective reels, in addition to storing information that indicates the configuration of reel strips of the reels. After finishing a supplemental feature or a base reel game, the game controller 202 can store information in non-volatile memory that indicates an outcome (e.g., award amount) or status.

IX. Alternatives and Variations.

Numerous embodiments are described in this disclosure, and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only, and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget"" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processors and memory readable by the one or more processors, the memory having stored thereon computer-executable instructions for causing the one or more processors, when programmed thereby, to perform operations to control a user interface of an electronic gaming device, the operations comprising:
   in a process that uses a set of reels, each of the reels having a reel strip:
      at symbol positions of at least one of the reel strips, swapping in instances of a target symbol, including using one or more index tables to identify the symbol positions at which to swap in the instances of the target symbol, wherein the one or more index tables are configured to cluster the instances of the target symbol according to a deterministic approach, without using random number generator events to identify the symbol positions at which to swap in the instances of the target symbol; and
      after the swapping in the instances of the target symbol, determining spin results for one or more spins of the reels, respectively, using the reel strips.

2. The computer system of claim 1, wherein the swapping in the instances of the target symbol includes, for each of the reels:
   determining a count of instances of the target symbol to be added for the reel;
   for each of the instances of the target symbol to be added for the reel:
      using one of the one or more index tables to identify a symbol position of the reel strip for the reel at which to swap in the target symbol; and
      at the identified symbol position of the reel strip for the reel, swapping in the instance of the target symbol.

3. The computer system of claim 1, wherein the swapping in the instances of the target symbol includes:
   determining a total count of instances of the target symbol to be added for the set of reels; and
   for each of the instances of the target symbol to be added for the set of reels, up to the total count of instances of the target symbol to be added for the set of reels:
      identifying the reel strip for one of the reels;
      using one of the one or more index tables to identify a symbol position of the identified reel strip at which to swap in the instance of the target symbol; and
      at the identified symbol position of the identified reel strip, swapping in the instance of the target symbol.

4. The computer system of claim 1, wherein the operations further comprise:
   selecting, using a random number generator event, one of multiple possible symbol types for the target symbol, the multiple possible symbol types including a wild symbol and a highest-value symbol.

5. The computer system of claim 1, wherein each of the one or more index tables has entries that include at least some of the symbol positions.

6. The computer system of claim 1, wherein the one or more index tables consist of one index table per reel, the index table per reel being indexed along a dimension for a per-reel counter, each entry of the index table per reel including one of the symbol positions of the reel strip for the reel.

7. The computer system of claim 6, wherein length is identical for each of the one or more index tables.

8. The computer system of claim 6, wherein length is different for at least some of the one or more index tables.

9. The computer system of claim 1, wherein the one or more index tables consist of a single index table for all of the reels, the single index table being indexed along a first dimension for a reel strip identifier and being indexed along a second dimension for a per-reel counter, each entry of the single index table including one of the symbol positions for a reel strip indicated by the reel strip identifier that indexes the entry.

10. The computer system of claim 1, wherein the one or more index tables consist of a single index table for all of the reels, the single index table being indexed along a dimension for an overall counter, each entry of the single index table including a reel strip identifier and one of the symbol positions for a reel strip indicated by the reel strip identifier.

11. The computer system of claim 1, wherein the swapping in the instances of the target symbol at the symbol positions of the at least one of the reel strips also uses a reel strip table, the reel strip table including (a) count values for instances of the target symbol to be added for the reels, respectively, or (b) reel strip identifiers for successive instances of the target symbol to be added for the reels.

12. The computer system of claim 1, wherein the operations further comprise:
   determining, as an outcome of one or more iterations of a re-spin series for a ribbon wheel, a count of instances of the target symbol to be added for the reels, depending at least in part on random number generation events.

13. The computer system of claim 1, wherein the swapping in the instances of the target symbol is performed sequentially for entries in the one or more index tables.

14. The computer system of claim 1, wherein the swapped-in instances of the target symbol replace only instances of low-value symbols in the at least one of the reel strips.

15. The computer system of claim 1, wherein the at least one of the reel strips include instances of a dynamic symbol, and wherein none of the instances of the dynamic symbol is replaced by the instances of the target symbol when performing the swapping in the instances of the target symbol.

16. The computer system of claim 1, wherein the determining the spin results for the one or more spins of the reels, respectively, includes, for each reel of the set of reels:
  generating a random number using a random number generator; and
  performing a lookup operation for the random number in a lookup table, the lookup table including entries that indicate different symbol positions of the reel strip for the reel, thereby determining one of the different symbol positions at which to stop the reel strip for the reel.

17. The computer system of claim 1, wherein the operations further comprise:
  determining an outcome of the process based at least in part on the spin results.

18. The computer system of claim 17, wherein the determining the outcome uses all-ways evaluation of different possible paths through a reel area.

19. The computer system of claim 1, wherein the process is a base process, and wherein the set of reels includes n reels, n being selected from the group consisting of 3, 4, and 5.

20. The computer system of claim 1, wherein the process is a supplemental feature of a base process, and wherein the set of reels includes n reels, n being selected from the group consisting of 3, 4, and 5.

* * * * *